United States Patent
Dolev et al.

(10) Patent No.: US 12,254,696 B2
(45) Date of Patent: Mar. 18, 2025

(54) ITEM IDENTIFICATION AND TRACKING SYSTEM

(71) Applicant: TRIGO VISION LTD., Tel Aviv (IL)

(72) Inventors: Shaked Dolev, Tel Aviv (IL); Yuval Snappir, Tel Aviv (IL); Daniel Gabay, Even Yehuda (IL)

(73) Assignee: TRIGO VISION LTD., Tel Aviv (IL)

( * ) Notice: Subject to any disclaimer, the term of this patent is extended or adjusted under 35 U.S.C. 154(b) by 356 days.

(21) Appl. No.: 17/769,908

(22) PCT Filed: Nov. 19, 2020

(86) PCT No.: PCT/IL2020/051198
§ 371 (c)(1),
(2) Date: Apr. 18, 2022

(87) PCT Pub. No.: WO2021/100043
PCT Pub. Date: May 27, 2021

(65) Prior Publication Data
US 2022/0366578 A1 Nov. 17, 2022

Related U.S. Application Data

(60) Provisional application No. 62/938,563, filed on Nov. 21, 2019, provisional application No. 62/938,681, filed on Nov. 21, 2019.

(51) Int. Cl.
*G06V 20/52* (2022.01)
*G06T 7/292* (2017.01)
(Continued)

(52) U.S. Cl.
CPC .............. *G06V 20/52* (2022.01); *G06T 7/292* (2017.01); *G06T 7/73* (2017.01); *G06V 10/22* (2022.01); *G06T 2207/20081* (2013.01)

(58) Field of Classification Search
CPC ........ G06V 20/52; G06V 10/22; G06T 7/292; G06T 7/73; G06T 2207/20081
See application file for complete search history.

(56) References Cited

U.S. PATENT DOCUMENTS 10,282,852 B1 * 5/2019 Buibas ..................... G06T 7/246
10,699,421 B1 * 6/2020 Cherevatsky .......... G06V 20/52
(Continued)

FOREIGN PATENT DOCUMENTS

JP 2016-194847 A 11/2016
WO 2021/100043 5/2021

OTHER PUBLICATIONS

Shorten, Connor, and Taghi M. Khoshgoftaar. "A survey on image data #augmentation for deep learning." Journal of big data 6.1 (2019): 1-48.

(Continued)

*Primary Examiner* — Utpal D Shah
(74) *Attorney, Agent, or Firm* — Sughrue Mion, PLLC

(57) ABSTRACT

A method for acquiring data relating to an object including arranging a multiplicity of cameras to view a scene, at least one reference object within the scene being viewable by at least a plurality of the multiplicity of cameras, each of the plurality of cameras acquiring at least one image of the reference object viewable thereby, finding a point of intersection of light rays illuminating each of the plurality of cameras and correlating a pixel location at which the reference object appears within each the at least one image to the light rays illuminating each of the plurality of cameras and intersecting with the region of intersection, irrespective of a three-dimensional location of the reference object within the scene.

14 Claims, 31 Drawing Sheets

(51) Int. Cl.
  *G06T 7/73*   (2017.01)
  *G06V 10/22*  (2022.01)

(56) References Cited

U.S. PATENT DOCUMENTS

| | | | |
|---|---|---|---|
| 10,771,776 B2* | 9/2020 | Schilling | G06T 7/80 |
| 11,315,262 B1* | 4/2022 | Cherevatsky | G06T 11/60 |
| 11,823,461 B1* | 11/2023 | Song | G01S 13/931 |
| 2008/0123939 A1 | 5/2008 | Wieneke | |
| 2009/0303077 A1 | 12/2009 | Onome et al. | |
| 2010/0177936 A1 | 7/2010 | Ebling et al. | |
| 2011/0134253 A1 | 6/2011 | Aoyama | |
| 2013/0141547 A1 | 6/2013 | Shimizu | |
| 2014/0253738 A1 | 9/2014 | Mullis | |
| 2017/0070731 A1 | 3/2017 | Darling et al. | |
| 2017/0339395 A1* | 11/2017 | Hall | H04N 13/111 |
| 2018/0012082 A1 | 1/2018 | Satazoda et al. | |
| 2019/0043003 A1* | 2/2019 | Fisher | G06N 3/045 |
| 2019/0082173 A1 | 3/2019 | Schilling | |
| 2019/0304134 A1* | 10/2019 | Mauchly | G06T 15/20 |
| 2020/0380305 A1* | 12/2020 | Sharma | G06V 20/56 |
| 2021/0407131 A1* | 12/2021 | Kallakuri | G06V 20/52 |
| 2023/0274227 A1* | 8/2023 | Eggert | G06V 10/243 |
| | | | 705/28 |

OTHER PUBLICATIONS

Trigo Vision Ltd., "Image Conversion for Image Processing", U.S. Appl. No. 62/938,563, filed Nov. 21, 2019, 10 #pages.

Trigo Vision Ltd., "Item Identification and Tracking System", U.S. Appl. No. 62/938,681, filed Nov. 21, 2019, 87 pages.

U.S. Patent and Trademark Office acting as the International Searching Authority, An International Search Report and a Written Opinion both dated May 11, 2021, which issued during the prosecution of Applicant's PCT/IL2020/051198, 20 pages.

The International Bureau of WIPO, An International Preliminary Report on Patentability dated May 17, 2022, which issued during the prosecution #of Applicant's PCT/IL2020/051198, 13 pages.

European Search Report dated Nov. 7, 2023 which issued during the #prosecution of Applicant's European App No. 20891096.8.

An Office Action dated Oct. 8, 2024, which issued during the prosecution of Japanese Patent Application No. 2022-528326.

C. Leistner, P. M. Roth, H. Grabner, H. Bischof, A. Starzacher and B. Rinner, "Visual on-line learning in distributed camera networks," 2008 Second ACM/IEEE International Conference on Distributed Smart Cameras, Palo Alto, CA, USA, 2008, pp. 1-10, doi: 10.1109/ICDSC.2008.4635700.

* cited by examiner

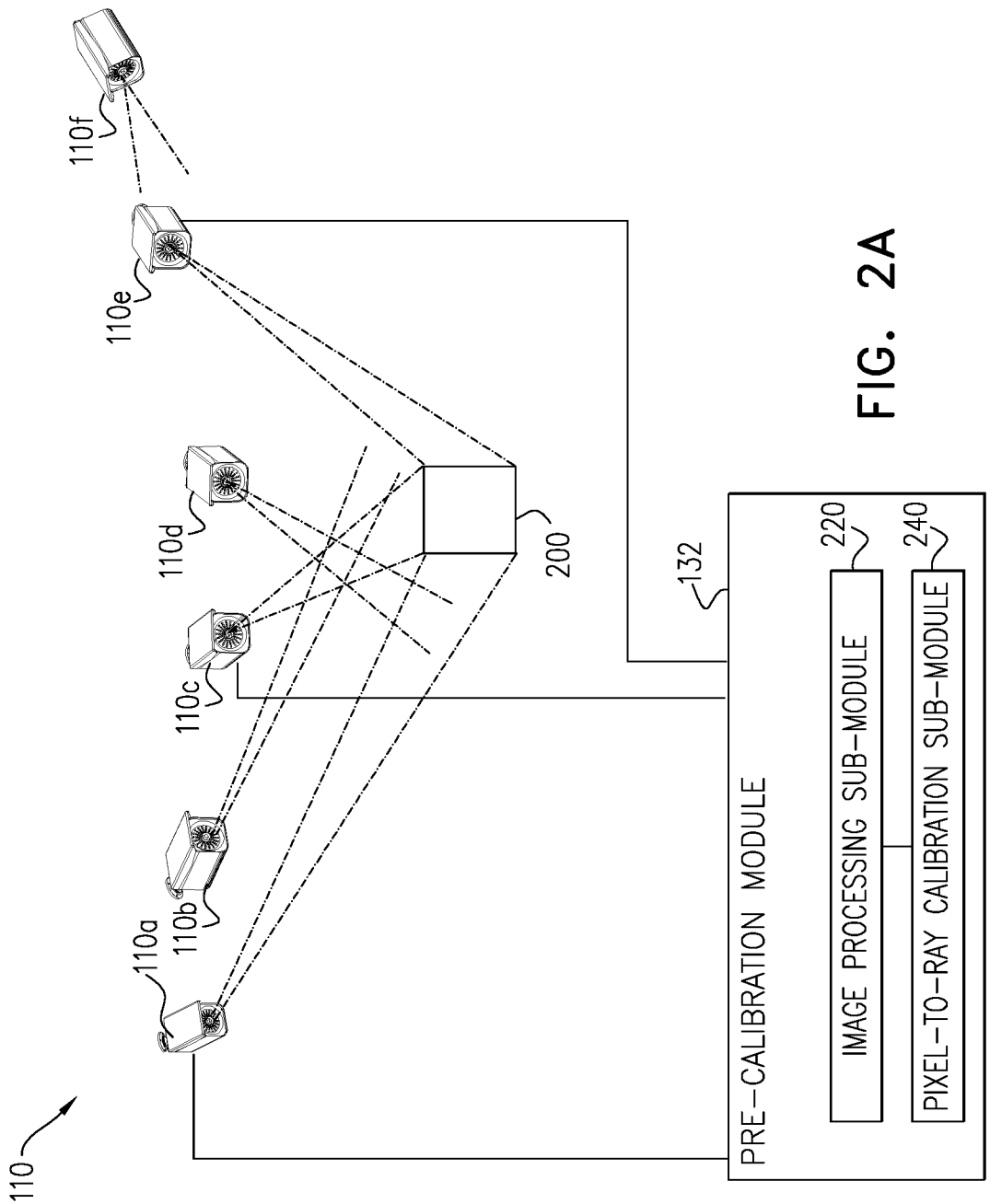

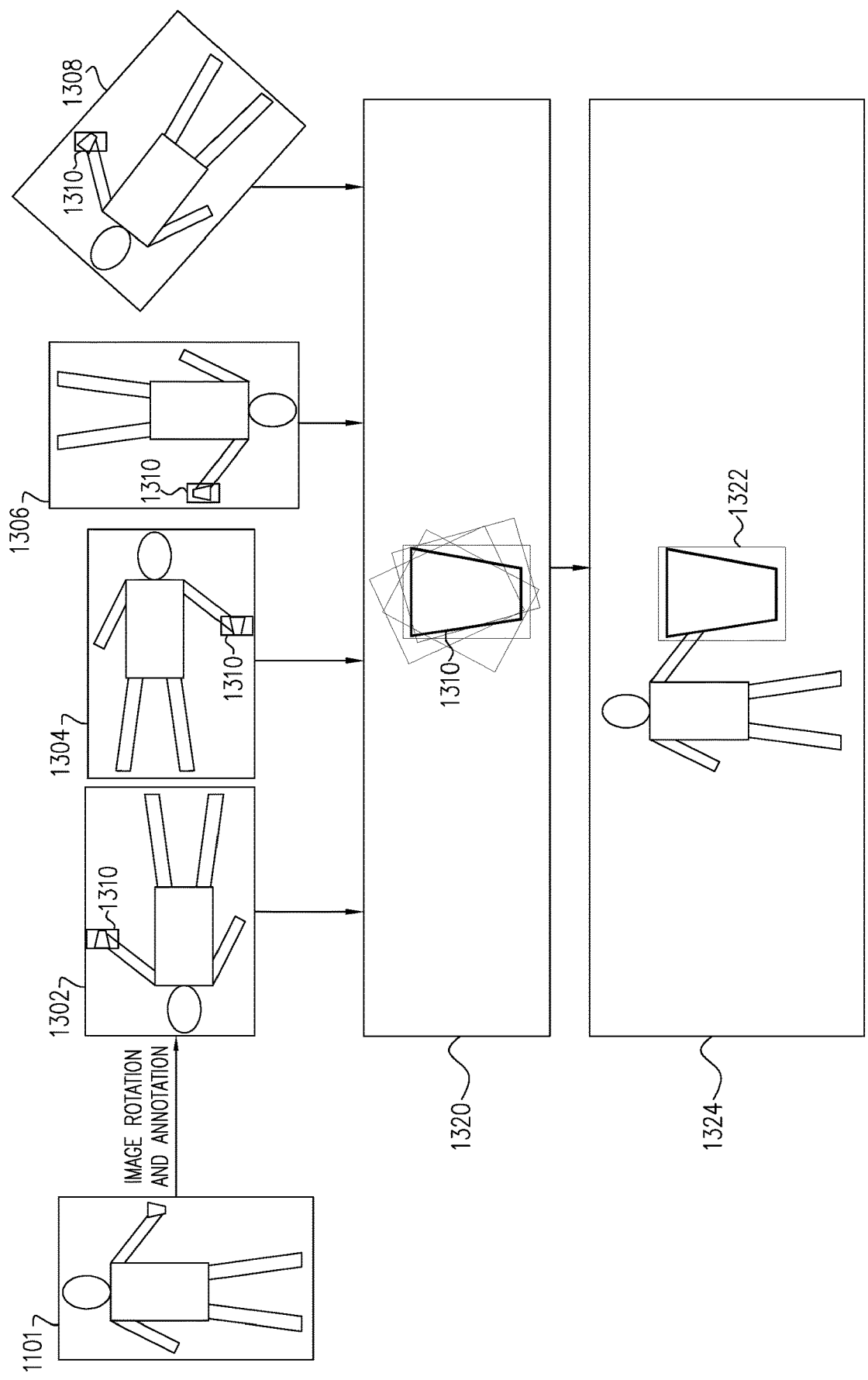

ITEM IDENTIFICATION AND TRACKING SYSTEM

RELATED APPLICATIONS

The present application is a U.S. national stage application of International Application No. PCT/IL2020/051198, filed Nov. 19, 2020. Additionally, reference is hereby made to U.S. Provisional Patent Application No. 62/938,681, entitled 'ITEM IDENTIFICATION AND TRACKING SYSTEM', filed Nov. 21, 2019 and to U.S. Provisional Patent Application No. 62/938,563, entitled 'IMAGE CONVERSION FOR IMAGE PROCESSING', filed Nov. 21, 2019, the disclosures of which are hereby incorporated by reference and priorities of which are hereby claimed pursuant to 37 CFR 1.78 (a) (4) and (5) (i).

Field of the Invention

The present invention relates generally to data analysis and more particularly to systems and methods for analyzing data for the purpose of item identification and tracking.

Background of the Invention

Various types of systems and methods for item identification and tracking are known in the art.

SUMMARY OF THE INVENTION

The present invention seeks to provide improved systems and methods relating to the analysis of data for the purposes of automated, cost-effective and time-efficient item identification and tracking.

There is thus provided in accordance with a preferred embodiment of the present invention a method for acquiring data relating to an object including arranging a multiplicity of cameras to view a scene, at least one reference object within the scene being viewable by at least a plurality of the multiplicity of cameras, each of the plurality of cameras acquiring at least one image of the reference object viewable thereby, finding a point of intersection of light rays illuminating each of the plurality of cameras and correlating a pixel location at which the reference object appears within each the at least one image to the light rays illuminating each of the plurality of cameras and intersecting with the region of intersection, irrespective of a three-dimensional location of the reference object within the scene.

Preferably, the step of correlating includes deriving ray parameters of the light rays illuminating each of the plurality of cameras and corresponding to the pixel location at which the reference object appears within each the at least one image.

Preferably, the method further includes, following the step of correlating, ascertaining whether the light rays having the derived ray parameters intersect with the point of intersection with greater than or equal to a predetermined accuracy.

Preferably, the steps of finding and correlating are performed iteratively with respect to one another, until the light rays having the derived ray parameters are ascertained to intersect with the point of intersection with greater than or equal to the predetermined accuracy.

Preferably, the point of intersection is a probabilistic region of intersection.

There is further provided in accordance with another preferred embodiment of the present invention a system for acquiring data relating to an object including a multiplicity of cameras arranged to view a scene, at least one reference object within the scene being viewable by at least a plurality of the multiplicity of cameras, each of the plurality of cameras being operative to acquire at least one image of the reference object viewable thereby, an image processing sub-system operative to receive the at least one image acquired by each of the plurality of cameras and to find a point of intersection of light rays illuminating each of the plurality of cameras and a pixel-to-ray calibration sub-system operative to correlate a pixel location at which the reference object appears within each the at least one image to the light rays illuminating each of the plurality of cameras and intersecting with the point of intersection, irrespective of a three-dimensional location of the reference object within the scene.

Preferably, the pixel-to-ray calibration sub-system is operative to derive ray parameters of the light rays illuminating each of the plurality of cameras and corresponding to the pixel location at which the reference object appears within each the at least one image.

Preferably, the system is further operative to ascertain whether the light rays having the derived ray parameters intersect with the point of intersection with greater than or equal to a predetermined accuracy.

Preferably, the image processing subsystem and the pixel-to-ray calibration subsystem operative iteratively with respect to one another, until the light rays having the derived ray parameters are ascertained to intersect with the point of intersection with greater than or equal to the predetermined accuracy.

Preferably, the point of intersection is a probabilistic region of intersection.

There is also provided in accordance with another preferred embodiment of the present invention a method for acquiring data relating to an object including at least partially simultaneously acquiring, by a multiplicity of cameras, a plurality of images of a scene containing multiple objects, finding an identity of at least one object of the multiple objects appearing at a location within at least some of the plurality of images, selecting ones of the plurality of images as showing a common object and rejecting other ones of the plurality of images as not showing the common object, the selecting and the rejecting being based on prior inter-calibration of the multiplicity of cameras, outputting a selected set of images showing the common object at the location and finding an identity of the common object shown in the selected set of images, based on taking into account at least one of the identity and location of the at least one object.

Preferably, the selecting and the rejecting is performed irrespective of the identity of the at least one object in the plurality of images.

Preferably, the method also includes performing image filtering following the step of finding an identity of at least one object of the multiple objects appearing at a location within at least some of the plurality of images and prior to the step of selecting, the image filtering including filtering out ones of the plurality of images based on at least one of:
  the identity of the at least one object in the ones of the plurality of images not belonging to a group of object identities, the ones of the plurality of images in which the identity of at the least one object does not belong to the group not being included in the plurality of images participating in the selecting step, and
  a confidence with which the identity of the at least one object is identified falling below a predefined confidence level, the ones of the plurality of images in which the identity of the at least one object is identified with the confidence below the predefined confidence level not being included in the plurality of images participating in the selecting step.

Preferably, the group includes a predetermined group of similar object identities.

Alternatively, the group is based on historically learned categories of similar object identities.

Preferably, the step of finding an identity of at least one object of the multiple objects appearing at a location within at least some of the plurality of images includes employing artificial intelligence (AI) in order to find the identity of the at least one object, the employing of AI including an initial training stage for training an AI network to identify objects in images by providing a multiplicity of training images to the AI network, at least one object appearing in each of the multiplicity of training images being identified to the AI network, and a subsequent operative stage, during which the AI network is operative to perform the step of finding an identity of at least one object, based on the prior training thereof.

Preferably, the at least one object appearing in each of the multiplicity of training images and identified to the AI network is identified based on employing computer vision.

Preferably, the prior inter-calibration of the multiplicity of cameras comprises, prior to the step of at least partially simultaneously acquiring, by a multiplicity of cameras, a plurality of images of a scene containing multiple objects, arranging the multiplicity of cameras to view the scene, at least one reference object within the scene being viewable by at least a plurality of the multiplicity of cameras, each of the plurality of cameras acquiring at least one image of the reference object viewable thereby, finding a point of intersection of light rays illuminating each of the plurality of cameras, correlating a pixel location at which the reference object appears within each the at least one image to the light rays illuminating each of the plurality of cameras and intersecting with the region of intersection, irrespective of a three-dimensional location of the reference object within the scene, thereby establishing pixel-to-ray calibration for the plurality of cameras of the multiplicity of cameras and repeatedly repositioning the at least one reference object within the scene and establishing the pixel-to-ray calibration for the plurality of cameras of the multiplicity of cameras by which the reference object is viewable in each position thereof, until the pixel-to-ray calibration has been established for all of the multiplicity of cameras.

Preferably, the plurality of images of the scene containing multiple objects acquired by the multiplicity of cameras has a first resolution, the method further comprising, prior to the step of finding an identity of at least one object of the multiple objects, converting the first resolution of the plurality of images to a second resolution lower than the first resolution, the step of selecting ones of the plurality of images as showing a common object and rejecting other ones of the plurality of images as not showing the common object and the step of outputting a selected set of images showing the common object at the location, being performed upon the plurality of images having the second resolution, retrieving ones of the plurality of images having the first resolution and corresponding to images of the selected set of images having the second resolution, cropping the retrieved images having the first resolution in a region corresponding to the location of the common object as found in the selected set of images having the second resolution and finding an identity of the common object appearing in the region of the images having the first resolution following the cropping thereof.

Preferably, the identity of the common object appearing in the region of the images having the first resolution is found irrespective of the identity of the common object as found in the images having the second resolution.

There is yet additionally provided in accordance with yet another preferred embodiment of the present invention a system for acquiring data relating to an object including a multiplicity of cameras operative to at least partially simultaneously acquire a plurality of images of a scene containing multiple objects, an image analysis module operative to find an identity of at least one object of the multiple objects appearing at a location within at least some of the plurality of images, an image selection module operative to select ones of the plurality of images as showing a common object and reject other ones of the plurality of images as not showing the common object based on prior inter-calibration of the multiplicity of cameras and to output a selected set of images showing the common object at the location, and an image classification module operative to find an identity of the common object shown in the selected set of images, based on taking into account at least one of the identity and location of the at least one object.

Preferably, the image selection module is operative to select ones and reject other ones of the plurality of images irrespective of the identity of the at least one object in the plurality of images.

Preferably, the system also includes an image filtering module downstream of the image analysis module and upstream of the image selection module, the image filtering module being operative to filter out ones of the plurality of images based on at least one of:
 the identity of the at least one object in the ones of the plurality of images not belonging to a group of object identities, the ones of the plurality of images in which the identity of at the least one object does not belong to the group not being passed on to the image selection module, and
 a confidence with which the identity of the at least one object is identified falling below a predefined confidence level, the ones of the plurality of images in which the identity of the at least one object is identified with the confidence below the predefined confidence level not being passed on to the image selection module.

Preferably, the group includes a predetermined group of similar object identities.

Alternatively, the group is based on historically learned categories of similar object identities.

Preferably, the image analysis module is operative to employ artificial intelligence (AI) in order to find the identity of the at least one object, the employment of AI including an initial training stage for training an AI network to identify objects in images by providing a multiplicity of training images to the AI network, at least one object appearing in each of the multiplicity of training images being identified to the AI network, and a subsequent operative stage, during which the AI network is operative to perform the step of finding an identity of at least one object, based on the prior training thereof.

Preferably, the at least one object appearing in each of the multiplicity of training images and identified to the AI network is identified based on employing computer vision.

Preferably, the prior inter-calibration of the multiplicity of cameras includes the multiplicity of cameras being arranged to view the scene, at least one reference object within the scene being viewable by at least a plurality of the multiplicity of cameras, each of the plurality of cameras being operative to acquire at least one image of the reference object viewable thereby, an image processing sub-system operative to receive the at least one image acquired by each of the plurality of cameras and to find a point of intersection of light rays illuminating each of the plurality of cameras, and a pixel-to-ray calibration sub-system operative to correlate a pixel location at which the reference object appears within each the at least one image to the light rays illuminating each of the plurality of cameras and intersecting with the point of intersection, irrespective of a three-dimensional location of the reference object within the scene, thereby establishing pixel-to-ray calibration for the plurality of cameras of the multiplicity of cameras, the at least one reference object being repeatedly repositioned within the scene and the pixel-to-ray calibration subsystem being operative to establish pixel-to-ray calibration for the plurality of cameras of the multiplicity of cameras by which the reference object is viewable in each position thereof, until the pixel-to-ray calibration has been established for all of the multiplicity of cameras.

Preferably, the plurality of images of the scene containing multiple objects acquired by the multiplicity of cameras has a first resolution, the system further including an image converter upstream from the image analysis module and operative to convert the first resolution of the plurality of images to a second resolution lower than the first resolution, the image analysis module and the image selection module being operative upon the plurality of images having the second resolution, the image classification module being additionally operative to retrieve ones of the plurality of images having the first resolution and corresponding to images of the selected set of images having the second resolution, crop the retrieved images having the first resolution in a region corresponding to the location of the common object as found in the selected set of images having the second resolution, and find an identity of the common object appearing in the region of the images having the first resolution following cropping thereof.

Preferably, the image classification module is operative to find the identity of the common object appearing in the region of the images having the first resolution irrespective of the identity of the common object as found in the images having the second resolution.

There is additionally provided in accordance with a further preferred embodiment of the present invention a method for processing data relating to an object including converting at least one characteristic of a plurality of images from a first characteristic to a second characteristic, automatically finding at least one feature of at least one object appearing in at least some of the plurality of images having the second characteristic, and modifying the images having the first characteristic based on the at least one feature.

Preferably, the at least one characteristic includes image resolution, the first characteristic includes a first image resolution and the second characteristic includes a second image resolution, lower than the first image resolution.

Preferably, the at least one feature includes a location of the at least one object.

Preferably, the modifying includes cropping the images having the first resolution in a region corresponding to the location of the at least one object, based on the location of the at least one object as found in the images having the second resolution.

There is also provided in accordance with yet another preferred embodiment of the present invention a system for processing data relating to an object including an image converter operative to convert at least one characteristic of a plurality of images from a first characteristic to a second characteristic, an image analyzer operative to automatically find at least one feature of at least one object appearing in at least some of the plurality of images having the second characteristic and an image modifier operative to modify the images having the first characteristic based on the at least one feature.

Preferably, the at least one characteristic includes image resolution, the first characteristic includes a first image resolution and the second characteristic includes a second image resolution, lower than the first image resolution.

Preferably, the at least one feature includes a location of the at least one object.

Preferably, the image modifier is operative to crop the images having the first resolution in a region corresponding to the location of the at least one object, based on the location of the at least one object as found in the images having the second resolution.

There is yet further provided in accordance with yet a further preferred embodiment of the present invention a method for processing data relating an object including creating a multi-dimensional model of at least one object in a scene over time, tracking changes in the multi-dimensional model of the at least one object over time, identifying one or more of the changes satisfying at least one predetermined criterion, and analyzing data relating to the changes satisfying the at least one predetermined criterion in order to derive information relating to the object.

There is still further provided in accordance with a still further preferred embodiment of the present invention a system for processing data relating to an object including a model creator operative to create a multi-dimensional model of at least one object in a scene over time, a model tracker operative to track changes in the multi-dimensional model of the at least one object over time and to identify one or more of the changes satisfying at least one predetermined criterion, and a data analyzer operative to analyze data relating to the changes satisfying the at least one predetermined criterion in order to derive information relating to the object.

There is additionally provided in accordance with another preferred embodiment of the present invention a method for processing visual data relating to an object, the method including causing at least one camera to view a scene and employing artificial intelligence for: ascertaining whether at least one output from the at least one camera does or does not contain information indicating the presence and location of at least one object in the scene, and enhancing at least one output that does not contain information indicating the presence and location of the at least one object in the scene by adding thereto information indicating the presence and location of the at least one object in the scene.

Preferably, the added information indicating the presence and location of the at least one object is derived based on outputs from at least two other cameras arrange to view the scene.

Preferably, the enhancing includes identifying at least one pixel location associated with a bounding box indicating the presence and location of the at least one object in the outputs from the at least two other cameras, for each the pixel location, finding a camera ray corresponding thereto, for the at least two other cameras, performing matching between ones of the camera rays to find a point of intersection therebetween, the point of intersection corresponding to the item location, finding a camera ray corresponding to the item location, for the at least one camera having an output not containing information indicating the presence and location of the at least one object, finding a pixel location corresponding to the camera ray, for the at least one camera having an output not containing information indicating the presence and location of the at least one object and inserting a new bounding box in the output from the at least one camera at the pixel location corresponding to the camera ray, the new bounding box indicating the presence and location of the at least one object.

Preferably, the finding the camera ray and the finding a pixel location corresponding to the camera ray are based on prior inter-calibration of the at least one camera and the at least two other cameras.

Preferably, the at least one object includes at least one of a non-human item or a human subject.

There is still additionally provided in accordance with still another preferred embodiment of the present invention a system for processing data relating to an object, including at least one camera arranged to view a scene, and an image analyzer employing artificial intelligence and operative to: ascertain whether at least one output from the at least one camera does or does not contain information indicating the presence and location of at least one object in the scene, and enhance at least one output that does not contain information indicating the presence and location of the at least one object in the scene by adding thereto information indicating the presence and location of the at least one object in the scene.

Preferably, the system also includes at least two other cameras arranged to view the scene, the added information indicating the presence and location of the at least one object being derived based on the outputs from the at least two other cameras.

Preferably, the image analyzer is operative to enhance the at least one output by being operative to identify at least one pixel location associated with a bounding box indicating the presence and location of the at least one object in the outputs from the at least two other cameras, for each the pixel location, find a camera ray corresponding thereto, for the at least two other cameras, perform matching between ones of the camera rays to find a point of intersection therebetween, the point of intersection corresponding to the item location, find a camera ray corresponding to the item location, for the at least one camera having an output not containing information indicating the presence and location of the at least one object, find a pixel location corresponding to the camera ray, for the at least one camera having an output not containing information indicating the presence and location of the at least one object, and insert a new bounding box in the output from the at least one camera at the pixel location corresponding to the camera ray, the new bounding box indicating the presence and location of the at least one object.

Preferably, the image analyzer is operative to find the camera ray and find the pixel location corresponding to the camera ray based on prior inter-calibration of the at least one camera and the at least two other cameras.

Preferably, the at least one object includes at least one of a non-human item or a human subject.

There is further provided in accordance with another preferred embodiment of the present invention a method for acquiring data relating to an object including arranging a multiplicity of cameras to view a scene, at least one reference object within the scene being viewable by at least a plurality of the multiplicity of cameras, each of the plurality of cameras acquiring at least one image of the reference object viewable thereby, finding a point of intersection of light rays illuminating each of the plurality of cameras, and correlating a pixel location at which the reference object appears within each the at least one image to the light rays illuminating each of the plurality of cameras and intersecting with the region of intersection, irrespective of a three-dimensional location of the reference object within the scene, the method further comprising, following the correlating step, at least one of:

at least partially simultaneously acquiring, by the multiplicity of cameras, a plurality of images of the scene containing multiple objects, finding an identity of at least one object of the multiple objects appearing at a location within at least some of the plurality of images, selecting ones of the plurality of images as showing a common object and rejecting other ones of the plurality of images as not showing the common object, the selecting and the rejecting being based on prior inter-calibration of the multiplicity of cameras, outputting a selected set of images showing the common object at the location and finding an identity of the common object shown in the selected set of images, based on taking into account at least one of the identity and location of the at least one object, and converting at least one characteristic of the plurality of images from a first characteristic to a second characteristic, automatically finding at least one feature of at least one object appearing in at least some of the plurality of images having the second characteristic and modifying the images having the first characteristic based on the at least one feature, and creating a multi-dimensional model of the at least one object in the scene over time, tracking changes in the multi-dimensional model of the at least one object over time, identifying one or more of the changes satisfying at least one predetermined criterion, and analyzing data relating to the changes satisfying the at least one predetermined criterion in order to derive information relating to the object, and employing artificial intelligence for ascertaining whether at least one output from at least one camera of the multiplicity of cameras does or does not contain information indicating the presence and location of the at least one object in the scene, and enhancing at least one output that does not contain information indicating the presence and location of the at least one object in the scene by adding thereto information indicating the presence and location of the at least one object in the scene.

There is also provided in accordance with another preferred embodiment of the present invention a method for acquiring data relating to an object including at least partially simultaneously acquiring, by a multiplicity of cameras, a plurality of images of a scene containing multiple objects, finding an identity of at least one object of the multiple objects appearing at a location within at least some of the plurality of images, selecting ones of the plurality of images as showing a common object and rejecting other ones of the plurality of images as not showing the common object, the selecting and the rejecting being based on prior inter-calibration of the multiplicity of cameras, outputting a selected set of images showing the common object at the location, and finding an identity of the common object shown in the selected set of images, based on taking into account at least one of the identity and location of the at least one object, the method further including at least one of:

converting at least one characteristic of the plurality of images from a first characteristic to a second characteristic, automatically finding at least one feature of at least one object appearing in at least some of the plurality of images having the second characteristic and modifying the images having the first characteristic based on the at least one feature, and creating a multi-dimensional model of the at least one object in the scene over time, tracking changes in the multi-dimensional model of the at least one object over time, identifying one or more of the changes satisfying at least one predetermined criterion, and analyzing data relating to the changes satisfying the at least one predetermined criterion in order to derive information relating to the object, and employing artificial intelligence for ascertaining whether at least one output from at least one camera of the multiplicity of cameras does or does not contain information indicating the presence and location of the at least one object in the scene, and enhancing at least one output that does not contain information indicating the presence and location of the at least one object in the scene by adding thereto information indicating the presence and location of the at least one object in the scene.

There is still further provided in accordance with yet another preferred embodiment of the present invention a method for acquiring data relating to an object including converting at least one characteristic of a plurality of images of a scene containing at least one object from a first characteristic to a second characteristic, automatically finding at least one feature of the at least one object appearing in at least some of the plurality of images having the second characteristic, and modifying the images having the first characteristic based on the at least one feature, the method further including at least one of:

creating a multi-dimensional model of the at least one object in the scene over time, tracking changes in the multi-dimensional model of the at least one object over time, identifying one or more of the changes satisfying at least one predetermined criterion, and analyzing data relating to the changes satisfying the at least one predetermined criterion in order to derive information relating to the object, and employing artificial intelligence for ascertaining whether at least one output from at least one camera of a multiplicity of cameras viewing the scene does or does not contain information indicating the presence and location of the at least one object in the scene, and enhancing at least one output that does not contain information indicating the presence and location of the at least one object in the scene by adding thereto information indicating the presence and location of the at least one object in the scene.

There is yet further provided in accordance with a further preferred embodiment of the present invention a method for acquiring data relating to an object including creating a multi-dimensional model of the at least one object in a scene over time, tracking changes in the multi-dimensional model of the at least one object over time, identifying one or more of the changes satisfying at least one predetermined criterion, and analyzing data relating to the changes satisfying the at least one predetermined criterion in order to derive information relating to the object, the method further including employing artificial intelligence for ascertaining whether at least one output from at least one camera of a multiplicity of cameras viewing the scene does or does not contain information indicating the presence and location of the at least one object in the scene, and enhancing at least one output that does not contain information indicating the presence and location of the at least one object in the scene by adding thereto information indicating the presence and location of the at least one object in the scene.

There is also provided in accordance with a preferred embodiment of the present invention a non-transitory computer-readable medium for processing data relating to an object, having stored upon instructions that when executed by the computer cause the computer to perform at least some of the steps of the above-described methods.

BRIEF DESCRIPTION OF THE DRAWINGS

The present invention will be understood and appreciated more fully based on the following detailed description taken in conjunction with the drawings in which:

FIG. 2A is a simplified schematic illustration of components of a calibration subsystem forming part of an item identification and tracking system of the type shown in FIG. 1;

FIG. 13A is a simplified illustration of part of the implementation of FIGS. 9A and 9B showing amelioration of AI failure cases by image modification, in accordance with a preferred embodiment of the present invention;

DETAILED DESCRIPTION OF PREFERRED EMBODIMENTS

Figure 1:
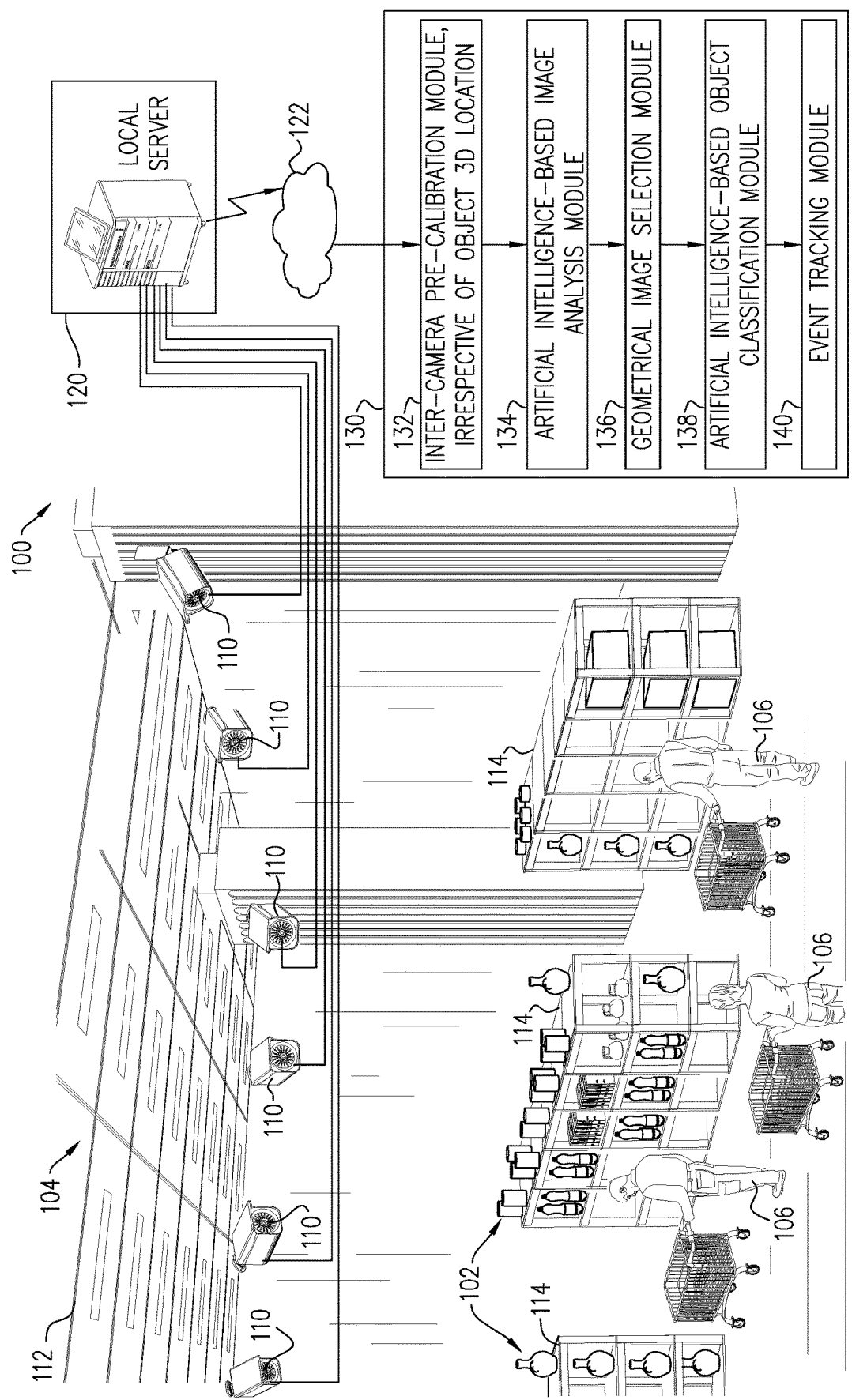
FIG. 1 is a simplified partially pictorial, partially block diagram illustration of a system for item identification and tracking, constructed and operative in accordance with a preferred embodiment of the present invention.

Reference is now made to FIG. 1, which is a simplified partially pictorial, partially block diagram illustration of a system for item identification and tracking, constructed and operative in accordance with a preferred embodiment of the present invention.

As seen in FIG. 1, there is provided a system 100 for identification and tracking of items 102. Items 102 may be located within a premises 104 and are here embodied, by way of example only, as consumer items 102 located within a shopping facility 104 and handled by shoppers 106. It is appreciated, however, that system 100 may be implemented for the identification and tracking of any type of single or multiple items which may be manually or automatedly handled within any suitable facility, including, but not limited to, warehouses, airports, manufacturing facilities and restaurants.

System 100 preferably includes a multiplicity of cameras 110 arranged to view a scene, such as premises 104, and to acquire visual data relating to at least one object therein, such as at least one of items 102 and/or shoppers 106. Multiplicity of cameras 110 is preferably, although not necessarily, mounted on fixed surfaces within premises 104, such as on a ceiling 112 or shelves 114 of premises 104 and is preferably mutually spatially distributed so as to view premises 104 from a variety of angles with respect thereto.

Cameras 110 are preferably operative to acquire images of premises 104, including items 102 and/or shoppers 106 located therein. Cameras 110 may operate continuously, so as to acquire images of premises 104 continuously in at least near real time, or may operate in a mutually coordinated strobed manner, depending on the imaging requirements of system 100. By way of example, cameras 110 may be operative to acquire multiple images per camera per unit in time, such as 25 image frames/camera/second. In certain embodiments of the present invention, cameras 110 may be 2D cameras. Alternatively, in a particularly preferred embodiment of the present invention, cameras 110 may be 3D depth cameras, outputting depth images.

At least some of the images acquired by cameras 110 may be provided to a local server 120 and/or to a cloud-based server 122 for processing by an item identifier and tracker 130. Images may be wholly locally processed at server 120, partially processed at server 120 and partially at cloud-based server 122 or entirely transferred to cloud-based server 122 for processing. At least some of the images provided to local server 120 and/or to cloud based server 122 may be saved either locally or remotely, based on predetermined criteria.

The functionalities of item identifier and tracker 130 may be executed by a processor, for example by a processor of local server 120 and/or cloud based server 122. In accordance with embodiments of the present invention, a computer program application stored in a computer readable medium (e.g. register memory, processor cache, RAM, ROM, hard drive, flash memory, CD ROM, magnetic media, etc.) may include code or executable instructions that when executed may instruct or cause a controller or processor to perform one or more of the functionalities and methods discussed herein, such as a method for automated item identification and tracking. The computer readable medium may be a non-transitory computer readable medium including all forms and types of computer-readable media.

Item identifier and tracker 130 may include an inter-camera calibration module 132, for calibrating multiplicity of cameras 110. Calibration module 132 is preferably operative to calibrate multiplicity of cameras 110 with respect to each other. In a particularly preferred embodiment of the present invention, calibration module 132 is preferably operative to iteratively calibrate multiplicity of cameras 110 with respect to each other, independent and irrespective of a three-dimensional location of a fiducial object with respect to which the cameras 110 are calibrated. Calibration module 132 is preferably operative to calibrate cameras 110 prior to the employment of other image processing functionalities of item identifier and tracker 130, in order to establish highly accurate pixel-to-ray calibration of cameras 110, based on which pixel-to-ray calibration subsequent image processing functionalities of item identifier and tracker 130 may be performed. Further details concerning the preferred operation of calibration module 132 are provided henceforth, with reference to FIGS. 2A and 2B.

Item identifier and tracker 130 may further include an image analysis module 134, preferably employing artificial intelligence for the analysis of images of premises 104 acquired by calibrated cameras 110. All or some of the images acquired by cameras 110 may be provided to tracker 130.

Image analysis module 134 is preferably operative to detect the presence and location of at least one of items 102 and/or shoppers 106 as well as to provide a preliminary identification of at least one item of items 102 appearing in at least some of the images acquired by cameras 110.

It is appreciated that items appearing in various ones of the images simultaneously acquired by cameras 110 may be differently identified by image analysis module 134 in different ones of the images, such that image analysis module 134 outputs a large number of images in which a variety of items are identified. Further details concerning the operation of image analysis module 134 are provided henceforth, with reference to FIG. 3.

Item identifier and tracker 130 may additionally include an image selection module 136, for selecting ones and rejecting other ones of the images in which items have been identified by image analysis module 134. Image selection module 136 is preferably operative to perform the selection of images, preferably based on taking into account inter-calibration of cameras 110, as carried out by calibration module 132. More specifically, image selection module 136 may select images based on geometrical considerations, including geometrical intersection of rays emanating from the objects identified by image analysis module 134 and illuminating cameras 110 and/or geometrical intersection of points in space identified in depth images acquired by cameras 110, in order to identify items occupying a corresponding location and thus corresponding to a common item. Image selection module 136 thus effectively functions as a filter, selecting selected ones of the images provided by image analysis module 134 based on finding a common point of intersection thereof. Further details concerning the operation of image selection module 136 are provided henceforth, with reference to FIG. 3.

Item identifier and tracker 130 may further include an object classification module 138, for fusing the various possibly diverse identities of items in the images selected by image selection module 136 in order to derive a single identity of a common item located at a common location within premises 104. Object classification module 138 may employ artificial intelligence in order to weigh the various diverse identities of items appearing in different images, as identified by image analysis module 134, and derive a single final item classification. Object classification module 138 may additionally or alternatively re-perform object identification and fuse the various diverse identities of items appearing in different images, as identified thereby. The single derived classification is considered to be the identity of a given item at a given location, as found by item identifier and tracker 130. Further details concerning the preferred operation of object classification module 138 are provided henceforth, with reference to FIG. 4.

Item identifier and tracker 130 may further include an event tracking module 140 for tracking events of interest associated with shopper 106 and/or ones of items 102. In accordance with one preferred embodiment of the present invention, event tracking module 140 may be embodied as a shopping list creation module, for automatically tracking events associated with the handling of items 102 by shopper 106. Shopping list creation module 140 may create and maintain an inventory, which inventory may be a shopping list associated with a particular shopper 106, based on the identity and location of at least one item 102, as found by object classification module 138. Items found to be associated with shopper 106 may be considered to belong to the shopping list of shopper 106, thus facilitating automated inventory and payment for items on the shopping list by shopper 106, for example before exit from premises 104. Additionally or alternatively, event tracking module 140 may track events of interest associated with the passage of shopper 106 and/or item 102 within premises 104, for the purpose of analytics. Further details concerning the preferred operation of event tracking module 140 are provided henceforth, with reference to FIGS. 6-8.

It is understood that the various functionalities described as being distributed between calibration module 132, image analysis module 134, image selection module 136, object classification module 138 and event tracking module 140 are sub-divided for the purpose of clarity of explanation thereof and that the various functionalities may alternatively be combinedly carried out by a single operational module or differently distributed between various sub-modules of item identifier and tracker 130, without departing from the scope of the present invention.

It is further understood that, in some embodiments of the present invention, the functionalities of some or all of the modules (132-140) included in item identifier and tracker 130 may be provided independent of one another, as stand alone modules, or in combination with only some of one another or in combination with other components not described here. For example, camera calibration functionality provided by calibration module 132 and described in greater detail henceforth is not limited to use within item identifier and tracker 130 and in combination with all of the other modules described as being included therein. Rather, camera calibration functionality provided by calibration module 132 may be useful for camera calibration in various camera systems and may be applied therewithin without necessarily being accompanied by all or any of other elements of system 100.

Similarly, the image analysis functionality provided by image analysis module 134 and described in greater detail henceforth is not limited to use within item identifier and tracker 130 and in combination with all of the other modules described as being included therein. Rather, image analysis functionality provided by image analysis module 132 may be useful for image analysis in various imaging systems and may be applied therewithin without necessarily being accompanied by all or any of other elements of system 100.

Similarly, the image selection functionality provided by image selection module 136 and described in greater detail henceforth is not limited to use within item identifier and tracker 130 and in combination with all of the other modules described as being included therein. Rather, image selection functionality provided by image selection module 136 may be useful for image selection in various types of imaging systems and may be applied therewithin without necessarily being accompanied by all or any of other elements of system 100.

Similarly, the classification functionality provided by classification module 138 and described in greater detail henceforth is not limited to use within item identifier and tracker 130 and in combination with all of the other modules described as being included therein. Rather, image classification functionality provided by classification module 138 may be useful for classification of various types of images in the context of various types of imaging systems and may be applied therewithin without necessarily being accompanied by all or any of other elements of system 100.

Similarly, the event tracking functionality provided by event tracking module 140 and described in greater detail henceforth is not limited to use within item identifier and tracker 130 and in combination with all of the other modules described as being included therein. Rather, event tracking functionality provided by event tracking module 140 may be useful for event tracking in various imaging as well as non-imaging systems and may be applied therewithin without necessarily being accompanied by all or any of other elements of system 100.

Figure 2B:
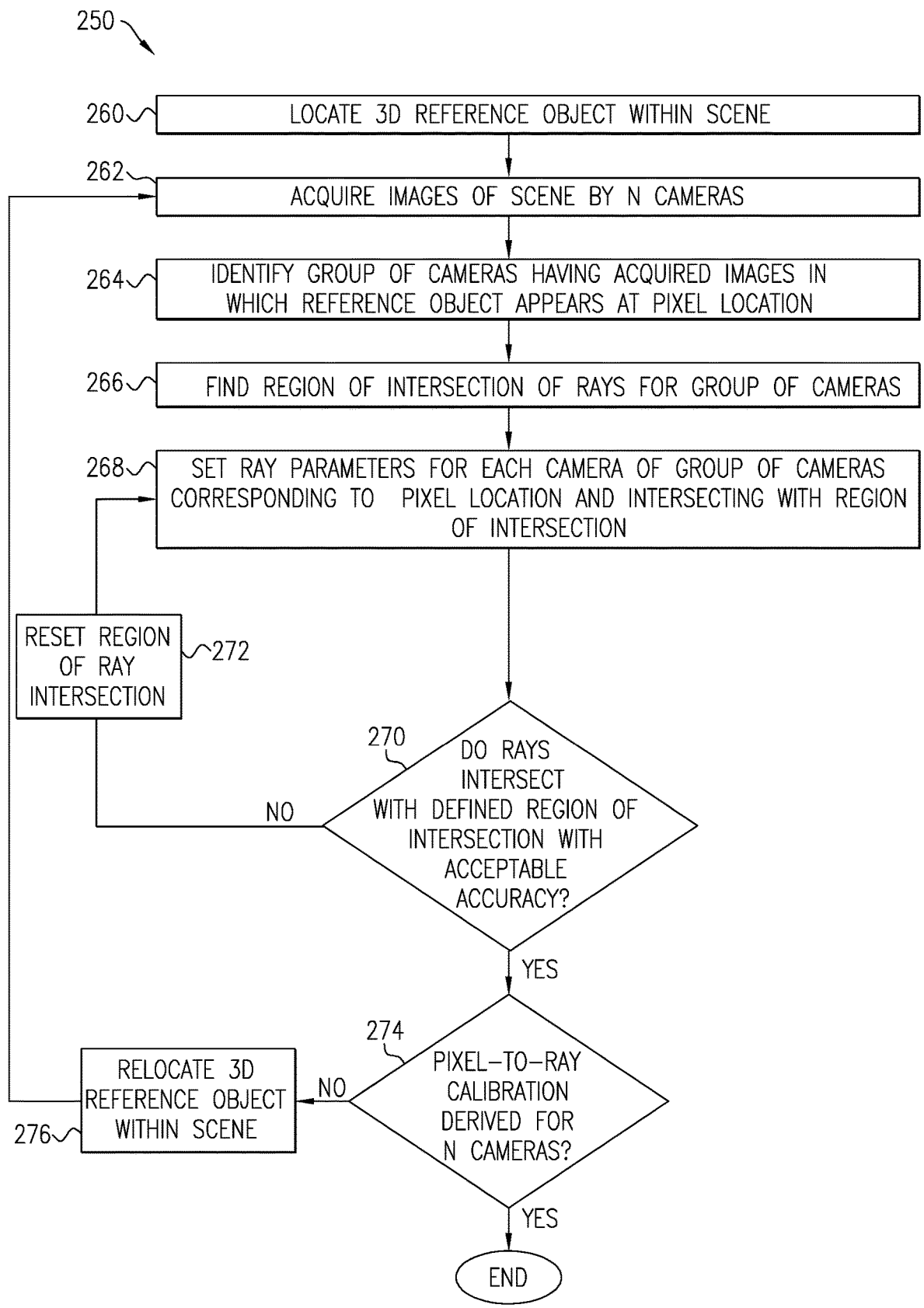
FIG. 2B is a simplified flow chart illustrating steps in the operation of a calibration subsystem of the type shown in FIG. 2A.

Reference is now made to FIG. 2A, which is a simplified schematic illustration of components of a calibration sub-system which may form a part of an item identification and tracking system of the type shown in FIG. 1; and to FIG. 2B which is a simplified flow chart illustrating steps in the operation thereof.

Turning now to FIG. 2A, multiplicity of cameras 110 forming part of item identification and tracking system 100 is seen to include six cameras 110a-110f. It is appreciated that such a quantity of cameras 110 is exemplary and minimized for the purposes of clarity of explanation of the inter-calibration thereof. In actuality, system 100 may typically include less than ten or more than hundreds of cameras 110, or any number in between, depending on the size of premises 104 and the imaging specifications thereof.

As is appreciated by one skilled in the art, cameras 110 are preferably calibrated prior to their employment for image acquisition, for the purposes of item identification and tracking in system 100. Such calibration is preferably carried out by camera calibration module 132 and preferably involves the correlation of pixel locations at which objects appear in images acquired by each of cameras 110 to the light rays emanating from an imaged object and illuminating the corresponding camera sensor pixels, thus allowing correlation of the sensor pixel location to the 3D location of the imaged object in space.

In accordance with a preferred embodiment of the present invention, in order to calibrate multiplicity cameras 110, the multiplicity of cameras 110 is preferably arranged to view a scene containing at least one reference object, here embodied, by way of example as a reference object 200 located within premises 104. Reference object 200 may be a simple fiducial object, such as a ball or patterned item, located so as to be in the line of sight of at least a plurality of multiplicity of cameras 110. Here, by way of example, reference object 200 is seen in FIG. 2A to be viewable by first camera 110a, third camera 110c and fifth camera 110e and not to be viewable by second camera 110b, fourth camera 110d and sixth camera 110f. It is understood that the plurality of cameras by which the reference object 200 is viewable at a given location thereof within premises 104 does not necessarily include all of multiplicity of cameras 110a-110f, although in certain set-ups all of multiplicity of cameras 110a-110f may be capable of viewing reference object 200.

Each of the plurality of cameras by which reference object 200 is viewable, here embodied as first, third and fifth cameras 110a, 110c and 110e, is preferably operative to acquire at least one image of reference object 200. The images acquired of reference object 200 are preferably supplied to an image processing sub-module 220 forming a part of camera calibration module 132. Image processing sub-module 220 is preferably operative to receive the images of reference object 200 acquired by the plurality of cameras capable of viewing reference object 200 and to find an estimated common point of intersection of light rays by which each camera of the plurality of cameras is illuminated. It is appreciated that in order to find such a point of intersection, reference object 200 must be viewable by at least two cameras of multiplicity of cameras 110, so as to allow the finding of a common point of intersection of rays illuminating the at least two cameras, such that the at least two cameras may be calibrated with respect to each other. The point of ray intersection may be found by any appropriate method, various ones of which are known in the art. For example, the point of ray intersection may be found using methods such as a midpoint method, in order to calculate the point having minimal distance to multiple rays, which is the effective point of ray intersection.

Preferably, the estimated point of intersection initially found by image processing sub-module 220 corresponds to a probabilistic region of intersection within which rays illuminating the plurality of cameras are likely to intersect, rather than a specific point in 3D space. The probabilistic region of intersection is considered to correspond to a physical region in 3D space within which reference item 200 is most likely to be located. Camera location and/or orientation may be input to image processing sub-module 220 in order to aid the finding of the initial estimate of the region of intersection but are not necessarily provided. The point of intersection initially found by image processing sub-module 220 may be based, at least in part, on alternative, less accurate calibration methods, which may provide an initial estimate of the location of reference object 200, which initial estimate is subsequently to be refined in accordance with a preferred method of the present invention. The initial estimate of the point of intersection may be found based on calibration methods known in the art, such as Perspective-n-Point (PNP) solutions to estimate the calibration parameters.

A pixel-to-ray calibration sub-module 240, preferably also forming a part of camera calibration module 132, is preferably then operative to correlate a pixel location at which reference object 200 appears within each at least one image acquired by the plurality of cameras 110a, 110c and 110e to light rays illuminating each of the plurality of cameras and intersecting with the point of intersection found by image processing sub-module 220. It is understood that pixel-to-ray calibration sub-module 240 does not require as an input parameter the 3D location of the reference object 200 within premises 104 in order to allow calibration of cameras 110a, 110c and 110e with respect thereto. Rather, individual cameras 110a, 110c and 110e of the plurality of cameras by which reference object 200 is viewable are calibrated with respect to each other, based on ray intersection therebetween. Plurality of cameras 110a, 110c and 110e are thus calibrated with respect to one another and irrespective of an absolute three-dimensional location of the reference object within the scene. It is noted, however, that in certain embodiments of the present invention, camera calibration module 132 may be supplied with the 3D location of reference object 200 with respect to an external, absolute reference frame, in order to link the inter-camera calibration with an external reference frame.

Preferably, image processing sub-module 220 and pixel-to-ray calibration sub-module 240 operate iteratively, such that a region of ray intersection is initially estimated by image processing sub-module 220 and parameters of rays intersecting therewith and illuminating the plurality of cameras 110a, 110c, 110e are initially derived. The ray parameters derived by pixel-to-ray calibration sub-module 240 are then preferably fed back to image processing sub-module 220 in order to further refine the region of ray intersection by image processing sub-module 220 and ray parameters then re-derived based on the newly delineated region of intersection. Such an iterative process may be repeatedly performed until the rays having the iteratively derived ray parameters are found to intersect with the defined region of intersection with an acceptable accuracy, such as to within 1 cm.

It is appreciated that plurality of cameras 110 may advantageously be retrofitted to an existing premises 104 in order to facilitate the implementation of system 100 therein, without requiring other modifications or additions to premises 104. System 100 may therefore be simply and efficiently implemented in a wide variety of premises. It is further appreciated plurality of cameras 110 may include any number of cameras, depending on the size of premises 104 and the distributions of items 102 and shoppers 106 therein, such that system 100 is readily scalable and may be implemented in a premises of any size, including very large premises having a dense arrangement of items 102 and/or shoppers 106 therein.

Ray parameters ascertained by pixel-to-ray calibration sub-module 240 may include extrinsic and/or intrinsic ray parameters. Intrinsic ray parameters may include optical parameters of each of cameras 110a, 110c and 110e, such as optical distortion parameters. Extrinsic ray parameters may include the camera location relative to the reference item 200 and to other ones of cameras 110 and parameters characterizing the rays illuminating each camera sensor pixel in terms of the relative x, y and theta coordinates thereof. Both intrinsic and extrinsic ray parameters may be ascertained by pixel-to-ray calibration sub-module 240. Alternatively, intrinsic ray parameters may be measured by another system and supplied to pixel-to-ray calibration sub-module 240. Both extrinsic and intrinsic ray parameters 240 are preferably individually derived for each of cameras 110a, 110c and 110e.

Turning now to FIG. 2B, steps involved in the inter-camera calibration of the present invention, as may be performed by image processing sub-module 220 and pixel-to-ray calibration sub-module 240 of camera calibration module 132, are illustrated in a process flow chart 250.

As seen at a first step 260, a reference object, such as object 200, is preferably located within a scene. Reference object 200 may be any simple passive object viewable by cameras arranged to acquire images of the scene and is not required to be a complex or active object.

As seen at a second step 262, images of the scene are preferably then acquired by N cameras, wherein N represents the total number of cameras arranged to view the scene. As seen at a third step 264, the group of cameras having acquired images in which the reference object appears is then identified. Typically, the group of cameras does not include all N cameras viewing the scene and reference object 200 is viewable by only a sub-set of the N cameras.

As seen at a fourth step 266, the region of intersection of rays illuminating the group of cameras having acquired images in which the reference object appears at a pixel location is then estimated. As seen at a fifth step 268, ray parameters are then preferably derived for each of the cameras of the group of cameras, which ray parameters define rays intersecting with the region of intersection found at fourth step 264 and corresponding to the pixel location at which the reference object appears in the image acquired thereof by each camera of the group of cameras. Such ray parameters may include intrinsic and extrinsic parameters.

As seen at a query 270, process 250 then queries whether the rays defined at fifth step 268 approach and intersect with the region of intersection defined at fourth step 266 with acceptable accuracy.

In the case that the region of intersection and ray parameters are found to have been ascertained to a sufficient level of accuracy, this region of intersection is considered correspond to the location of the reference object, and the pixel-to-ray calibration to have been derived for those cameras having imaged the reference object at the location thereof.

In the case that the rays having ray parameters derived at fifth step 268 are not found to intersect with the point of intersection to a sufficient level of accuracy, the region of intersection may be refined based on the ray parameters derived at fifth step 268, as seen at a sixth step 272, and fifth step 268 and sixth step 272 may be iteratively repeated, whereby ray parameters are re-derived based on the most recently defined point of intersection and the point of intersection then redefined based on the newly derived ray parameters, until the ray parameters are found to intersect with the point of intersection with sufficient accuracy, as ascertained at query 270.

Following the performance of pixel-to-ray calibration with sufficient accuracy, as ascertained at query 270, process 250 preferably ascertains whether pixel-to-ray calibration has been derived for all N cameras viewing the scene, as seen at an additional query 274. In the case that not all of the N cameras have been calibrated, the reference object is preferably re-located within the scene, so as to be viewable by a different group of cameras, as seen at a seventh step 276. Steps 262-274 may then be repeated, until pixel-to-ray calibration has been performed for all N cameras and calibration is considered to have been completed.

It is appreciated that the group of cameras by which the reference object is viewable in the new location thereof may overlap with the group of cameras by which reference object was previously viewable, such that ones of cameras of the total N cameras are calibrated multiple times, but with respect to a different reference object location and a different group of cameras each time.

It is understood that the particular method of inter-camera calibration described herein with reference to FIGS. 2A and 2B is not limited to implementation within the context of an item identification and tracking system of the present invention, but rather may be useful for inter-camera calibration in a variety of other applications benefitting from rapid and accurate calibration of at least two cameras viewing a common scene.

Figure 3:
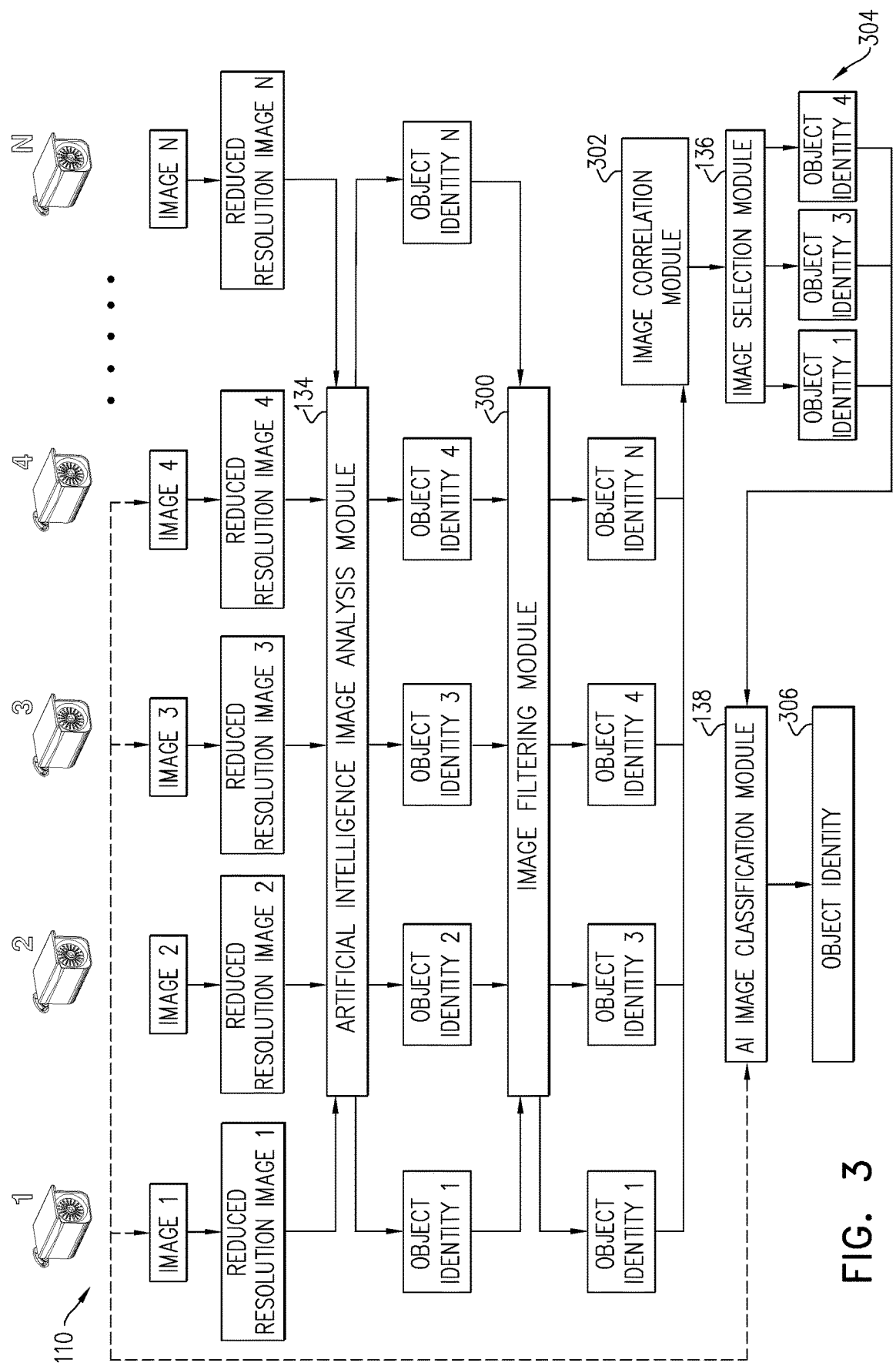
FIG. 3 is a simplified block diagram illustration of system components having image analysis and classification functionalities, forming part of an item identification and tracking system of the type shown in FIG. 1.

Reference is now made to FIG. 3, which is a simplified block diagram illustration of system components performing image analysis and classification functionalities, which may form a part of an item identification and tracking system of the type shown in FIG. 1.

As seen in FIG. 3, multiplicity of cameras 110 of item identification and tracking system 100 is here shown to include camera 1 to camera N. System 100 may include a large number of cameras, such as over 100 cameras, or a smaller number of cameras, such as 10 cameras, depending on the size of premises 104 (FIG. 1).

As described hereinabove with reference to FIG. 1, cameras 110 are preferably arranged to view a scene containing multiple objects, such as consumer items 102 and individuals 106 (FIG. 1) and to acquire images thereof. Cameras 1-N are preferably operative to acquire a plurality of images of the scene at least partially mutually simultaneously. Here, by way of example, cameras 1-N are shown to be operative to acquire images 1-N. It is appreciated, however, that more than one image may be acquired by each of cameras 1-N and that not every camera of plurality of cameras 1-N is necessarily operative to acquire an image. Cameras 110 may be conventional 2D cameras or may be cameras including a depth sensor, such as stereo cameras, time of flight cameras or structured light cameras, providing 3D images containing depth information.

It is appreciated that the acquisition of images by cameras 1-N as illustrated in FIG. 3 represents the simultaneous operation of cameras 1-N at a given time frame. In operation of system 100, cameras 1-N are preferably operative acquire such images multiple times per second, which images are preferably processed as outlined hereinbelow with reference to FIG. 3.

It is understood that cameras 1-N are preferably calibrated prior to the acquisition of images 1-N thereby. Cameras 1-N may be inter-calibrated as described hereinabove with reference to FIGS. 2A-2B.

Images 1-N are preferably provided to an image analysis module, preferably embodied as image analysis module 134 of item identification and tracker 130 (FIG. 1).

In accordance with one preferred embodiment of the present invention, images 1-N acquired by cameras 110 are preferably pre-processed prior to the provision thereof to image analysis module 134. Preferably, the pre-processing involves converting at least one characteristic of the plurality of images 1-N from a first characteristic to a second characteristic. In accordance with one preferred embodiment of the present invention, images 1-N are reduced in resolution prior to analysis thereof by image analysis module 134. Here, by way of example, images 1-N having a first resolution are seen to be converted to corresponding reduced resolution images 1-N having a second resolution, which second resolution is lower than the first resolution. It is appreciated that such pre-processing, including for example reduction in image resolution, may be carried out by image analysis module 134 itself or by another component, such as an image converter module, forming a part of system 100.

The pre-processing of images 1-N and the conversion of at least one characteristic thereof is preferably carried out in order to reduce the computing power required to process images 1-N by image analysis module 134. Here, by way of example, the reduction of resolution of images 1-N reduces the computing power required to process the images. It is appreciated, however, that characteristics of images 1-N other than resolution may alternatively be converted in order to reduce the computing power required to process the images. By way of example only, images may be compressed or additional information may be used to focus on the area of interest within the image, for example an area wherein motion is detected. However, the original, for example higher resolution images acquired by cameras 1-N are preferably retained and stored in system 100, and optionally subsequently processed by image classification module 138 as is further detailed hereinbelow.

Preferably, system 100 is operative to automatically find at least one feature of at least one object appearing in at least some of plurality of images 1-N having the second characteristic, such as reduced resolution, and to modify the images having the first characteristic, such as the original greater resolution, based on the at least one feature found, as is further described hereinbelow.

Image analysis module 134 is preferably operative to receive plurality of images 1-N, and particularly preferably plurality of reduced resolution images 1-N, and to detect the presence and find an identity of at least one object of the multiple objects imaged by cameras 1-N and appearing in at least some of plurality of images 1-N. It is appreciated that the imaged object of interest may be one or more consumer items, such as item 102 (FIG. 1), one or more individuals, such as shopper 106 (FIG. 1) or both. Here, by way of example, image analysis module 134 preferably identifies object identity 1-object identity N in corresponding images 1-N, in the case that the object is an item such as item 102. Further details concerning the operation of image analysis module 134 in the case that the object of interest is a person are provide henceforth.

It is appreciated that object identities 1-N may be diverse identities or may include at least some common object identities. Object identities 1-N may be diverse identities due to images 1-N showing different objects, which different objects are correspondingly differently identified by image analysis module 134. Additionally or alternatively, object identities 1-N may be diverse identities due to the imaged objects being differently identified by image analysis module 134, despite at least some of images 1-N showing at least partially the same object. This may be the case due to the same object being imaged in at least some of images 1-N at different imaging angles, from different viewpoints and with different imaging parameters by cameras 1-N, leading to the same object in two or more of images 1-N being assigned a different identity by image analysis module 134. It is appreciated that images 1-N may show multiple objects and that image analysis module 134 may be operative to identify multiple object identities within each of images 1-N.

In accordance with a particularly preferred embodiment of the present invention, image analysis module 134 is preferably operative to detect the presence of objects and find the identities thereof, such as object identities 1-N in reduced resolution images 1-N. Preferably, although not necessarily, image analysis module 134 employs artificial intelligence. It is appreciated that artificial intelligence based analysis of images may be performed on 2D or 3D images. Preferably, image analysis module 134 is operative to annotate images 1-N by inserting bounding boxes therein indicating the location of objects therein. Further preferably, image analysis module 134 is operative to assign a confidence level to each object identity identified thereby, which confidence level preferably expresses both the confidence with which the presence of an object has been detected and the confidence with which the identity of that detected object has been identified by analysis module 134.

It is appreciated that such a detection and identification artificial intelligence-based process is highly computationally demanding and would typically take a considerable amount of time to perform by computing devices located in one or both of local server 120 and cloud 122 (FIG. 1). The conversion of the high resolution images acquired by cameras 110 to lower resolution images before the performance of such image analysis by image analysis module 134 is therefore highly advantageous, since the required computing power and processing time involved in object detection and identification is thereby significantly reduced. It is understood, however, that in certain cases such resolution reduction may not be necessary, and high resolution images 1-N may be directly provided to and processed by image analysis module 134 without any prior reduction in the resolution thereof.

Typically, in employing artificial intelligence for the purpose of object identification in images of the present invention, image analysis module 134 is initially trained so as to be capable of automatically identifying objects in images. Such training may comprise the provision of a multiplicity of training images to an AI network which may be included in image analysis module 134, wherein at least one object appearing in each of the multiplicity of training images is identified to the AI network of image analysis module 134. The identification of objects appearing in the training images and provided to image analysis module 134 may involve human identification. More preferably, the identification of objects appearing in the training images and provided to image analysis module 134 may involve machine identification, based on machine vision. Further details concerning the generation of data for training such an algorithm is provided henceforth with reference to FIGS. 9A-18.

Following training, image analysis module 134 is preferably operative to automatically identify objects in the images provided thereto, based on artificial intelligence.

Optionally, object identified images 1-N may be supplied to an image filtering module 300, downstream from image analysis module 134 and upstream from image selection module 136. Image filtering module 300 is preferably operative to receive the plurality of images having at least one object identified therein from image analysis module 134, here embodied as object identified images 1-N. Image filtering module 300 is preferably operative to filter out one or more of the plurality of images.

The filtering performed by image filtering module 300 may be based on an identity of at least one object identified in the images as not belonging to a defined group of object identities. The at least one image in which the identity of an object identified therein does not belong to a defined group of object identities is preferably not provided by image filtering module 300 to image selection module 136.

Here, by way of example, image filtering module 300 is shown to receive object identified images 1, 2, 3, 4 and N. For example, object identities 1, 3, 4 and N may be members of a defined group of object identities, whereas object identity 2 may be outside of that defined group of object identities, due to being highly dissimilar from object identities 1, 3, 4 and N. In this case, only object identified images 1, 3, 4 and N are provided to downstream components of system 100 and object identified image 2 is not. In this manner, images having objects identified therein which are clearly and unambiguously different than objects identified in other images simultaneously acquired of a scene are rejected.

The defined group of object identities applied by image filtering module 300 may be a predetermined group of clustered, similar, object identities or may be a dynamic group defined during the course of operation of system 100. Additionally or alternatively, the defined group may be defined based on historically learned categories of similar object identities, based on past operation of system 100 or other systems similar thereto.

Additionally or alternatively, image filtering module 300 may be operative to filter out one or more of the plurality of images provided thereto by image analysis module 134, based on applying a threshold confidence level to the confidence with which an item is detected and identified by image analysis module 134. In this mode of operation of image filtering module 300, items detected and identified with a confidence less than a predefined confidence level are filtered out by filtering module 300 and not provided to downstream components of system 100.

Object identified images 1-N, optionally having been filtered by image filtering module 300, are preferably supplied to an image correlation module 302. Image correlation module 302 is preferably operative to correlate the plurality of pixel locations at which the at least one object identified in each of the images supplied thereto appears to a corresponding plurality of rays illuminating the plurality of cameras and to find a point of intersection of at least some of the plurality of rays. The point of ray intersection may be found by any appropriate method, various ones of which are known in the art. For example, the point of ray intersection may be found using methods such as a midpoint method, in order to calculate the point having minimal distance to multiple rays, which is the effective point of ray intersection.

Here, by way of example, image correlation module 302 is preferably operative to receive images 1, 3, 4, and N having objects identified therein at corresponding pixel locations and to correlate the pixel locations at which the objects appear to rays illuminating cameras 1, 3, 4 and N, image correlation module 302 preferably finding a point of intersection of at least some of the rays.

It is appreciated that such correlating of the pixel location at which the object appears in the image to parameters of rays illuminating the camera by which the image is acquired is preferably based on the pixel-to-ray calibration initially performed by camera calibration module 132, which pixel-to-ray calibration prior established the correlation of pixels to rays for each camera of multiplicity of cameras 110.

An image selection module, preferably embodied as image selection module 136 (FIG. 1), is preferably then operative to select only those images in which the at least one identified object appears at a pixel location corresponding to a ray intersecting with the point of intersection found by image correlation module 302. It is understood that the point of intersection of some of the plurality of rays is considered to correspond to the 3D location of a common, individual object in space, such that images showing an object at a pixel location corresponding to a ray intersecting with the point of intersection may be considered to be images showing that common object located at that point of ray intersection. It is appreciated that this is based on the understanding that the probability of various light rays illuminating camera sensor pixels and intersecting in 3D space is negligible, unless the various light rays illuminating the cameras indeed emanate from the same imaged physical point in space.

Image selection module 136 is thus preferably operative to select ones of the plurality of images showing a common object and reject other ones of the plurality of images not showing a common object. The selecting and rejecting performed by image selection module 136 is preferably based on prior inter-calibration of the plurality of cameras, which prior inter-calibration serves to establish the correlation between pixel locations in the images acquired by cameras 110 and parameters of rays illuminating cameras 110. It is appreciated that image selection module 136 thus preferably functions as a geometrical selection module, operative to select images based on the geometrical intersection of camera rays in 3D space.

Image selection module 136 is preferably operative to output a selected set of images having been identified thereby as showing a common object lying at a location corresponding to a point of ray intersection. The location in 3D space corresponding to the found point of intersection is considered to correspond to the 3D location of the object. In one preferred embodiment of the present invention, the object may be modelled as a point in 3D space located at the point of ray intersection, as is further detailed henceforth with reference to FIGS. 6-8.

Here, by way of example, image selection module 136 is shown to output a selected set of images 304 including object identified images 1, 3 and 4. Selected set of images 304 does not include object identified image N, which object identified image N has been rejected by image selection module 136 as showing an item at a pixel location corresponding to an illumination ray not intersecting with the point of ray intersection found by image correlation module 302.

It is appreciated that the selecting and rejecting performed by image selection module 136 is preferably based on prior inter-camera calibration, and more specifically preferably based on geometrical filtering based on ray intersection as found by prior inter-camera calibration, and thus may be performed irrespective of the identity of the at least one object in the plurality of images. Image selection module 136 may be operative to select and reject images based on object location therein, rather than object identity, as found by image analysis module 134.

Alternatively, image selection module 136 may be operative to take into account object identity, as found by image analysis module 134, in order to augment the geometrical image selection carried out thereby. In certain embodiments, images may be grouped into cliques at image selection module 136, whereby each clique is comprised of images having similar objects identified therein. Image selection module 136 may then be operative to compare item locations and identify images showing an object located at a point of ray intersection only for those images within each clique, rather than for all images. Such an approach may expedite the geometrical image selection carried out by image selection module 136.

It is appreciated that the above-described operation of image correlation module 302 and image selection module 134, based on ray intersection, is particularly well suited to the processing of 2D images acquired by cameras 110. However, in the case that cameras 110 are embodied as depth cameras such that object identified images 1-N contain depth information, image correlation module 302 and image selection module 134 may operate in an alternative manner.

In this embodiment of the present invention, image correlation module 302 may be operative to find the 3D location of an item identified in any given one of the object identified images 1-N input thereto, based on the depth information contained in object identified images 1-N. Image selection module 134 may then ascertain whether the 3D item location in the given image matches the 3D item location of items in any of the other ones of object identified images 1-N. In the case that the item locations are found to be congruent, the items are considered to lie at a common location in space and thus to correspond to the same physical item.

The images selected by image selection module 136, based on ray intersection in the case of 2D images or congruent 3D location in the case of 3D depth images, thus may be considered to form a set of images considered to show the same item at the same physical location. It is appreciated that image selection module 136 thus effectively acts as a geometrical filtering module, rejecting images not found to show the same item at the same location. It is understood that, at this stage in the operation of the system of the present invention, the specific final identity of the item has not yet been ascertained.

The images selected by image selection module 136 are preferably then provided to an item classification module, preferably embodied as object classification module 138 (FIG. 1). Classification module 138 is preferably operative to receive the selected set of images output by image selection module 136 and to find an identity of at least one object shown the selected set of images, which object is preferably a common object occupying a given region in 3D space. In contrast to image selection module 136, which may not take into account object identity within the images received thereby, classification module 138 is preferably operative to derive the object identity by taking into account the object identities in the selected set of images. It is appreciated that establishing an object identity based on images acquired by multiple cameras advantageously serves to reduce errors and improve the accuracy of item identification, in contrast to establishing object identity based on images thereof acquired by a single camera.

As described hereinabove, despite the selected images having been selected based on all showing a common object occupying a common point in space, image analysis module 134 may have assigned diverse object identities to the common object, due to variations in the appearance of the common object in different ones of the images thereof. Classification module 138 is preferably operative to fuse the various diverse object identities in the selected set of images and to derive a single object identity 306, which single object identity is considered to be the final ascertained identity of the common object. Classification module 138 is preferably operative to fuse the various diverse object identities based on combining and weighing of the different object identities.

In one preferred embodiment of the present invention, classification module 138 is operative to receive the various object identities in the selected set of images, as found by image analysis module 134, and to fuse the various identities based at least in part on the confidence level assigned to each one by image analysis module 134, in order to derive a single final object identity. Such identity fusion may be based on machine learning. The single final object identity derived by image classification module 138 may also have a confidence level associated therewith. It is appreciated that, due to the reduced resolution of the images analyzed by image analysis module 134, the confidence associated with the various object identities identified therein, and hence the confidence associated with the final fused object identity based thereon, may be unacceptably low.

In such a case, in accordance with an additional preferred embodiment of the present invention, classification module 138 may be operative to re-perform object identification. Initial high resolution images corresponding to the low resolution images analyzed by image analysis module 134 and forming selected set of images 304 may be retrieved and provided to classification module 138. Classification module 138 may be operative to modify the high resolution images, for example by cropping the high resolution images in the region of the item location as identified by image analysis module 134. Classification module 138 may then be operative to re-find the item identity in the cropped, high resolution image.

It is appreciated that due to the higher resolution of the images processed by classification module 138, the accuracy of the item identity found thereby is typically greater than the accuracy of the item identity found in corresponding reduced resolution images by image analysis module 134. Furthermore, due to the high resolution images being cropped, classification module 138 is operative to classify the item identity within a more confined image region, thus reducing the required computing power and processing time. As a result, the confidence associated with the final object classification, as output by the classification module 138 based on image analysis of high resolution images, may be greater than that based on the item identities provided by image analysis module 134 based on images of lower resolution. The images as analyzed by image analysis module 134 thus serve to direct the modification, for example cropping, of the higher resolution images, in order to allow the identity of items appearing therein to be found with greater accuracy.

As seen in FIG. 3, by way of example, selected set of reduced resolution images 304 comprising images 1, 3 and 4 having corresponding objects 1, 3 and 4 identified therein may be directly provided to image classification module 138. Classification module 138 may then retrieve corresponding high resolution images 1, 3 and 4, crop high resolution images 1, 3 and 4, and re-perform item identification and classification on the cropped high resolution images, in order to derive item identity 306. It is understood that, in this embodiment, classification module 138 may function as an image modifier, for modifying the original higher resolution images, based on the lower resolution images.

It is appreciated that in the case that classification module 138 re-performs item identification on the original high resolution images, the derivation of final item identity 306 may or may not take into account the item identity derived based on the low-resolution images, as processed by image analysis module 134.

It is understood that in the case that a characteristic of original images 1-N other than resolution was converted, classification module 138 may operate in a similar manner as described hereinabove, to retrieve the original non-modified images, and use the converted images requiring less processing power, to direct the analysis of the original images, in order to allow the identity of items appearing therein to be found with greater accuracy.

Figure 4:
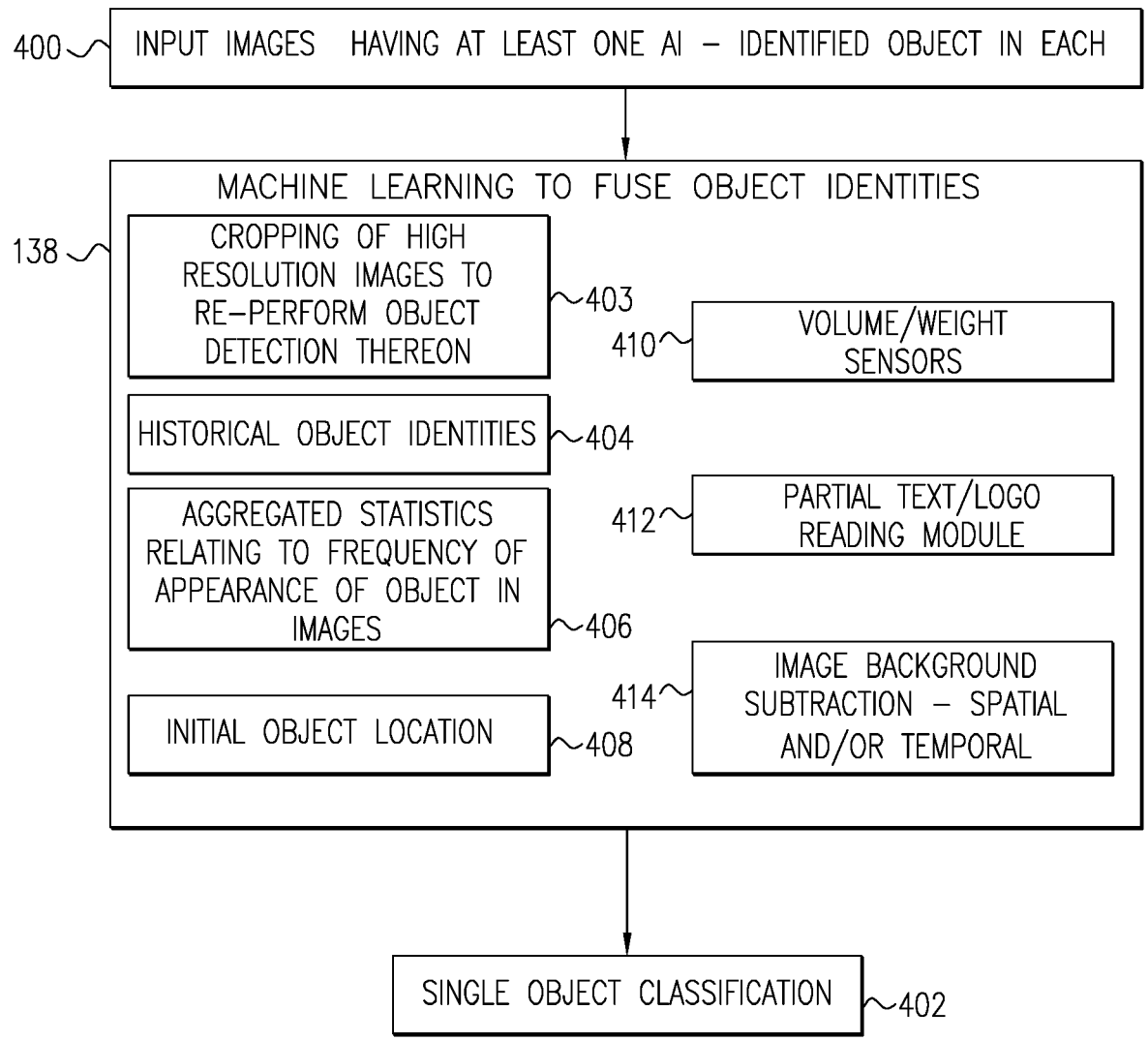
FIG. 4 is a simplified block diagram illustrating machine learning as carried out by image analysis and classification components of the types shown in FIG. 3.

Further details concerning the operation of classification module 138 and particularly the manner in which classification module 138 is operative to balance the diverse object identities in order to derive a single final object identity are provided henceforth, with reference to FIG. 4.

It is appreciated that the image processing functionalities described hereinabove with respect to components of system 100 shown in FIG. 3, are described with respect to the identification of the location and identity of an item, such as item 102, within premises 104 (FIG. 1). It is understood, however, that in certain cases it may be desirable to additionally or alternatively find the location of an individual, such as shopper 106, within premises 104 (FIG. 1) based on the imaging of shopper 106 by cameras 110.

In the case of finding the presence and location of an imaged individual, such as shopper 106 (FIG. 1), it is understood that the finding of the identity of shopper 106 is not necessarily relevant. In this case, therefore, artificial intelligence image analysis module 134 is preferably operative only to find the presence and location of shopper 106. Preferably, this is achieved by image analysis module 134 finding the presence and location of shopper 106, preferably based on employing an AI algorithm. Preferably, image analysis module 134 creates a pose graph representing the body of shopper 106. Such a pose graph may comprise a number of key points corresponding to key locations on the body of shopper 106. These key points are preferably labeled in order to indicate the location thereof on the body of shopper 106. Further details concerning the AI processing of images in order to identify the presence and location of individuals therein are provided henceforth with reference to FIGS. 15A-17D.

It is further understood that images having individuals such as shopper 106 identified therein by a pose graph may be supplied to image correlation module 302. Image correlation module 302 is preferably operative to correlate the plurality of pixel locations at which the key points in the pose graphs in each of the images supplied thereto appears to a corresponding plurality of rays illuminating the plurality of cameras and to find a point of intersection of at least some of the plurality of rays. Key points corresponding to a common point of ray intersection are hence considered to correspond to the same body location on shopper 106.

It is appreciated that the reduction of resolution in images and subsequent retrieval of the original, higher resolution images is not necessarily required with respect to the processing of images of human subjects, due to the increased capability of AI algorithms to rapidly and accurately process such images, in comparison to images of non-human objects.

Reference is now made to FIG. 4, which is a simplified block diagram illustrating machine learning as carried out by image analysis and classification components of the types shown in FIG. 3.

As seen in FIG. 4, a set of input images 400 having at least one object identified therein is preferably provided to classification module 138, for example by image analysis module 134, via image filtering module 300, image correlation module 302, and image selection module 136 (FIG. 3). For example, set of input images 400 may correspond to selected images 304 of FIG. 3. The at least one object identified in the set of input images 400 is preferably identified based on artificial intelligence, as employed by image analysis module 134. The artificial intelligence employed by image analysis module 134 in order to identity objects in the images input thereto may comprise deep learning, neural networks, or any other type of artificial intelligence approach to object identification.

Image analysis module 134 preferably receives a plurality of images acquired by a plurality of cameras, such as cameras 110 (FIGS. 1 and 3) viewing a scene and employs artificial intelligence for automatically finding a plurality of identities of a corresponding plurality of objects appearing in the plurality of images, as described hereinabove with reference to FIG. 3. The resolution of the plurality of images acquired by the plurality of cameras may be reduced prior to the further processing thereof by image analysis module 134, in order to reduce required computing power and accelerate the image processing.

Image selection module 136 preferably selects selected ones of the plurality of images based on calibration of the plurality of cameras with respect to a location of an object forming part of the plurality of objects imaged by the cameras and appearing in each image of the selected images, as further described hereinabove with reference to FIG. 3.

Image classification module 138 preferably receives the selected ones of the plurality of images and employs machine learning for deriving an identity of the object appearing in the selected images.

Classification module 138 is preferably operative to derive a single final object identity 402 based on employing machine learning to weigh and combine the different object identities input thereto, which different object identities are preferably found by employing artificial intelligence. It is appreciated that the system of the present invention thus preferably employs 'double' machine learning, wherein diverse multiple object identities originally identified based on employing artificial intelligence are fused, based on employing machine learning, in order to derive a single ultimate object identity.

In one possible embodiment of the present invention, classification module 138 weighs diverse object identities based on taking into account the relative numbers of images identified as showing a common object with a given identity. For example, in the case that a first identity is assigned to a common item in 80% of input images 400 and a second different identity is assigned to the same item in 20% of input images 400, classification module 138 is preferably operative to give greater weight to the first identity.

In one preferred embodiment of the present invention, as described hereinabove with reference to FIG. 3, classification module 138 is operative to derive the identity 402 of the object appearing in the selected ones of the plurality of images at least based on fusing the plurality of identities of the corresponding plurality of objects in the selected ones of the plurality of images, as found by the image analysis module 134.

As described hereinabove with reference to FIG. 3, in certain embodiments of the present invention image analysis module 134 is operative to perform object detection and identification based on reduced resolution input images, wherein the reduced image resolution is desirable in order to minimize the required computing power and processing time. However, due to the low resolution of the input images, the confidence associated with the object identities found based thereon may be relatively low. The confidence associated with the object identity 402 derived based on the object identities found by image analysis module 134 using low resolution input images may therefore be unacceptably low.

In order to increase the confidence associated with object identity 402, classification module 138 may optionally include a sub-module 403 operative to crop high resolution images and to subsequently re-perform object detection and identification on the cropped high resolution images, as also described hereinabove with reference to FIG. 3.

Sub-module 403 may be operative to retrieve at least some of the plurality of initial images having a first, higher resolution, as captured by cameras 110. Sub-module 403 may then crop each of the higher resolution images in a region corresponding to the location of an identified object appearing in corresponding respective ones of the second, lower resolution images. Object identification in the lower resolution images, as carried out for example by image analysis module 134 (FIG. 3) thus serves to direct the cropping of the original corresponding higher resolution images, as carried out for example by sub-module 403.

Sub-module 403 may then employ artificial intelligence to automatically find identities of objects in the cropped first, higher resolution images and to derive the identity of an object appearing in the higher resolution images, at least based on fusing the plurality of identities of a corresponding plurality of objects in the selected cropped plurality of higher resolution images. Due to the higher resolution images having been cropped, the image detection and identification is confined to a smaller image region, and the required computing time and power thus reduced. Final object identity 402 may thereby be derived with a greater confidence level based on the cropped higher resolution images. It is appreciated that the object identity 402 that would have been derived with a lower associated confidence level, based on the corresponding lower resolution images, may or may not be taken into account in deriving the object identity 402 based on the higher resolution images. It is also appreciated that should the object identity 402 based on the lower resolution images be found with a sufficient level of confidence, additional processing by sub-module 403 may be unnecessary.

The machine learning employed by classification module 138 in order to fuse the diverse object identities input thereto, which object identifies may be based on higher and/or lower resolution images as described hereinabove, may be augmented by various inputs. By way of example, in fusing diverse object identities in order to derive a single final object identity, classification module 138 may take into account historically found object identities as one input factor 404. In this case, aggregated shopper statistics may indicate a range of items typically selected by shoppers having previously selected given items. Based on the identity of items already selected by a shopper 106 as preferably generated by shopping list creation module 140 (FIG. 1), classification module 138 may give greater weight to object identities corresponding to items typically expected to be selected by a given shopper 106 based on other items previously selected by the shopper 106. It is appreciated that such aggregated shopper statistics are preferably aggregated anonymous statistics and are not specific to a given shopper 106.

Additionally or alternatively, in fusing diverse object identities in order to derive a single final object identity, classification module 138 may take into account aggregated historical data relating to a frequency at which a given object appears in images, as an additional input factor 406. For example, in the case that a common item appearing in input images 400 is assigned two possible identities with mutually equal weights by image analysis module 134, the item identity corresponding to an item that is more frequently typically selected by shoppers, based on aggregated historical data, may be given greater weight by classification module 138.

Further additionally or alternatively, in fusing diverse object identities in order to derive a single final object identity, classification module 138 may take into account a location of an object within the scene based on a predetermined model of the at least one object within the scene, as an additional input factor 408. For example, an initial location of an item within premises 104 may be provided to classification module 138 and, based on a premises planogram, the identity of the item derived accordingly from among various object identities.

Furthermore, volume or weight sensors 410 may be located within premises 104 in order to provide data aiding object identification, particularly in the case of small items of the size of the order of the hand of a shopper 106 or smaller, which items may be difficult to identity in images. Volume or weight sensors 410 may record an initial weight of a surface on which an item 102 rests and a subsequent weight of the surface, following removal of the item therefrom. The difference in weight may be indicative of the weight of the removed item and hence aid identification thereof. Such volume or weight data may be provided to classification module 138 in order to aid fusion of diverse object identities. Such volume or weight data may additionally or alternatively be provided to image analysis module 134, in order to aid the preliminary object identification performed thereby. It is appreciated that in order for weight sensors to accurately record the weight of an item removed from a surface, the center of gravity of the item must be above the weight sensor. In the case of small items, this may be achieved by placing small items within a container, which container may be centrally positioned with respect to a weight sensor.

Additionally or alternatively, an indicia reading module 412 may be incorporated in the system of the present invention. Indicia reading module 412 may be a separate module or may be included in the functionalities of cameras 110. Indicia reading module 412 is preferably operative to at least partially read at least a portion of an indicia forming part of the imaged object, in order to derive a final identity of the object.

By way of example, the indicia included in the imaged object may be a text or legend printed on the object. Reading of at least part of the text may aid classification of the object identity by classification module 138. For example, the appearance of certain letters on the object may be used by classification module 138 to distinguish the item identity from a range of possible item identities provided by image analysis module 134.

Further by way of example, the indicia included in the imaged object may be in the form of an image, such as a logo associated with a given item. The appearance of certain symbols, emblems or colors on the item, even if only partially identified, may be used by classification module 138 to distinguish the item identity from a range of possible item identities provided by image analysis module 134.

Still further additionally or alternatively, an image background subtraction module 414 may be incorporated in the system of the present invention. Such image background subtraction may be useful in aiding classification module 138 to derive a single object identity from amongst more than one object identity provided thereto. Image background subtraction module 414 may perform temporal background subtraction, wherein at least one initial image of a scene is acquired at a first point in time, at least one subsequent image of the scene is acquired at a second point in time, and the subsequent image is subtracted from the initial image, in order to detect removal of an object from the scene between the first and second points in time. By way of example, shelf 114 (FIG. 1) may be imaged prior and subsequent to removal of an item therefrom, and the difference between the two images used to aid identification of the nature and quantity of items removed from shelf 114.

Image background subtraction module 414 may additionally or alternatively perform spatial background subtraction, wherein immobile elements may be subtracted from an image of a scene based on a predetermined model thereof, in order to simplify image analysis.

Figure 5:
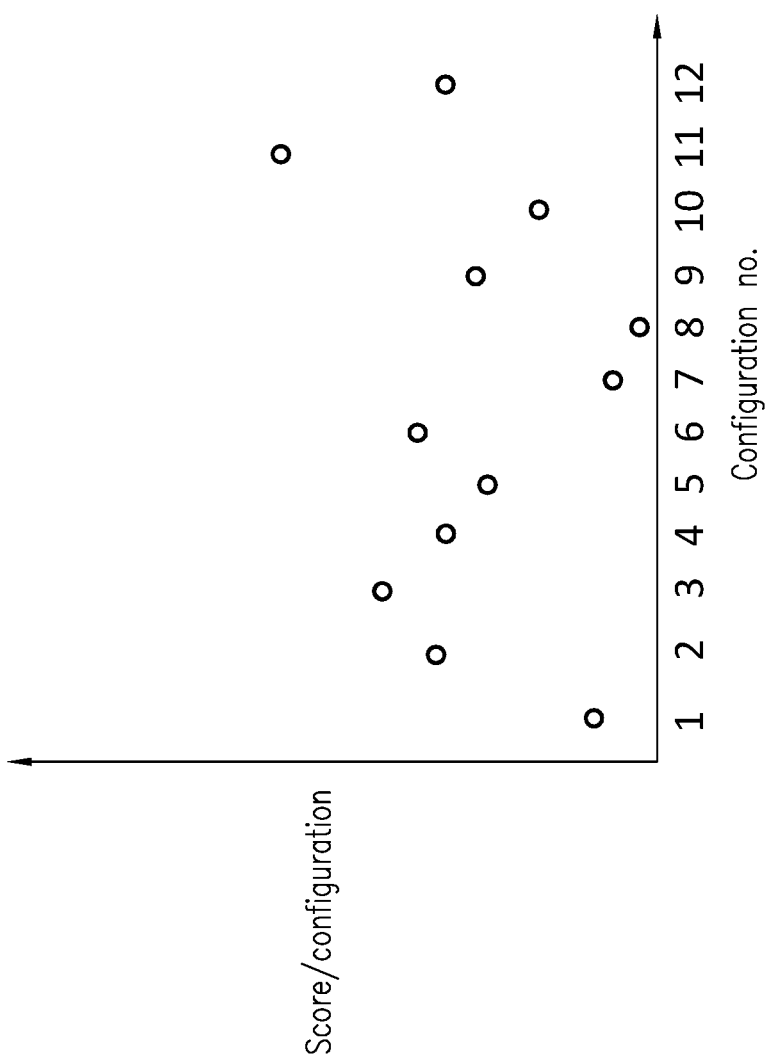
FIG. 5 is a simplified graph illustrating scoring useful for optimizing the arrangement of cameras employed in an item identification and tracking system of the type shown in FIG. 1.

Reference is now made to FIG. 5, which is a simplified graph illustrating scoring useful for optimizing the arrangement of cameras employed in an item identification and tracking system of the type shown in FIG. 1.

As described hereinabove with reference to FIG. 1, system 100 preferably includes a multiplicity of cameras 110 arranged to view a scene, such as premises 104 (FIG. 1), and to acquire visual data relating to at least one object therein. In accordance with preferred embodiments of the present invention, multiple possible arrangements of cameras 110 are preferably computer simulated with respect to premises 104 prior to the installation of cameras 110 therein, in order to find the optimal arrangement of cameras 110 according to which blind spots are minimized and the range of viewing angles of items within premises 104 maximized.

Such computer simulation may include subdividing a computer model of premises 104 into a grid of individual units. A first camera arrangement may then be defined with respect to the units of premises 104. Every unit may then be assigned a sub-score according to the number of cameras by which that unit is viewable. The sum of the sub-scores of all of the units comprising the premises then represents the total score for that camera configuration. Additional alternative possible camera arrangements may then be modeled and scores assigned to each, which scores express the overall camera density with which the units in a given model are seen.

A highly schematic simplified exemplary graph illustrating such scoring is shown in FIG. 5. As seen in FIG. 5, a total score is assigned for each configuration. The total score is the sum of the individual sub-scores of each unit of the premises model, which individual sub-scores express the number of cameras by which each respective unit is seen. In the case of the data illustrated in FIG. 5, it is understood that the eleventh camera configuration bears the highest configuration score and is thus optimally suited for viewing the premises.

Premises 104 may be divided into units and various camera configurations modelled with respect thereto in the absence of any individuals 106. Additionally or alternatively, premises 104 may be divided into units and camera configurations modelled with respect thereto, based on taking into account the presence of individuals 106 within the premises. It is appreciated that the configuration scores and hence optimal identified camera arrangements may differ depending on the presence or absence of individuals 106 within the premises.

Figure 6:
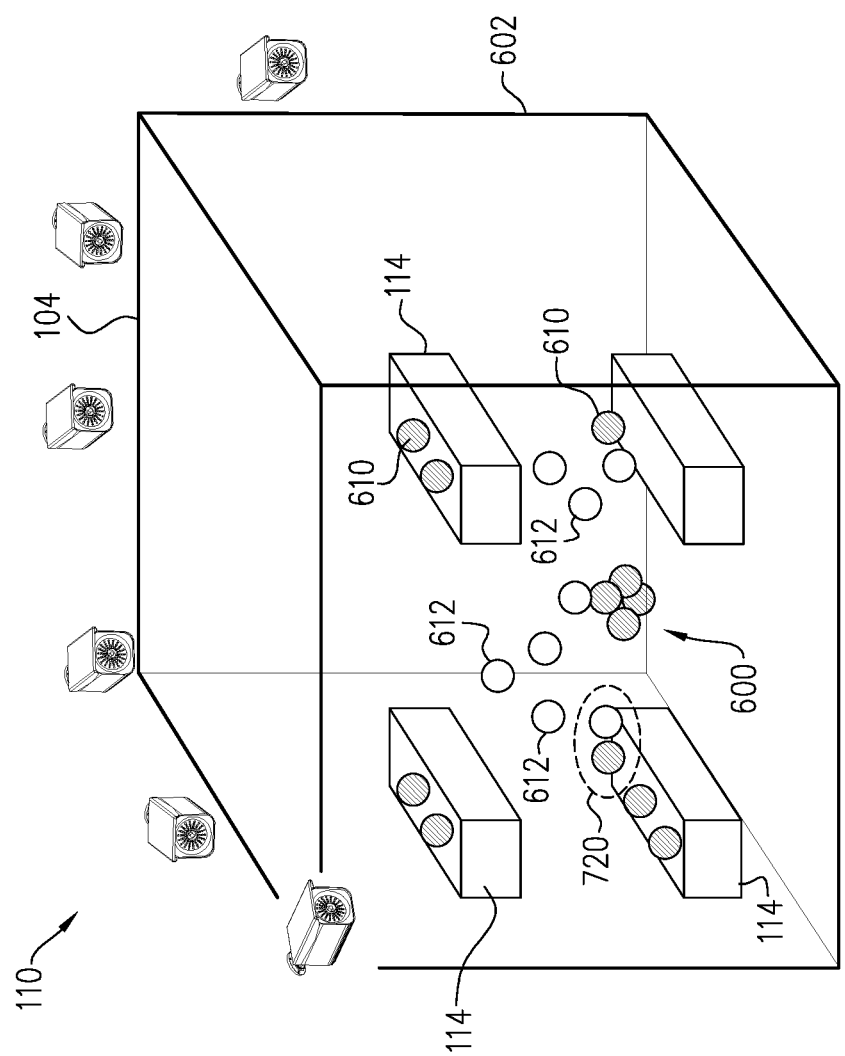
FIG. 6 is a simplified schematic illustration of a model for tracking of items useful in an item identification and tracking system of the type shown in FIG. 1.

Reference is now made to FIG. 6, which is a simplified schematic illustration of a model for tracking of items useful in an item identification and tracking system of the type shown in FIG. 1, and particularly useful within event tracking module 140 thereof. Such tracking of items may be useful for providing an inventory of items associated with a particular individual within a premises, as is detailed hereinbelow.

As seen in FIG. 6, multiplicity of cameras 110 is preferably operative to image premises 104. As a result of the performance of image processing on the images acquired by cameras 110, and particularly as a result of the performance of the image processing described hereinabove with reference to FIG. 3, items 102 and individuals 106 (FIG. 1) within premises 104 may be modeled as points 600 within a 3D space model 602. Points 600 may be points associated with the presence of an item, as shown to be the case for 'item points' 610, here indicated as filled circles. Points 600 may alternatively be points associated with the presence of an individual, and more specifically with a particular body part of an individual represented by a key point in a pose graph, as shown to be the case for 'people points' 612, here indicated as un-filled circles. In the case that premises 104 includes both people and items, both item points 610 and people points 612 may comprise the totality of points 600.

Figure 7:
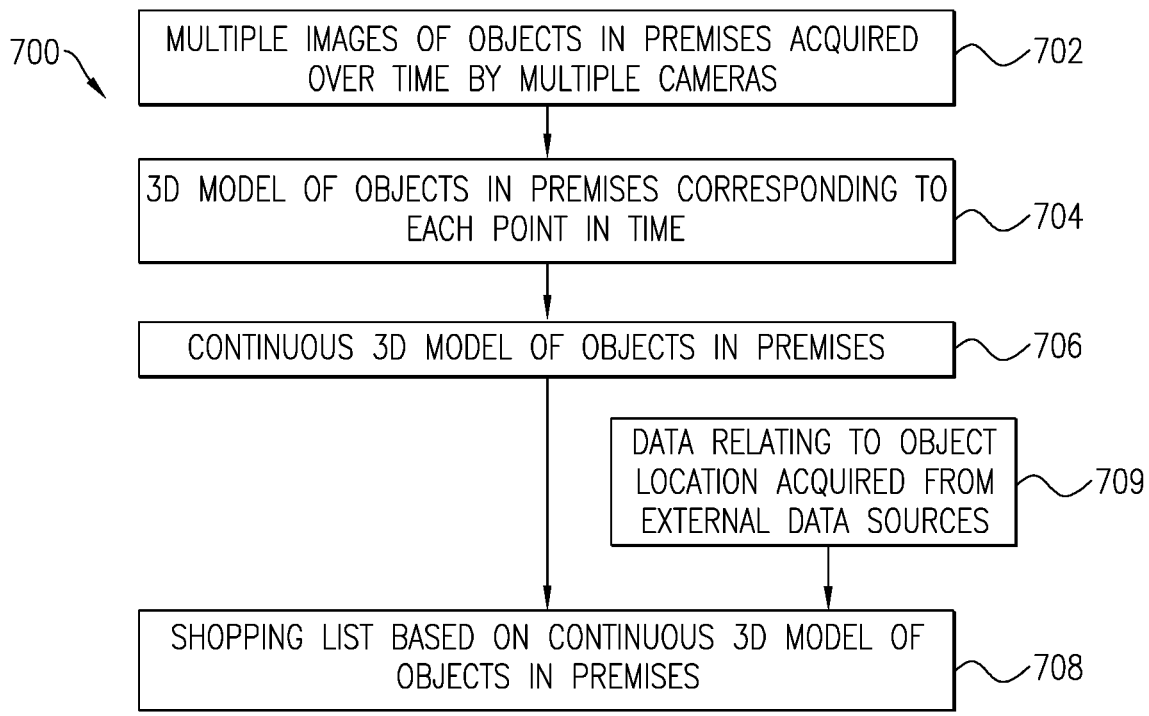
FIGS. 7 and 8 are simplified respective flow charts illustrating steps in the tracking of items based on a model of the type shown in FIG. 6.

Turning now to FIG. 7, a process 700 carried out in relation to model 602, is seen to begin at a first step 702, at which cameras 110 are preferably operative to acquire images of premises 104 at a rapid frame rate, such as 20 or 25 images per second. It is appreciated that the particular frame rate at which cameras 110 operate may vary in accordance with the imaging requirements of premises 104.

As seen at a second step 704, for each set of images simultaneously acquired by cameras 110 at each point in time, image processing as described hereinabove with respect to FIGS. 3-4 is preferably carried out, so as to generate a multi-dimensional, preferably 3D, model of the distribution of objects, which objects may be inanimate items or people represented by points 600, within premises 104. It is appreciated that such a 3D model may be generated for the entirety of premises 104 or for a particular sub-portion of premises 104, depending on the region of interest within premises 104. Such a 3D model may be generated by a model generator, which may be included in event tracking module 140.

It is appreciated that various ones of cameras 110 may provide images of different ones of objects within premises 104 and that the same object may be imaged by different ones of cameras 110 at different time frames, depending on the position of the object within premises 104. Thus, a particular one of points 600 corresponding to the location of a given object in 3D space may be generated at second step 704 based on images from certain ones of cameras 110 at a first point in time and based on images from certain other ones of cameras 110 at a second point in time, due to the motion of the given object between the first and second points in time.

It is appreciated that this feature of the present invention is particularly advantageous in the case that premises 104 is a dense environment. Notwithstanding a possibly dense distribution of objects within premises 104, a 3D model of points 600 may be continuously generated, provided that the object represented by a corresponding point 600 remains in the line of sight of at least two of cameras 110 at any given imaging time frame.

Preferably, the multidimensional models generated for consecutive points in time are compared in order to track changes in the multi-dimensional model of at least one object over time. More specifically, the location of each one of points 600 in respective 3D models corresponding to consecutive points in time are compared, in order to track the motion of each one of the points 600. It is appreciated that such tracking is based on the assumption that the time gap between the image frames is less than the time taken for a particular object to move significantly with respect to the position of that object in a neighboring frame. Such tracking may be carried out by a model tracker, which may be included in event tracking module 140.

It is understood that such tracking may involve information from a 3D model generated at one point in time being used to augment information from a 3D model generated at another point in time despite the two points in time not being immediately adjacent. For example, in the case that a particular one of people points 612 disappears from several consecutive frames and then subsequently reappears, the point 612 may be tracked back to earlier time instances of that point, despite the absence of the point from intervening frames. This may be relevant, for example, in the case that the individual represented by one or more points 612 temporarily exits and then returns to premises 104.

Thus, it is understood that although each 3D model of points 600 in 3D space generated for each point in time is static, a continuous 3D model of the dynamic passage of points 600 in 3D space may be built based on a stream of images of premises 104 acquired by cameras 110, wherein the passage of points 600 may be tracked by comparison of changes in point position between neighboring frames, as seen at a third step 706.

As seen at a fourth step 708, an inventory may then be generated based on the continuous 3D model built at third step 706. It is appreciated that whereas the 3D model is preferably generated for all of points 600 in premises 104, the inventory is preferably based only on selected changes in position of ones of points 600 satisfying a predetermined 'trigger' criteria defining such changes as events of interest. Such an inventory may by generated by a data analyzer, which may be included in event tracking module 140.

By way of example, returning to FIG. 6, in the case that premises 104 is a shopping facility, item points 610 may represent items available for purchasing by shoppers modelled by people points 612. In such a scenario, a trigger criteria for motion of points considered to represent events of interest and based on which an inventory may be created may be an event such as the approach of one of people points 612 within a predetermined distance from a location of available items, for example as represented by shelves 114 in FIG. 6. An event satisfying such a trigger criteria is schematically indicated at a region 720, wherein people point 612 is seen to approach shelf 114. In this case, the 3D model may be analyzed in order to determine the identity of the object, as represented by item point 610, handled by the shopper, as represented by people point 612. It is appreciated that such event tracking may be used to generate a shopping list associated with shoppers, or may be used for the purpose of analytics, in order to gain understanding of the passage of shoppers within premises 104.

Further by way of example, in the case that premises 104 is a warehouse, item points 610 may represent items to be handled by workers represented by people points 612. In such a scenario, a trigger criteria for motion of points based on which an inventory may be created may be the approach of one of item points 610 within a predetermined distance from a receptacle associated with one of people points 612. In this case, the 3D model may be analyzed in order to determine the identity of the object, as represented by an item point 610, having entered or exited a receptacle associated with one or more people points 612.

It is appreciated that the trigger criteria are not limited to events relating to the interaction of points 600 in the 3D model. By way of example, process 700 may include a fifth step 709 at which data relating to objects is acquired from external sources. Such external sources may, by way of example, be sensors located on shelves 114. A given change in the weight of items on one of shelves 114 may be defined as a trigger criteria, indicating that an object has been removed from the shelf. Based on such a trigger criteria, the 3D model may be analyzed in order to determine the identity of the object, as represented by item point 610, removed by the shopper, as represented by people point 612, from shelf 114 having undergone a change in weight It is understood that these trigger criteria are provided by way of example only, and that any appropriate trigger criteria may be used in order to distinguish changes within the 3D model corresponding to interactions of interest.

Figure 8:
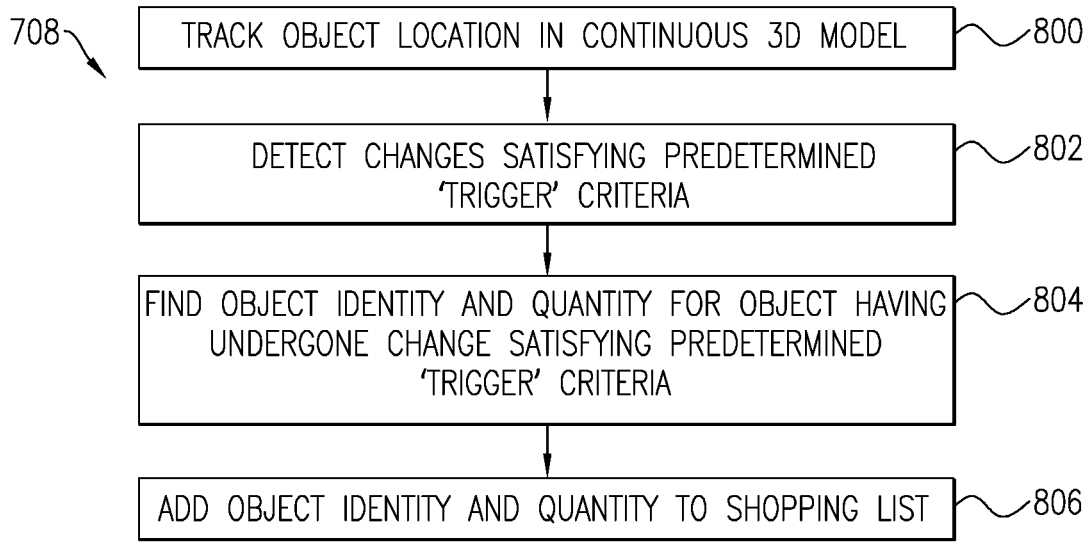

Turning now to FIG. 8, preferred sub-steps within fourth step 708 of FIG. 7 at which the inventory of items is generated, are shown. As seen at a first sub-step 800, the location of objects in the continuous 3D model is preferably tracked, which objects may be items or individuals. As seen at a second sub-step 802, changes in object location satisfying a predetermined trigger criteria are preferably identified.

As seen at a third sub-step 804, the object identity and quantity having undergone the change in location satisfying the predetermined 'trigger' criteria is then found. It is understood that third sub-step 804 involves analyzing data relating to the changes satisfying the at least one predetermined criterion, as found at second sub-step 802, in order to derive information relating to the at least one modelled object. It is appreciated that the finding of the object identity and quantity may be automatically carried out, by way of example, outlined hereinabove with reference to FIG. 4. It is further appreciated that, in some cases, human input may be advantageous in the analysis of the 3D model in order to ascertain the identity or quantity of a given object. Such human input may be supplied in order to augment the automatically generated information regarding the object quantity and/or identity.

As seen at a fourth sub-step 806, the object quantity and identity may then be added to an inventory such as a shopping list. Additionally or alternatively, information relating to the events satisfying the predetermined trigger criteria may be stored for the purpose of analysis in order to gain understanding of the passage of items and/or individuals within the premises. In the case that a shopping list is generated at fourth step 806, the shopping list is preferably continually updated during the passage of the shopper, as represented by one or more people points 612, within premises 104. The shopping list may, by way of example, be automatically presented to the shopper for payment prior to exit of the shopper from premises 104.

It is appreciated that the generation of a shopping list for a given shopper is thus preferably based on the tracking of items associated with the shopper, based on analysis of shopper interactions satisfying predefined 'trigger' criteria in a 3D model, and without necessarily involving identification of the shopper. System 100 (FIG. 1) thus may operate in an anonymized manner, without requiring shopper identity as an input.

As described hereinabove, image processing carried out by components of system 100 (FIG. 1) preferably involves the analysis of images based on AI algorithms, particularly in order to detect the presence and location of objects in the images. It is appreciated that, particularly in the case of premises 104 being a large premises including a large number of items 102 and shoppers 106, an extremely large volume of data is required in order to train such AI algorithms so as to operate with the required level of accuracy. In accordance with particularly preferred embodiments of the present invention, such training of AI algorithms is efficiently, rapidly and automatically enabled based on the automated generation of additional data based on the acquired data. Such additional data may be supplied to the AI algorithm during the training thereof, in addition to the supply of the acquired data, thus expediting training of the algorithm and making the present invention particularly well suited for implementation on a very large scale, in a large physical premises.

Figure 9A:
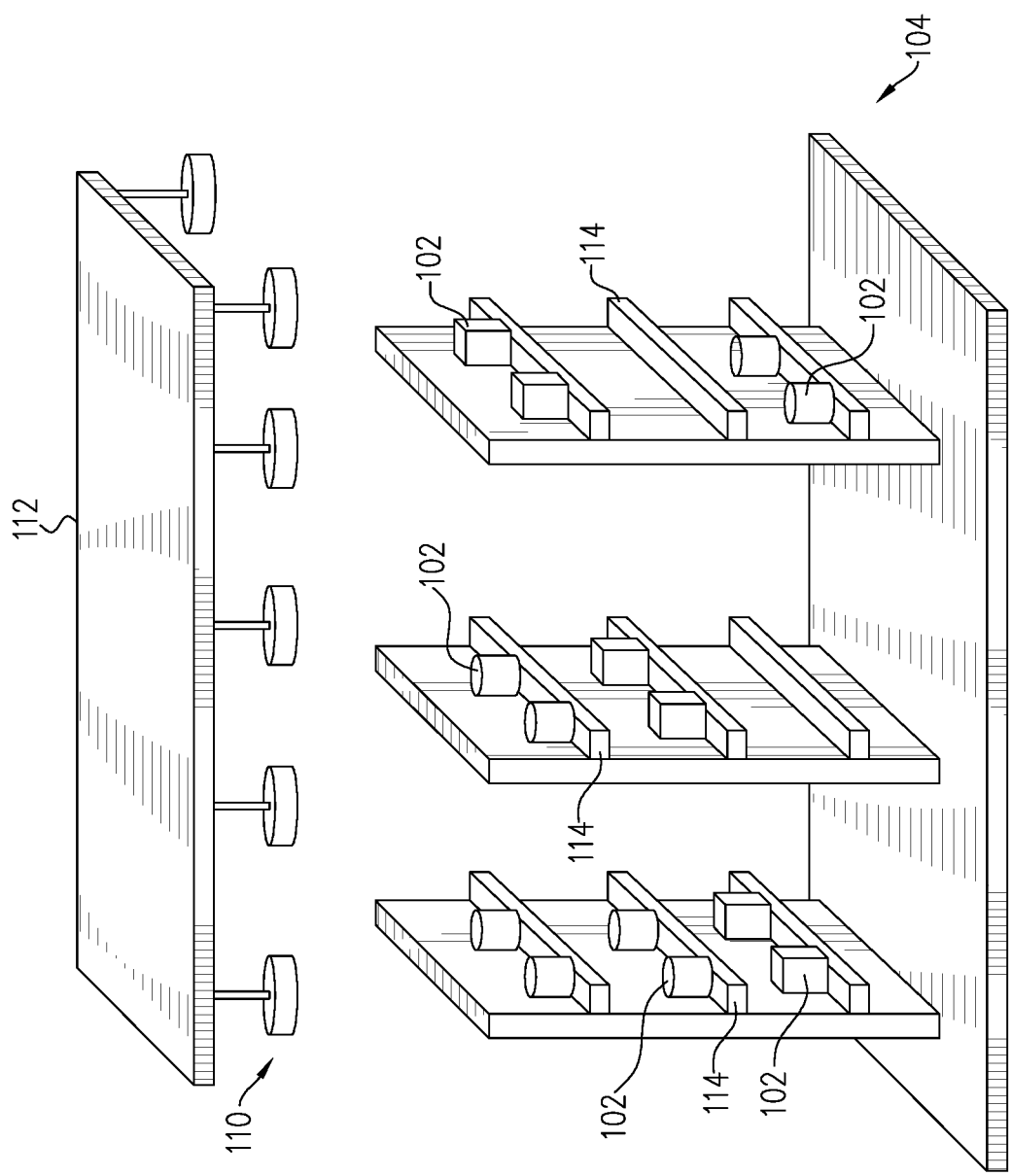
FIGS. 9A and 9B are simplified perspective and side view illustrations of an implementation of an embodiment of the system of the present invention.
Figure 10A:
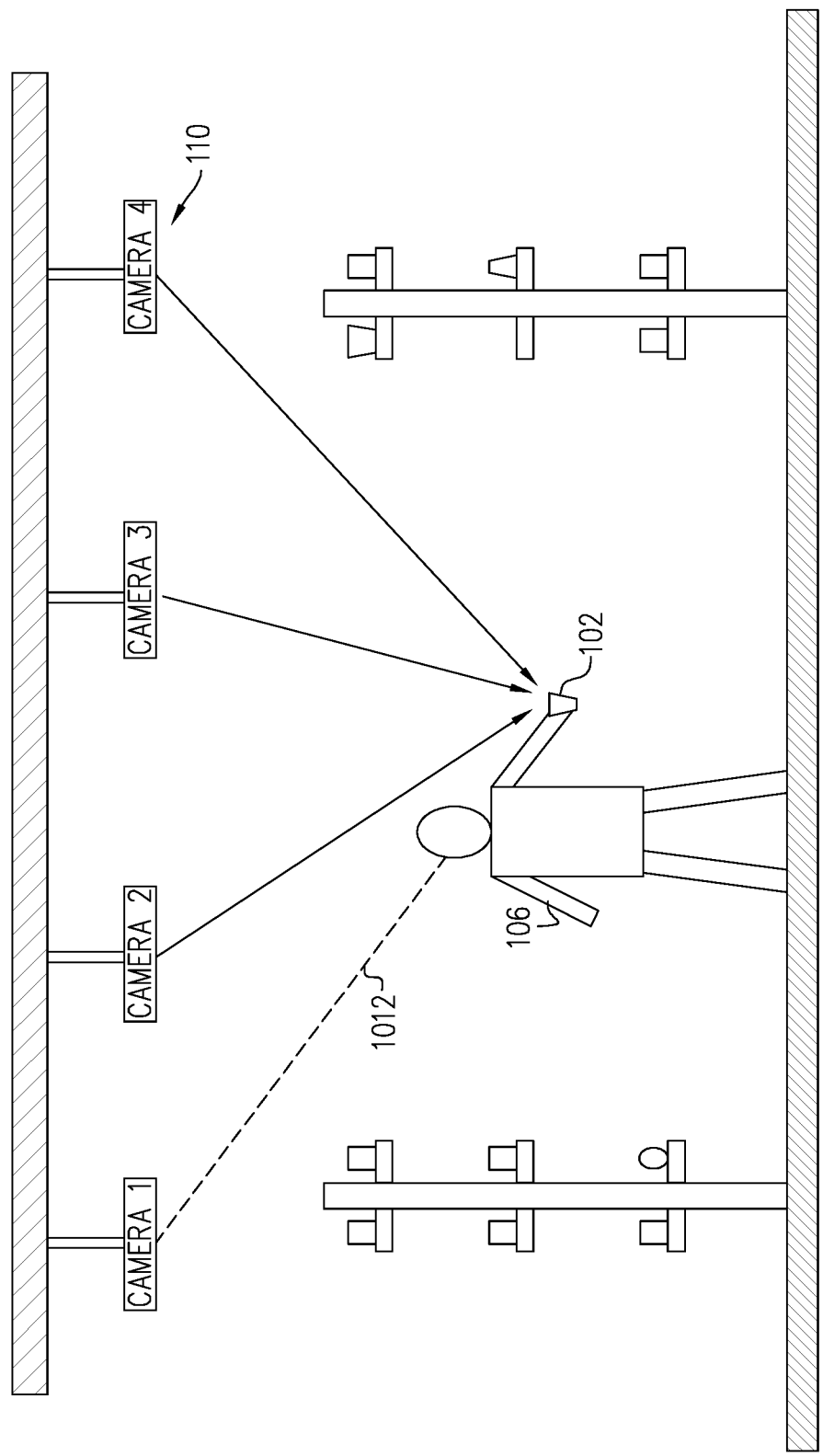
FIGS. 10A and 10B, 11A and 11B and 12A and 12B are simplified illustrations of part of the implementation of FIGS. 9A and 9B, showing lines of sight of a plurality of cameras in a context including a human subject and corresponding images, as annotated by an AI algorithm, in accordance with a preferred embodiment of the present invention.
Figure 10B:
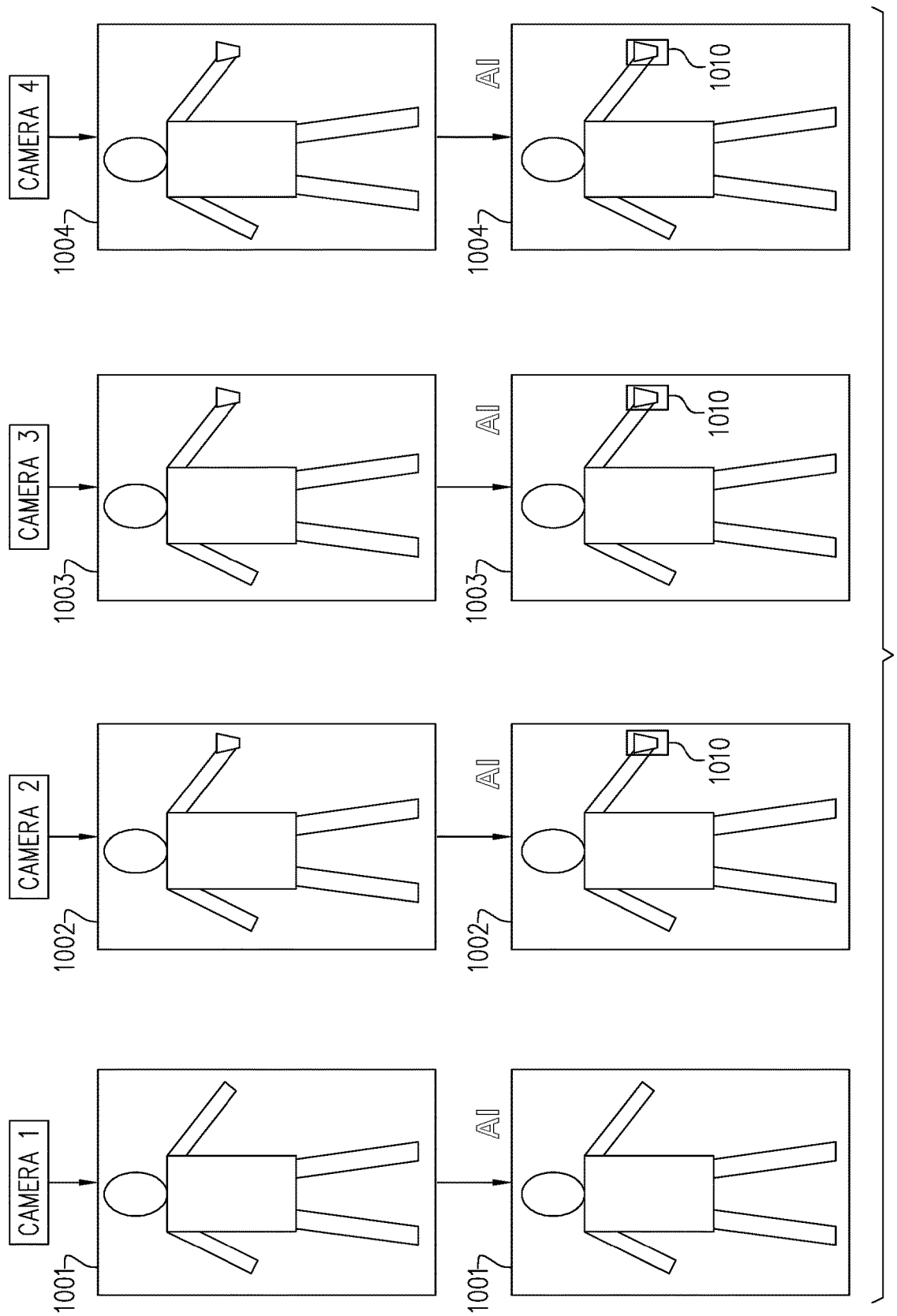

Reference is now made to FIGS. 9A and 10B, which are simplified perspective and side view illustrations of an implementation of an embodiment of the system of the present invention.

Figure 9B:
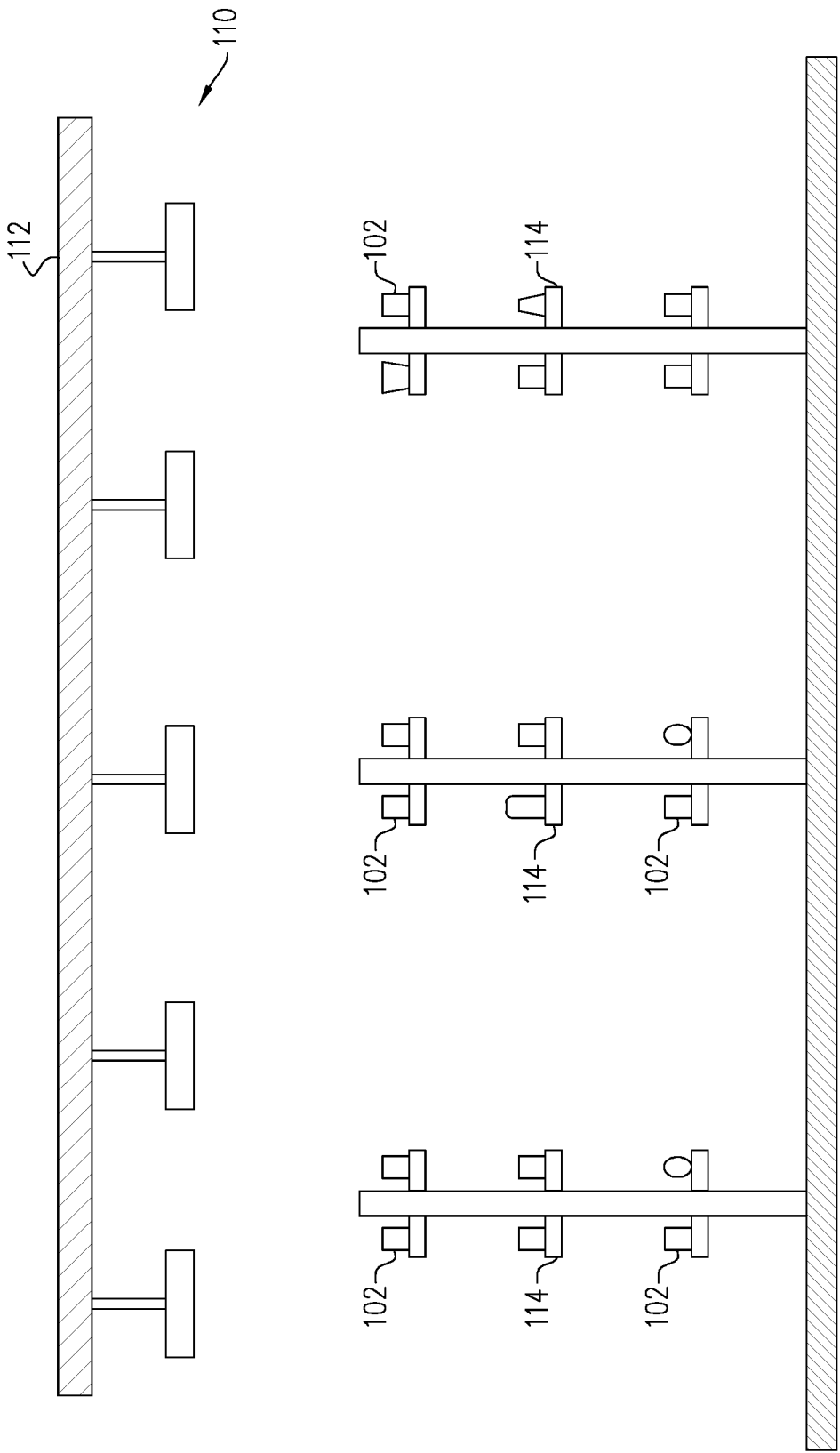

As seen in FIGS. 9A and 9B, items 102 are preferably arranged on shelves 114 of premises 104 and viewable by multiplicity of cameras 110 mounted on ceiling 112. It is appreciated that the arrangement of items 102 and cameras 110 is illustrated in FIGS. 9A and 9B in a highly simplified manner, for the purpose of clarity of explanation hereinbelow of embodiments of the present invention, and that items 102 and cameras 110 may be arranged in alternative configurations to those shown herein.

Reference is now made to FIGS. 10A and 10B, 11A and 11B and 12A and 12B, which are simplified illustrations of part of the implementation of FIGS. 9A and 9B, showing lines of sight of a plurality of cameras in a context including a human subject and corresponding images, as annotated by an AI algorithm, in accordance with a preferred embodiment of the present invention.

Turning now to FIGS. 10A and 10B, in a first scenario a human subject such as a shopper 106 is shown to be handling one of items 102. By way of example only, shopper 106 handling item 102 is shown to be simultaneously viewable by four cameras, indicated as cameras 1-4, in premises 104. It is appreciated that the imaging of shopper 106 by cameras 1-4 is preferably performed in this context at least for the purpose of providing images for the training of the AI algorithm described hereinabove. The purpose of such training is to enable the AI algorithm to automatically accurately identify the presence and location of items 102 in premises 104 based on images thereof acquired by cameras 110. Once the AI algorithm is trained so as to be capable of identifying the presence and location of items 102 in camera outputs with sufficient accuracy, the AI algorithm may be implemented within system 100 and more specifically within item identifier and tracker 130 thereof (FIG. 1), as described hereinabove with reference to FIGS. 1-8.

As seen in FIGS. 10A and 10B, camera 1 outputs image 1001 of the scene, camera 2 outputs image 1002 of the scene, camera 3 outputs image 1003 of the scene and camera 4 outputs image 1004 of the scene. Images 1001, 1002, 1003 and 1004 are preferably processed by an AI algorithm in order to identify the presence and location of item 102 therein. It is appreciated that the AI algorithm used for such image processing may be termed a seed AI or abstract AI network, which seed AI is capable of identifying the presence and location of items to a limited extent and with a large degree of error. It is a purpose of the embodiment of the invention described hereinbelow to provide additional data to train the seed AI in order to improve the performance thereof and thus allow the implementation thereof within system 100.

As a result of the processing of images 1001, 1002, 1003 and 1004 by the AI algorithm, images 1001, 1002, 1003 and 1004 are preferably annotated and bounding boxes drawn therein at the location of item 102. As seen in FIG. 10B, a bounding box 1010 is preferably added to each of images 1002, 1003 and 1004. However, no bounding box is added to image 1001, due to item 102 being blocked in image 1001 by shopper 106 and hence not lying along a line of sight 1012 of camera 1.

Figure 11A:
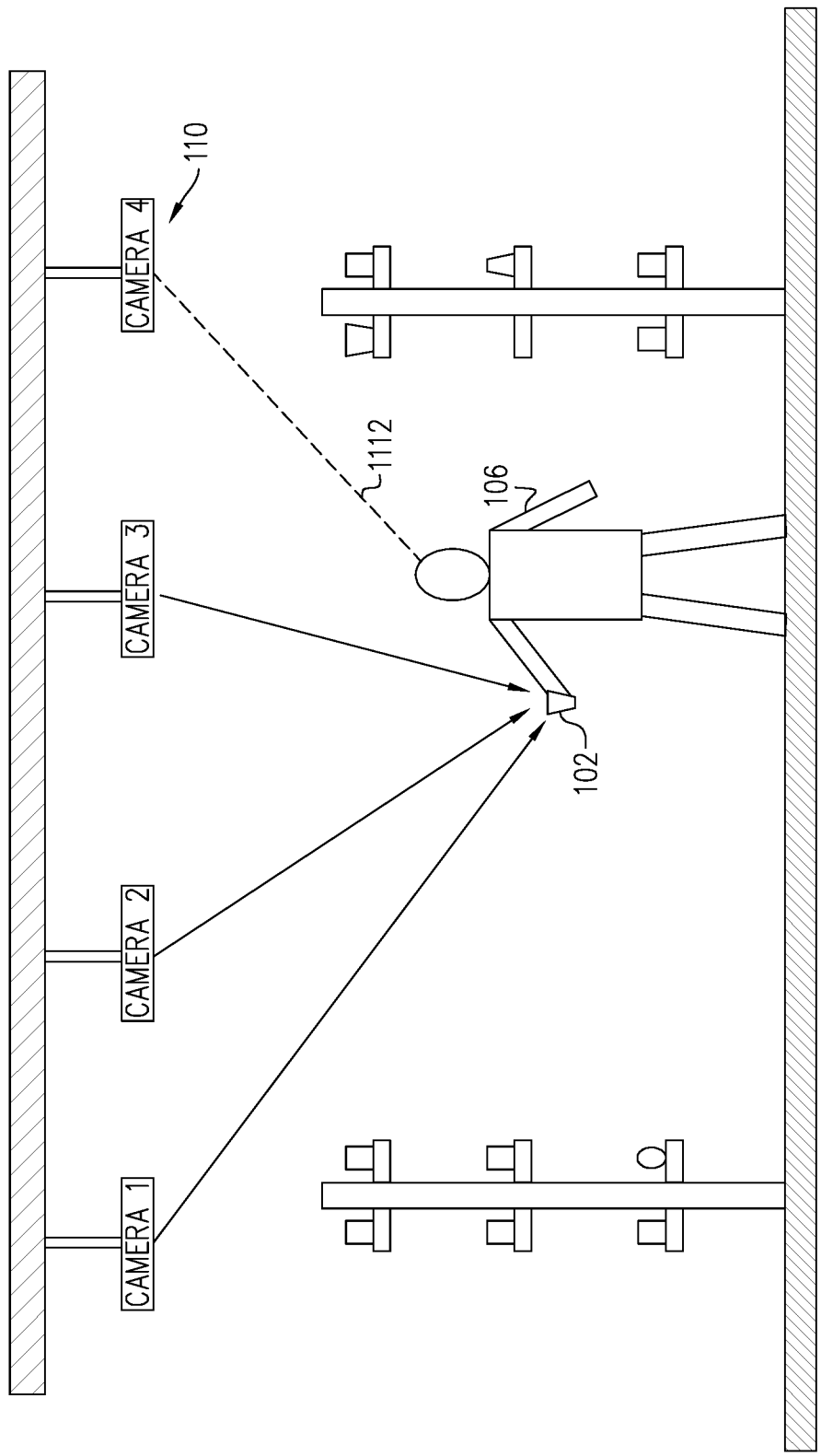
Figure 11B:
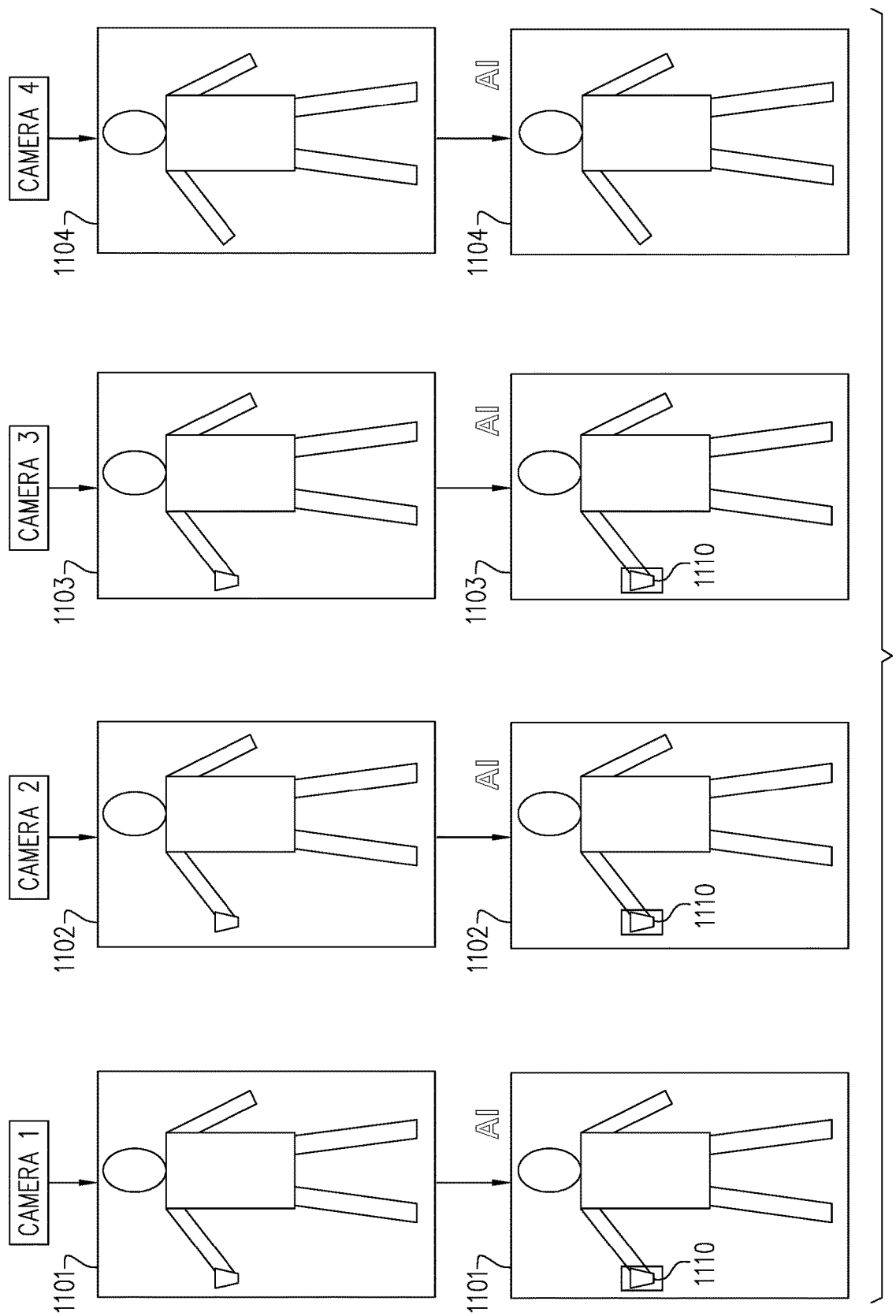

Similarly, as seen in FIGS. 11A and 11B in a second scenario involving a different arrangement of item 102 with respect to shopper 106 and cameras 1-4 than that shown in FIGS. 10A and 10B, camera 1 outputs image 1101, camera 2 outputs image 1102, camera 3 outputs image 1103 and camera 4 outputs image 1104 of the scene. Images 1101, 1102, 1103 and 1104 are preferably processed by an AI algorithm in order to identify the presence and location of item 102 therein.

As a result of the processing of images 1101, 1102, 1103 and 1104 by the AI algorithm, images 1101, 1102, 1103 and 1104 are preferably annotated and bounding boxes drawn therein at the location of item 102. As seen in FIG. 11B, a bounding box 1110 is preferably added to each of images 1101, 1102 and 1103. However, no bounding box is added to image 1104, due to item 102 being blocked in image 1104 by shopper 106 and hence not lying along a line of sight 1112 of camera 4.

Figure 12A:
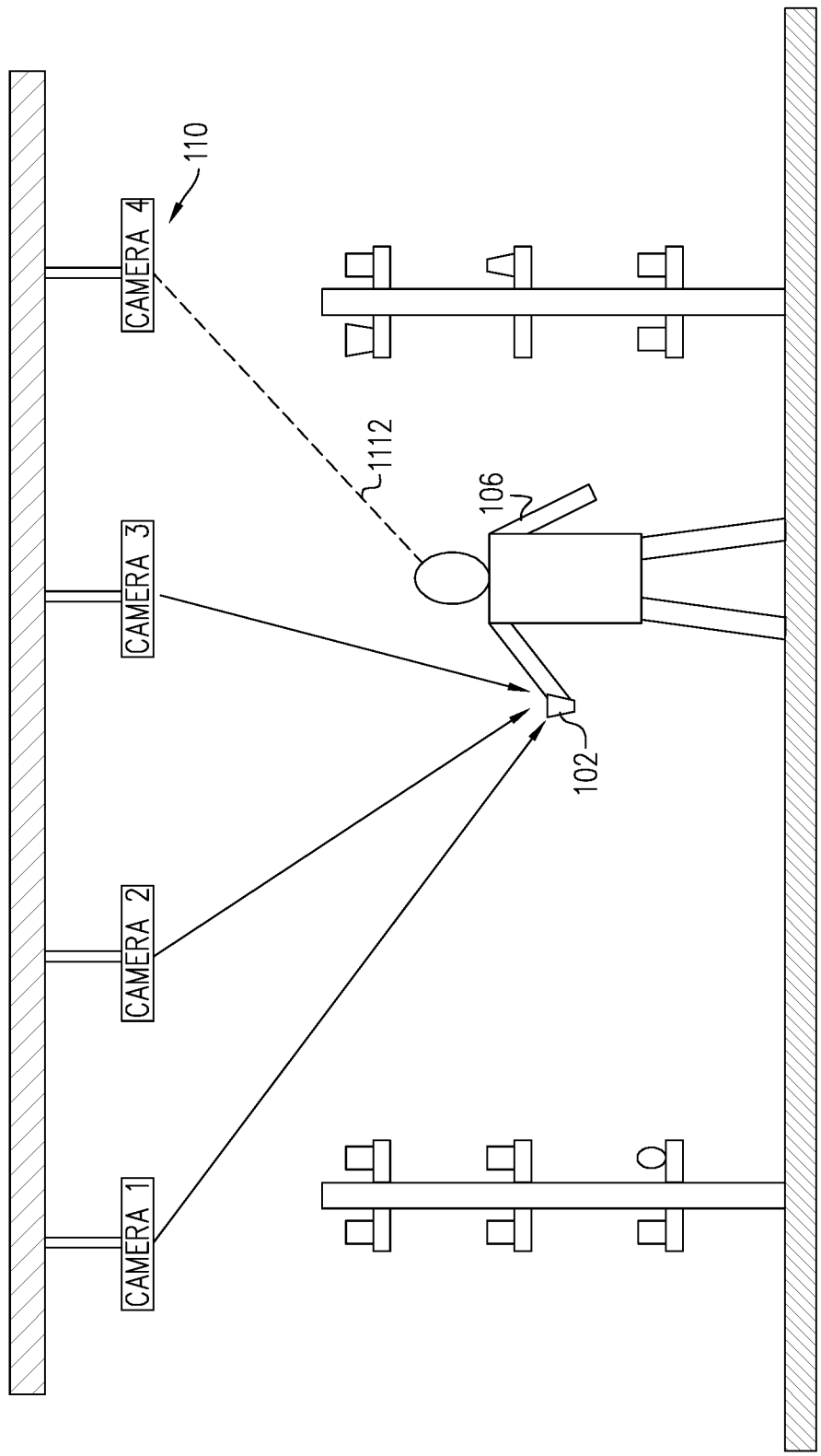
Figure 12B:
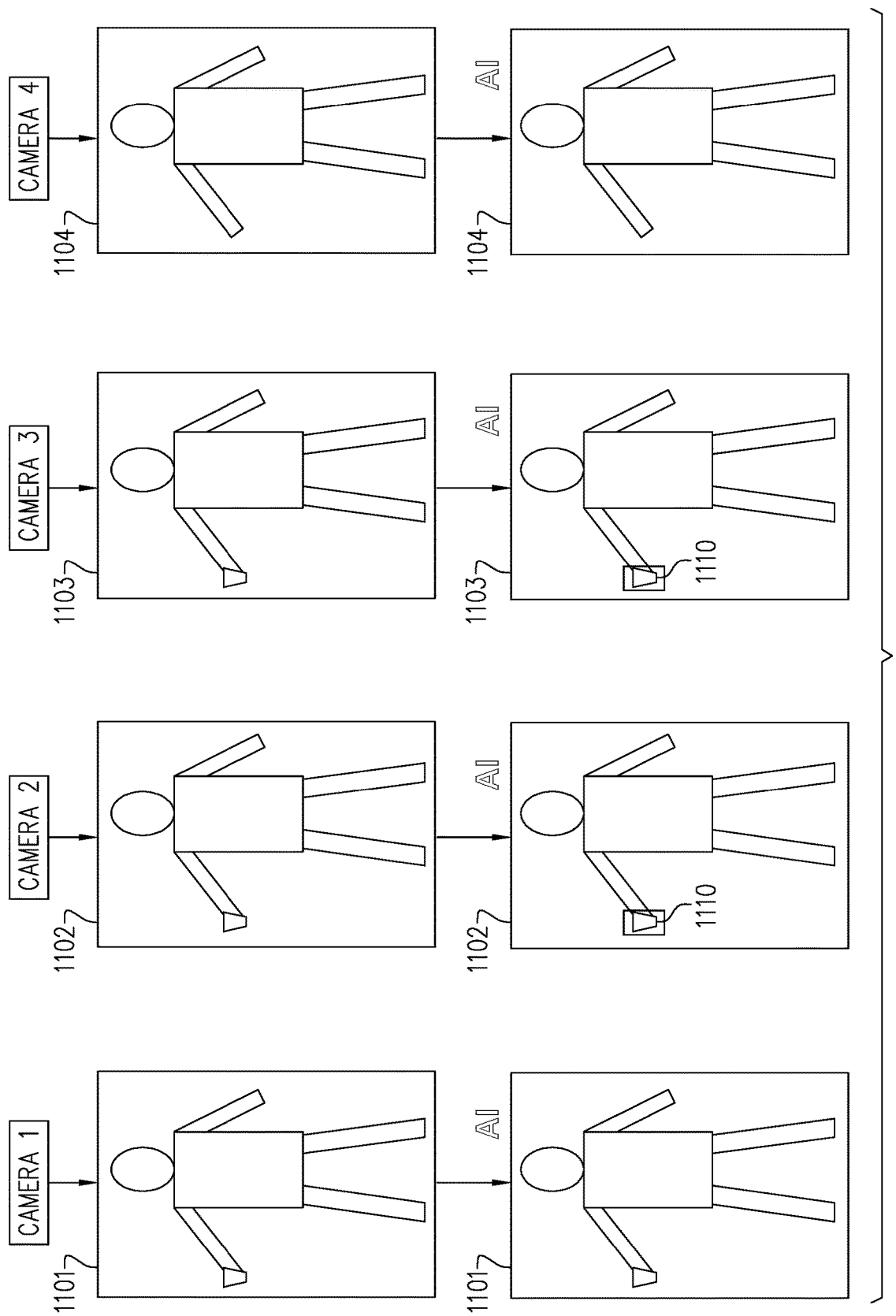

Turning now to FIGS. 12A and 12B, a third scenario involving the same arrangement of item 102 with respect to shopper 106 and cameras 1-4 as that shown in FIG. 11A is illustrated. However, as seen in FIG. 12B, the processing of images 1101, 1102, 1103 and 1104 by the AI algorithm here results in the insertion of bounding boxes 1110 only in images 1102 and 1103. No bounding box is inserted in image 1101, despite item 102 appearing in image 1101. Such a case may be termed an AI failure case, wherein the camera output, here image 1101, as analyzed by the AI algorithm is not found to contain information indicating the presence and location of item 102, despite such information being present in the camera output. Such AI failure may occur due to limitations in the AI algorithm, as a result of the AI algorithm not being trained to identify the presence and location of items in images to a sufficient level of accuracy.

It is appreciated that the AI failure case illustrated with respect to image 1101 differs from the case of image 1104. In both cases, the AI algorithm does not identify the presence and location of item 102 in the image and no bounding box is added to the respective images. However, whereas in the case of image 1104 item 102 indeed does not appear in the image and the AI algorithm thus correctly does not identify item 102 within the image, in the case of image 1101 item 102 does appear in the image and lack of identification of the presence and location of item 102 in the image is due to failure of the AI algorithm rather than innate properties of the image.

It is understood that prior to the processing of images 1001, 1002, 1003, 1004 and 1101, 1102, 1103, 1104 in the scenarios illustrated in FIGS. 10A-12B, the AI algorithm is preferably provided with the identity of item 102. The identity of item 102 is preferably found by a human expert and input into the AI algorithm in order to train the AI algorithm. However, it is envisioned that in some embodiments of the present invention the identity of item 102 may not necessarily be input to the AI algorithm by a human expert and rather may be automatically generated based on machine learning.

In order to ameliorate the AI failure cases, such as image 1101 in the example of FIGS. 12A and 12B, image modification may be employed. FIG. 13A is a simplified illustration of part of the implementation of FIGS. 9A and 9B showing amelioration of AI failure cases by image modification, in accordance with a preferred embodiment of the present invention.

Figure 13B:
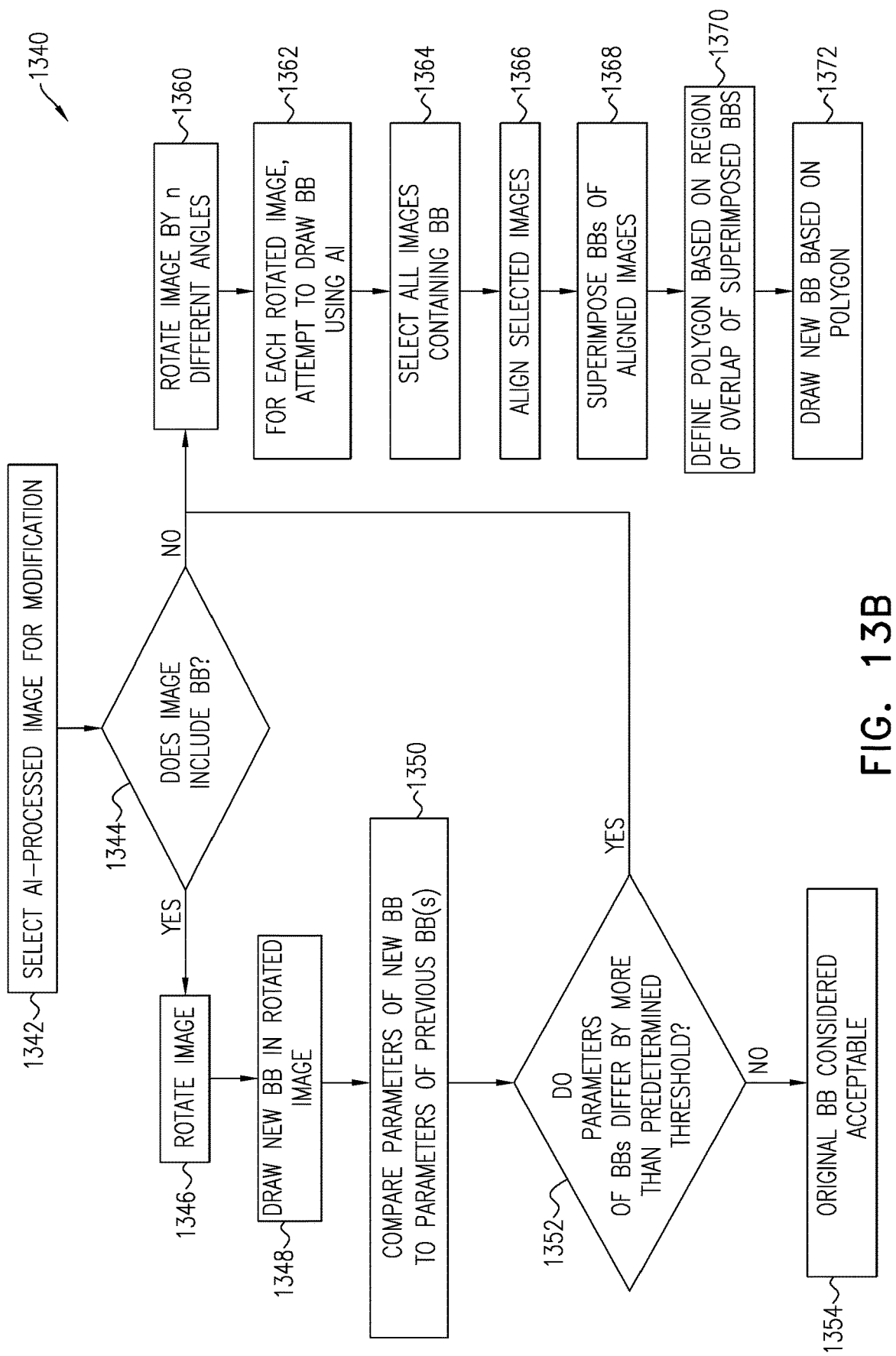
FIG. 13B is a simplified flow chart illustration illustrating steps in the amelioration of AI failure cases performed in accordance with the embodiment of FIG. 13A.

As seen in FIG. 13A, an AI failure case image such as image 1101 may be output by at least one camera of cameras 110 viewing a scene. It is appreciated that image modification methods as described herein with reference to FIGS. 13A and 13B may be performed on the output of one or more cameras. Following the ascertaining, based on employing artificial intelligence as described with reference to FIG. 12B, that the camera output does not contain information indicating the presence and location of at least one object in the scene, the camera output may be modified.

Preferably, the modifying of the camera output involves rotating the AI-failure image by a multiplicity of mutually different angles and employing AI to analyze each modified output, as rotated by a given angle, to find the presence and location of the item in the image.

Here, by way of example, the original image 1101 is shown to be modified by rotating by four different angles to produce rotated images 1302, 1304, 1306 and 1308. The AI algorithm originally unsuccessfully employed to analyze image 1101 is preferably re-employed to analyze each of rotated images 1302, 1304, 1306 and 1308. The employment of the AI algorithm on the modified AI-failure images has been found, in some cases, to result in successful identification of the presence and location of an item in the images and hence successful annotation of the images by bounding boxes. Here, by way of example, a bounding box 1310 is shown to be added to each of images 1302, 1304, 1306 and 1308 identifying the location of item 102 therein as a result of the processing thereby by the AI algorithm.

The annotated images are preferably then re-aligned by reverse rotation and the bounding boxes 1310 now present therein superimposed, in order to define a possibly irregular outline corresponding to the location of the item 102 at the region of overlap of the bounding boxes 1310, as shown in frame 1320. A new Cartesian bounding box 1322 may then be inserted at the location of the item, as shown at frame 1324. It is appreciated that the final bounding box 1322 illustrated in frame 1324 is more accurate than would be the case should the various individual bounding boxes 1310 not have been superimposed, since the final bounding box 1322 is based on a more refined rendering of the item location, which refined item location is in turn preferably based on superimposition of the individual bounding boxes 1310. It is understood that item 102 and bounding box 1322 are shown in an exaggerated size in frame 1324 with respect to the human subject, for the purpose of clarity of presentation thereof.

It is understood that although the image modification described herein is detailed with respect to rotation of the original image, additional or alternative types of image modification are also possible, including, by way of example, changes in image color scale, image warping and selective changes in image magnification.

It is further understood that the image modification described herein is not limited to application to AI failure images, such as image 1101. Rather, such image modification may also be applied to images in which the AI algorithm initially successfully identified the item presence and location, in order to better define the location of the bounding box. In such a case, the original, non-modified image, as processed by the AI algorithm, may be annotated with a bounding box indicating the presence and location of an item, but the size and/or position of the bounding box may be inaccurate. The use of the image modification method described herein may be advantageous in order to tighten the bounding box.

Reference is now made to FIG. 13B, which is a simplified flow chart illustration illustrating steps in the amelioration of AI failure cases and/or bounding box tightening performed in accordance with the embodiment of FIG. 13A.

As seen in FIG. 13B, a method 1340 for amelioration of AI failure cases and/or bounding box tightening based on image modification may begin at a first step 1342, whereat an AI-processed image is selected for modification. Method 1340 then proceeds to check, at a second query step 1344, whether the image selected at first step 1342 contains a bounding box. It is appreciated that query step 1344 serves to differentiate between AI-failure images in which no bounding box was drawn following AI processing of the image and AI-successfully processed images already containing a bounding box.

In the case that it is found, at second query step 1344, that the image does contain a bounding box, the image is rotated at a third step 1346 and an AI algorithm applied in order to redraw a bounding box on the rotated image at a fourth step 1348. Parameters of the new bounding box drawn on the rotated image at fourth step 1348 are then compared to parameters of the original bounding box present in the image, as seen at a fifth step 1350. Such parameters may include bounding box dimensions, bounding box location or other parameters as may be relevant.

As seen at a sixth query step 1352, method 1340 then proceeds to ascertain whether parameters of the two bounding boxes, namely the original bounding box and the newly drawn bounding box in the rotated image, differ by more than a predetermined threshold. In the case that the parameters do not differ by more than a predetermined threshold, the original bounding box is considered to be acceptable, as seen at a seventh step 1354 and no further processing of the original image is considered necessary. In this case, the bounding box in the image is considered to be sufficiently accurately delineated such that no further tightening of the bounding box is required and the image is ready for further processing, as is outlined hereinbelow with reference to FIGS. 14A-14D.

In the case that the parameters of the original bounding box compared to the new bounding box do differ by more than a predetermined threshold, as found at sixth query step 1352, or in the case that the image does not contain a bounding box, as found at second query step 1344, method 1340 proceeds to an eighth step 1360, whereat the image is rotated by N different angles, wherein N may be any integer. For each rotated image, the rotated image is preferably processed by an AI algorithm in order to attempt to annotate the image and draw a bounding box within the image indicating the presence and location of an item therein, as seen at a ninth step 1362. It is appreciated that in some cases ninth step 1362 may be successful, resulting in the drawing of additional bounding boxes in the rotated images, whereas in other cases ninth step 1362 may be unsuccessful, either due to failure of the AI algorithm to identify an item appearing in the image or due to the item indeed not appearing in the image.

It is further appreciated that in the case that ninth step 1362 is successful in drawing new bounding boxes in previously unsuccessfully processed images, method 1340 has succeeded in ameliorating AI-failure cases by way of image modification. Such an approach differs from conventional image modification approaches in which images successfully processed by AI algorithms may be modified in order to extract further information therefrom. In contrast, in a preferred embodiment of the present invention, images unsuccessfully processed by AI algorithms are modified in order to ameliorate the images and convert the previously unsuccessfully processed images to successfully processed images. It is appreciated that in some embodiments of the present invention, however, method 1340 may additionally be carried out on successfully analyzed images, in order to generate yet more data based on these images.

As seen at a tenth step 1364 and an eleventh step 1366, all images containing a bounding box following the AI processing thereof are selected and spatially aligned. Such spatial alignment may involve reverse rotation of the images, so as to return all of the images to their original orientation, thereby allowing subsequent superimposition thereof, as seen at a twelfth step 1368. It is appreciated that tenth step 1364 serves to distinguish between outputs of the at least one camera which contain information indicating the presence and location of at least one object in the scene and outputs of the at least one camera which do not contain information indicating the presence and location of the at least one object in said scene, as found by AI processing of the images.

Only those images found to contain information indicating the presence and location of the object, as preferably delineated by a bounding box in the image, are compiled into a set of images, which are mutually spatially aligned at eleventh step 1366 and then superimposed at twelfth step 1368.

As seen at a thirteenth step 1370, a polygon is preferably then defined based on the region of overlap of the bounding boxes. It is appreciated that the size and location of the polygon preferably correspond to the item size and location. As seen at fourteenth step 1372, a new Cartesian bounding box then added corresponding to the location of the polygon, which new bounding box preferably more accurately corresponds to the item location than the original bounding box present in any of the individual images.

Figure 14A:
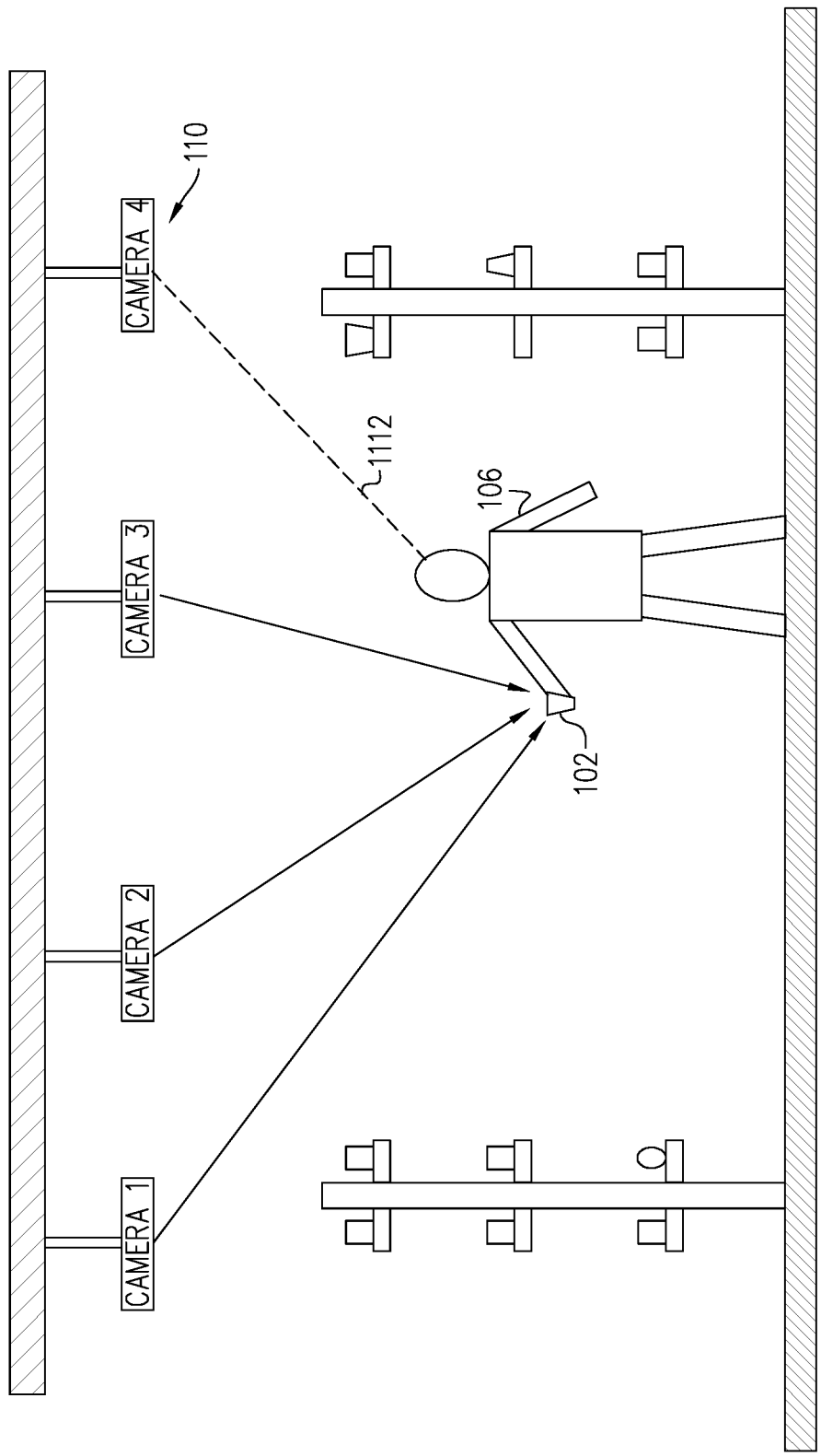
FIGS. 14A and 14B are simplified illustrations of part of the implementation of FIGS. 9A and 9B showing amelioration of AI failure cases by 3D modeling, in accordance with a preferred embodiment of the present invention.
Figure 14B:
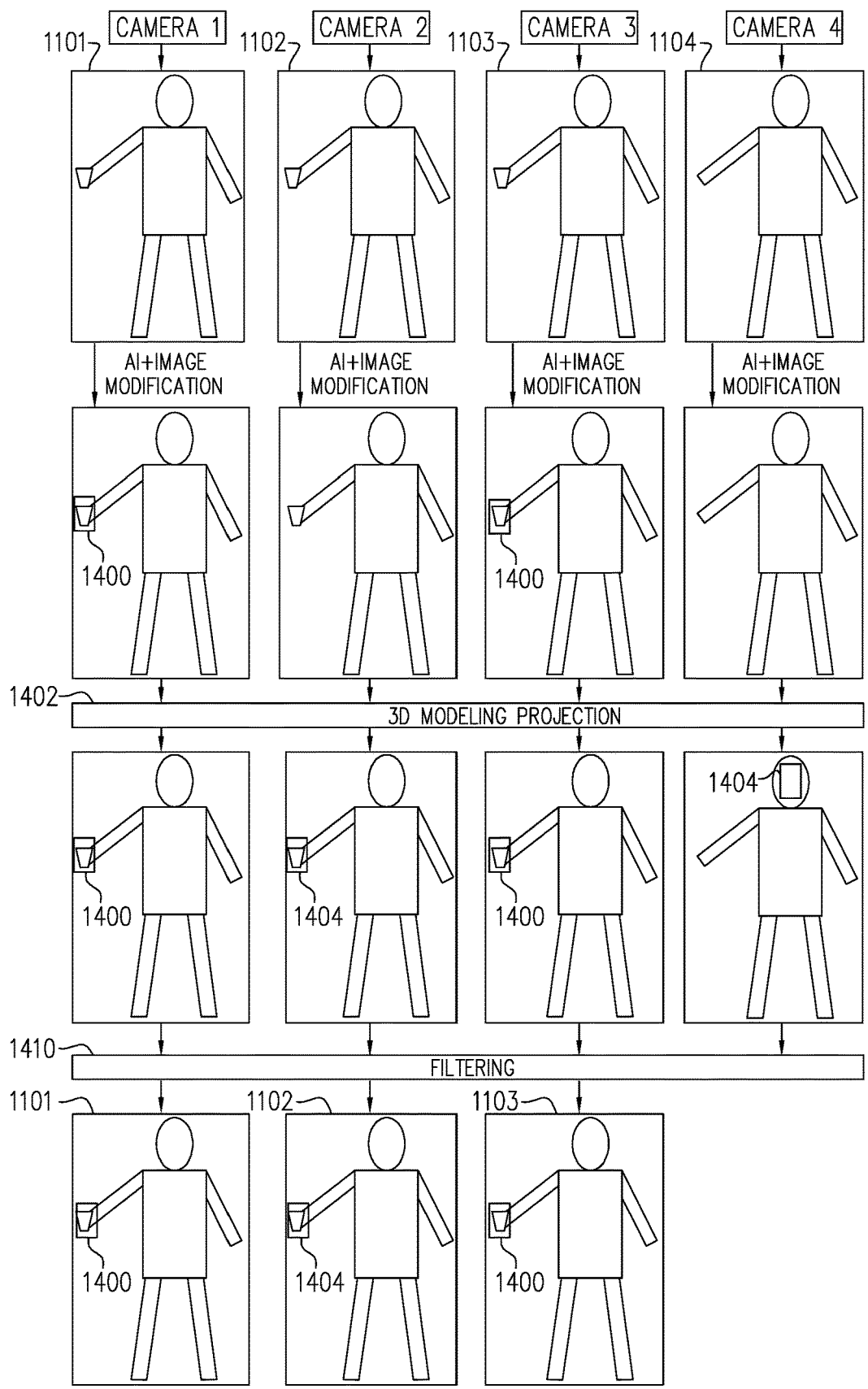

Reference is now made to FIGS. 14A and 14B, which are simplified illustrations of part of the implementation of FIGS. 9A and 9B showing amelioration of AI failure cases by 3D modeling, in accordance with a preferred embodiment of the present invention.

As seen in FIG. 14A, a third scenario involving the same arrangement of item 102 with respect to shopper 106 and cameras 1-4 as that shown in FIG. 12A is illustrated. Camera outputs 1101, 1102, 1103 and 1104 are preferably processed by an AI algorithm in order to find the presence and location of item 102 therein, which item may be indicated by a bounding box annotating the image. It is understood that such processing may involve AI processing of the original image, as described hereinabove with reference to FIGS. 10A-12B, as well as AI processing based on image modification, as described hereinabove with reference to FIGS. 13A and 13B.

In this case, by way of example, a bounding box 1400 is seen to be inserted in images 1101 and 1103 and no bounding box is seen to be inserted in images 1102 and 1104. It is appreciated that the bounding box 1400 shown in the case of images 1101 and 1103 may be that bounding box originally added to the image following initial AI analysis thereof, may be a tightened bounding box based on an initial bounding box that was subsequently refined by way of image modification, or may be a new bounding box based on an initial AI-failure image as ameliorated based on image modification, as described hereinabove with reference to FIGS. 13A and 13B.

Irrespective of the particular nature of the bounding box 1400 present in images 1101 and 1103, 3D modeling projection is preferably then performed on preferably all of the images output by cameras 1-4, as schematically indicated at a 3D projection modeling step 1402. 3D projection modeling step 1402 preferably involves distinguishing between outputs of cameras which, as analyzed by the AI algorithms, are found to contain information indicating the presence and location of item 102 and outputs of cameras which, as analyzed by the AI algorithms, are not found to contain such information and enhancing outputs which do not contain information indicating the presence and location of item 102 by adding thereto information indicating the presence and location of item 102. More specifically, 3D projection modeling preferably involves the addition of bounding boxes to images not containing bounding boxes, based on the location of bounding boxes in corresponding images, as found by intersection of rays corresponding to pixels associated with the bounding boxes. 3D projection modeling may be carried out by an image analyzer, employing artificial intelligence. It is appreciated, however, that 3D projection modeling is not limited to annotation of images by bounding boxes, and may involve the indication of the presence of an item in an image by any delineating shape or region. Further details concerning 3D projection modeling are provided hereinbelow with reference to FIG. 14C. Here, by way of example, following the performance of 3D projection modeling, a new bounding box 1404 is seen to be inserted in images 1102 and 1104.

It is appreciated that the addition of a bounding box such as bounding box 1404 to an image, as carried out by 3D projection modeling, is not necessarily accurate, at least because the item apparently delineated by the bounding box may not actually appear in the image. Here, by way of example, item 102 does not appear in image 1104 due to the blocking thereof by shopper 106 and the annotation of image 1104 by bounding box 1404 is therefore inaccurate.

In order to distinguish between images successfully ameliorated by 3D modelling projection and images unsuccessfully ameliorated by 3D modelling projection, images output by 3D modelling projection are preferably filtered, as schematically indicated by a filtering step 1410. Such filtering may be based on visual or geometrical properties of the images and is further detailed hereinbelow with reference to FIG. 14D.

Here, by way of example, as a result of the image filtering, image 1104 is rejected as incorrectly including bounding box 1404 and images 1101, 1102 and 1103 are accepted as successfully processed images, including accurate information relating to the presence and location of item 102. Successfully processed images 1101, 1102 and 1103 are preferably fed back into the AI image processing algorithm in order to further train the algorithm to identify item presence and location with acceptable accuracy. Such AI processing and training are preferably iteratively performed until the seed AI algorithm has been trained and developed into a mature algorithm, performing with a sufficient level of accuracy such that no further training is required.

Figure 14C:
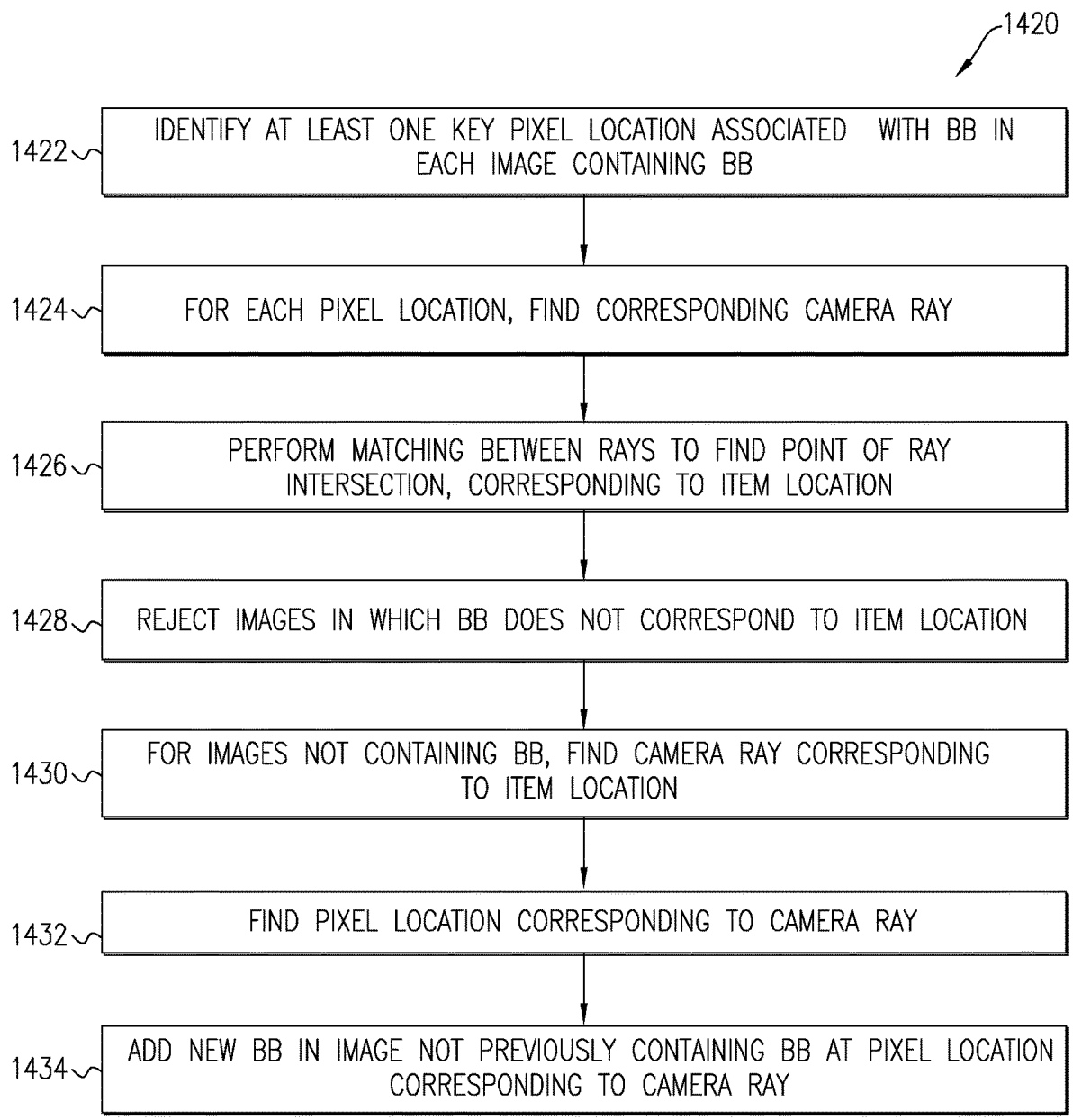
FIG. 14C is a simplified flow chart illustration illustrating steps involved in a stage of the amelioration of AI failure cases performed in accordance with the embodiment of FIG. 14B.

Reference is now made to FIG. 14C, which is a simplified flow chart illustration illustrating steps involved in the 3D modeling projection stage of the amelioration of AI failure cases performed in accordance with the embodiment of FIG. 14B.

As seen in FIG. 14C, a method 1420 for 3D projection modelling 1402 preferably begins at a first step 1422, whereat at least one key pixel location associated with a bounding box in each image containing a bounding box is found. It is understood that the key pixel location may be within the bounding box, for example at the center of the bounding box or at each of the four corners of the bounding box, or may be outside of the bounding box in close proximity thereto.

As seen at a second step 1424, the camera ray corresponding to each key pixel location is preferably then found. It is appreciated that the finding of the camera ray corresponding to each pixel location is preferably based on the initial inter-camera calibration, as detailed hereinabove with reference to FIGS. 2A and 2B. Such inter-camera calibration serves to establish pixel-to-ray calibration, such that parameters of rays illuminating a given camera viewing an item within a scene may be correlated to the pixel location at which the item appears in the camera sensor. In the case that multiple key pixel locations are found for a given bounding box at first step 1422, corresponding multiple rays are preferably found at second step 1424, allowing both the location and shape of the imaged item to be ascertained.

As seen at a third step 1426, matching is preferably then performed between the rays identified at second step 1424, wherein the point or region of intersection of the rays is preferably ascertained. It is appreciated that the point or region of ray intersection may be considered to correspond to the location of the imaged item. Intersection of at least two rays may be considered to be sufficient to establish the presence of imaged item 102 at the region of ray intersection.

As seen at a fourth step 1428, bounding boxes corresponding to key pixel locations correlated to rays not intersecting with the point of intersection found at third step 1426 are considered to be incorrectly annotated bounding boxes and are therefore rejected. It is appreciated that fourth step 1428 serves to filter out false positives, in which the AI algorithm may falsely place bounding boxes in images which do not actually contain the item or may place bounding boxes at incorrect locations within images.

As seen at a fifth step 1430, once the item location has been established based on ray intersection, the camera rays corresponding to the item location in the cases of cameras having outputs not containing a bounding box may be found. The pixel location corresponding to the camera ray may be ascertained based on the known pixel-to-ray calibration, as seen at a sixth step 1432. Subsequently, as seen at a seventh step 1434, a new bounding box may be drawn in images not previously containing a bounding box at that pixel location identified in sixth step 1432.

It is appreciated that, in certain embodiments of the present invention, steps in method 1420 may be obviated. For example, in the case that cameras 110 are embodied as depth cameras, pixel-to-ray correlation for such cameras is automatically known and correlation steps such as steps 1424 and 1432 may therefore be obviated.

Figure 14D:
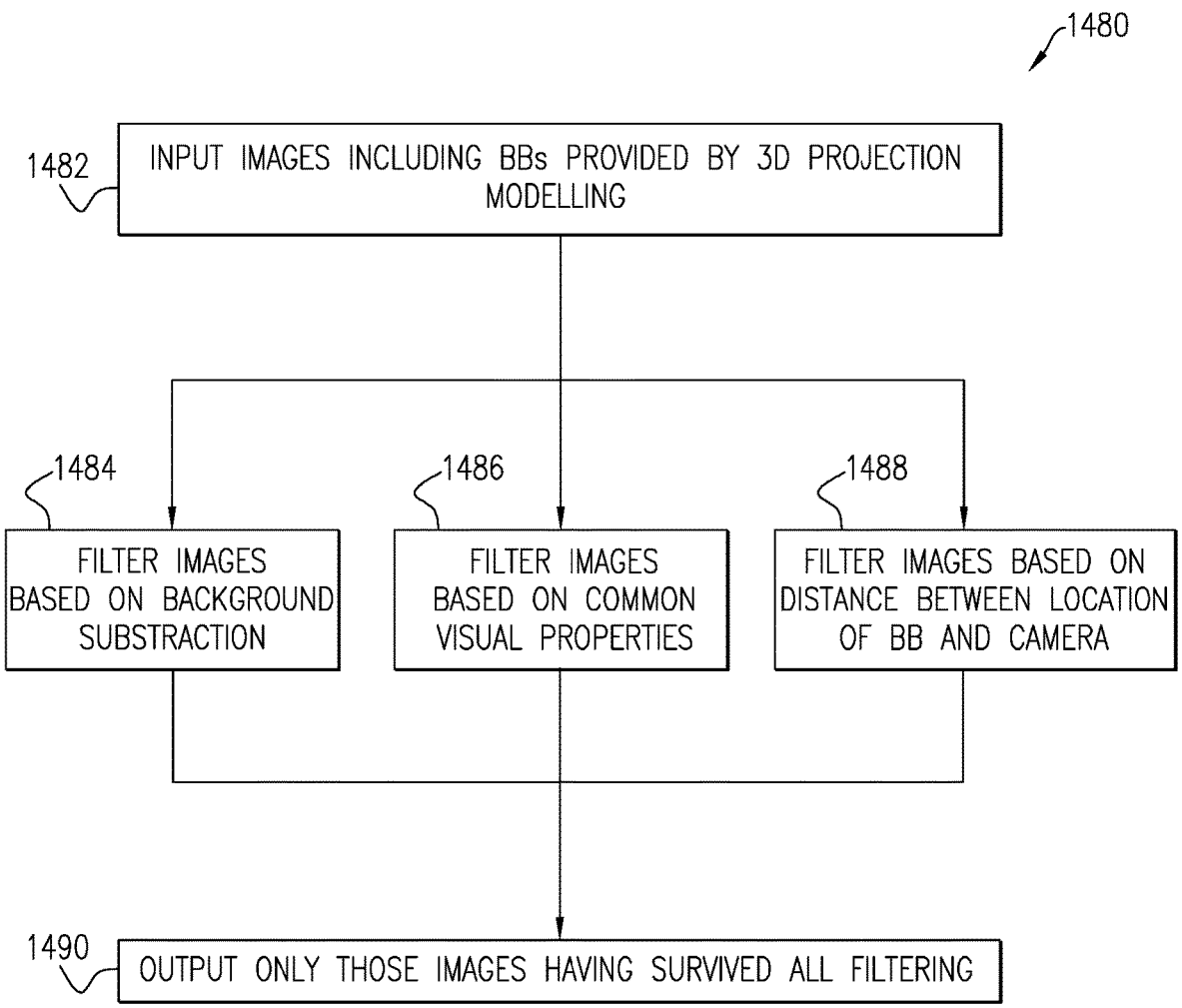
FIG. 14D is a simplified flow chart illustration illustrating steps involved in a stage of the amelioration of AI failure cases performed in accordance with the embodiment of FIG. 14B.

Reference is now made to FIG. 14D, which is a simplified flow chart illustration illustrating steps involved in the filtering stage of the amelioration of AI failure cases performed in accordance with the embodiment of FIG. 14B.

As seen in FIG. 14D, a method 1480 for filtering 1410 (FIG. 14B) the outputs of 3D projection modelling 1402 (FIG. 14B) preferably begins at a first step 1482, whereat images output by 3D projection modelling are provided. These images may be filtered by at least one of a variety of possible filtering approaches.

As seen at second step 1484, images may be filtered based on background subtraction, wherein a time series of images having a static background are rejected as not showing item 102 being handled by shopper 106, since such images would be expected to have a dynamic background which changes over time due to changes in the position of the item.

Additionally or alternatively, as seen at a third step 1486, images may be filtered based on common visual properties thereof. In accordance with third step 1486, visual properties of bounding boxes within images input at first step 1482 are compared in order to evaluate the similarity in visual properties thereof. Such visual properties may include color, texture or other properties. In the case that a bounding box in an image is found to have markedly different visual properties compared to the visual properties of bounding boxes in other ones of the images provided at first step 1482, the bounding box is considered not to correspond to the same item as that identified by the other bounding boxes and is rejected.

Additionally or alternatively, as seen at a fourth step 1488, images may be filtered based on geometrical properties thereof. In particular, the distance between a given camera, the location of which is known based on the initial camera inter-calibration, and the apparent item location based on the location of the bounding box in the corresponding camera image may be found. The distance between the camera and the apparent item location may be compared for consistency with the expected distance between the camera and the item location, which distance is known based on the item location as found by 3D modelling projection, as described with reference to FIG. 14C. In the case that the camera-item distance is unacceptably small, this is considered to be indicative of another object blocking the item of interest, as seen the case in image 1104 (FIG. 14B) and the image is rejected. It is appreciated that the use of depth cameras is particularly advantageous in facilitating geometrical filtering, due to the depth information provided thereby.

As seen at a fifth step 1490, only those images having survived all of the filtering steps 1484, 1486 and 1488 are preferably considered to be images including accurately placed bounding boxes being indicative of the presence and location item 102. It is appreciated that second, third and fourth steps 1484, 1486 and 1488 may be carried out in parallel or may be carried out sequentially, wherein only those images considered acceptable based on a first type of filtering are passed on to a subsequent filtering step. Those images output at fifth step 1490 are preferably subsequently fed back into the original AI algorithm for further training of the AI algorithm.

It is appreciated that in embodiments of the invention described hereinabove with reference to FIGS. 9A-14D, the item 102 of interest, with respect to which item 102 bounding boxes are preferably inserted by the AI algorithm, is in a typically inanimate item handled by shopper 106. However, in certain cases, it may be desirable to train the AI algorithm to identify the presence and location of shopper 106 rather than/in addition to item 102 handled thereby, for example in order to facilitate the tracking of shopper 106 within premises 104 (FIGS. 9A and 9B). A preferred embodiment of the present invention, in which the AI algorithm is trained to identify the presence and location of individual 106 based on amelioration of AI-failure cases, is now described with reference to FIGS. 15A-17D.

Figure 15A:
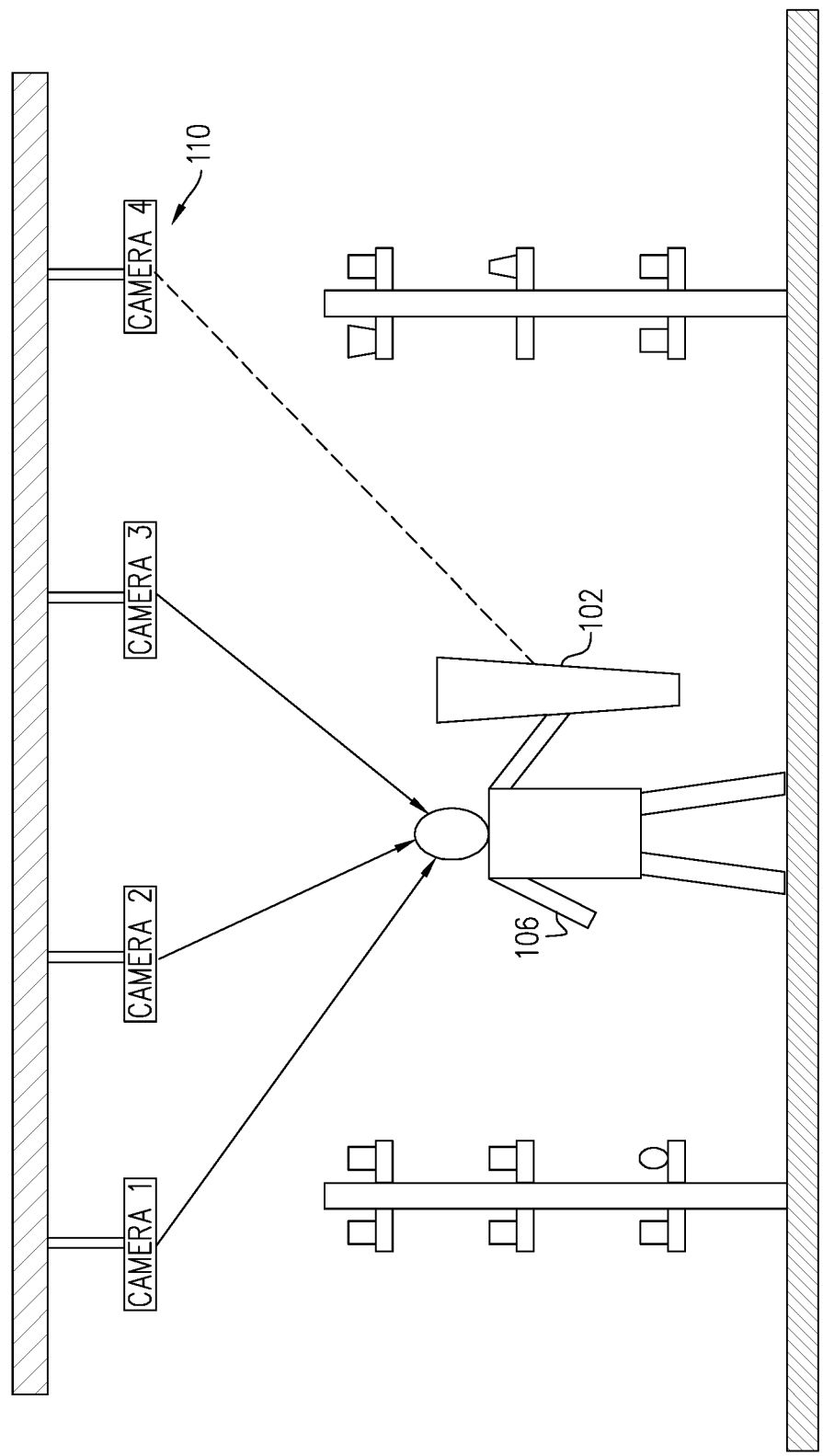
FIGS. 15A and 15B are simplified illustrations of part of the implementation of FIGS. 9A and 9B, showing lines of sight of a plurality of cameras in a context including a human subject and corresponding images, as annotated by an AI algorithm, in accordance with another preferred embodiment of the present invention.
Figure 15B:
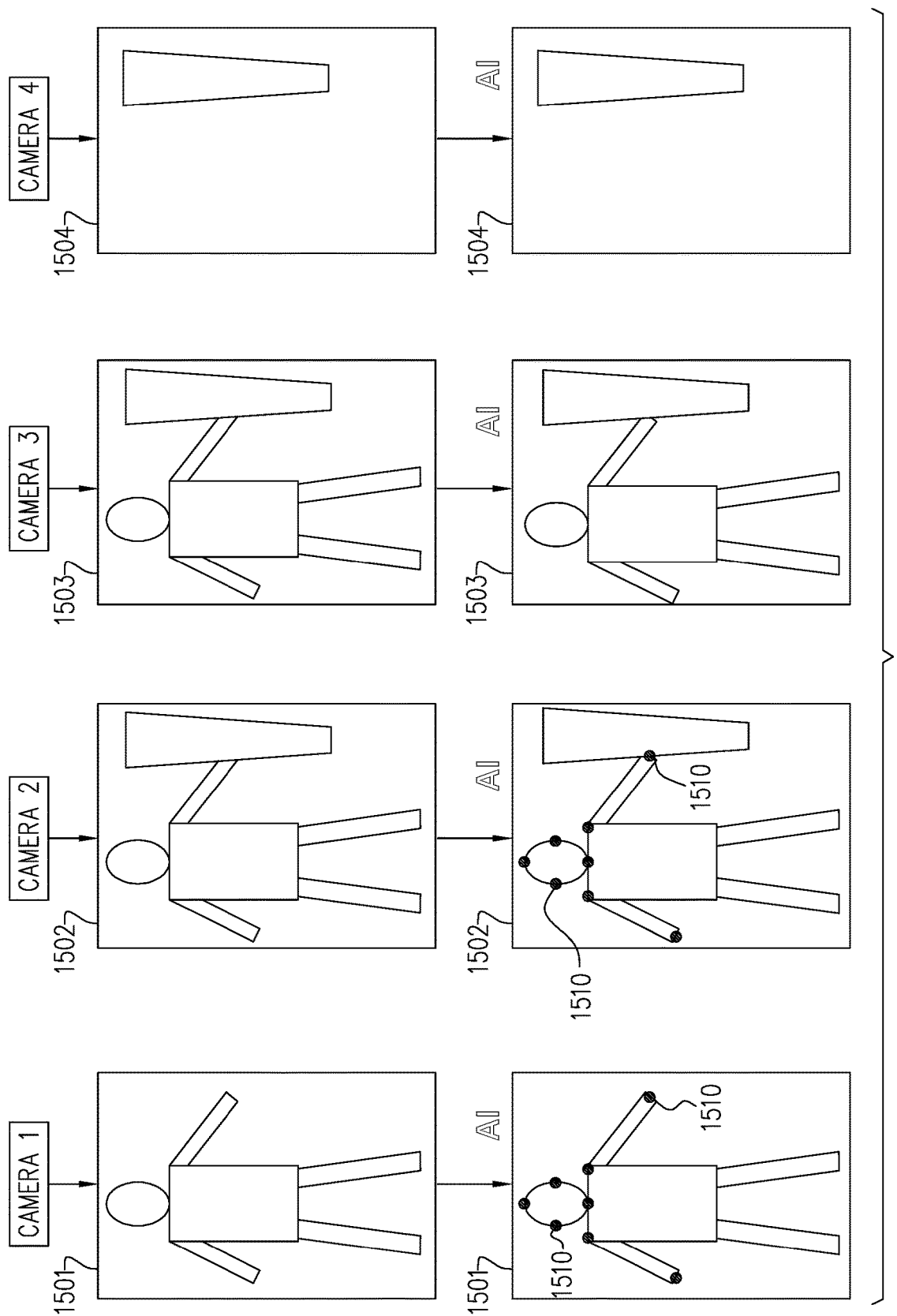

Turning now to FIGS. 15A and 15B, an additional scenario involving an arrangement of item 102 with respect to shopper 106 and cameras 1-4 is illustrated. Cameras 1-4 preferably simultaneously image shopper 106 handling item 102 and provide respective output images 1501, 1502, 1503 and 1504.

As seen in FIG. 15B, images 1501, 1502, 1503 and 1504 are preferably processed by an AI algorithm in order to identify the presence and location of shopper 106 therein. The presence and location of shopper 106 is indicated by key points 1510 forming a pose graph of shopper 106. Typically, images may be annotated by eight key points by the AI algorithm in order to form a pose graph representing an upper portion of the body of shopper 106. It is appreciated, however, that a greater or fewer number of key points may be included in the pose graph, depending on the particular image processing requirements.

Here, by way of example, eight key points 1510 are seen to be added to each of images 1501 and 1502, forming a pose graph delineating the head, arms and upper portion of the torso of shopper 106. No key points are added to either of images 1503 and 1504. In the case of image 1503, no key points are added following processing of the image by the AI algorithm, despite shopper 106 appearing in image 1503. Such a case may be termed an AI failure case, wherein the camera output, here image 1503, as analyzed by the AI algorithm is not found to contain information indicating the presence and location of individual 106, despite such information being present in the camera output. Such AI failure may occur due to limitations in the AI algorithm, as a result of the AI algorithm not being trained to identify the presence and location of items, here human items, in images to a sufficient level of accuracy.

It is appreciated that the AI failure case illustrated with respect to image 1503 differs from the case of image 1504. In both cases, the AI algorithm does not identify the presence and location of the item—namely shopper 106—in the image and no key points are added to the respective images. However, whereas in the case of image 1504 individual 106 indeed does not appear in the image and the AI algorithm thus correctly does not identify individual 106 within the image, in the case of image 1503 individual 106 does appear in the image and lack of identification of the presence and location of individual 106 in the image is due to failure of the AI algorithm rather than innate properties of the image.

Figure 16A:
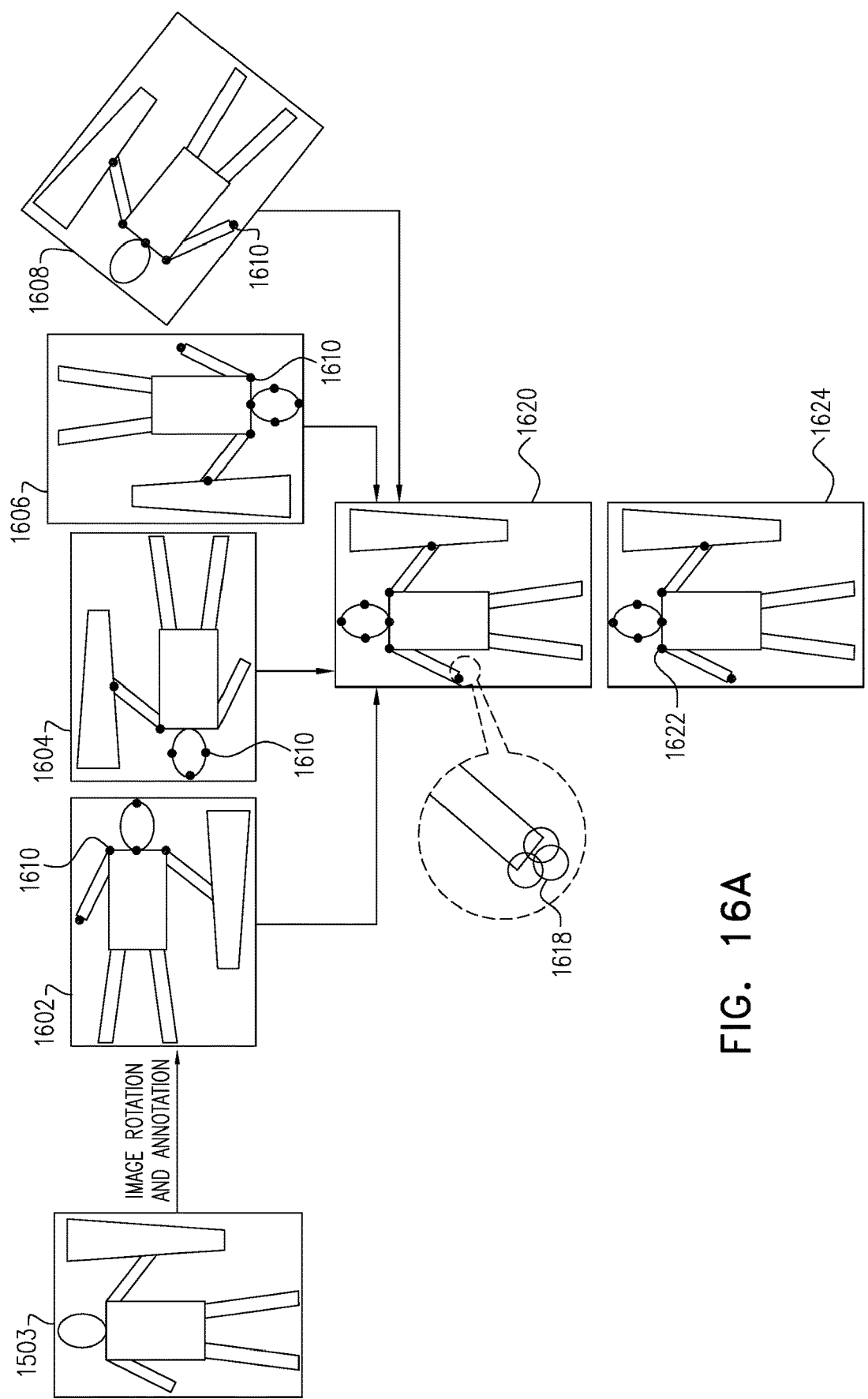
FIG. 16A is a simplified illustration of part of the implementation of FIGS. 9A and 9B showing amelioration of AI failure cases by image modification, in accordance with yet another preferred embodiment of the present invention.

In order to ameliorate the AI failure cases, such as image 1503 in the example of FIGS. 15A and 15B, image modification may be employed. FIG. 16A is a simplified illustration of part of the implementation of FIGS. 9A and 9B showing amelioration of AI failure cases by image modification, in accordance with a preferred embodiment of the present invention.

As seen in FIG. 16A, an AI failure case image such as image 1503 may be output by at least one camera viewing a scene. It is appreciated that image modification methods as described herein with reference to FIGS. 16A and 16B may be performed on the output of one or more cameras. Following the ascertaining, based on employing artificial intelligence as described with reference to FIG. 15B, that the output does not contain information indicating the presence and location of at least one human object in the scene, the camera output may be modified.

Preferably, the modifying involves rotating the AI-failure image by a multiplicity of mutually different angles and employing AI to analyze each modified output, as rotated by a given angle, to find the presence and location of the human item in the image.

Here, by way of example, the original image 1503 is shown to be rotated by four different angles to produce rotated images 1602, 1604, 1606 and 1608. The AI algorithm originally unsuccessfully employed to analyze image 1503 is preferably re-employed to analyze each of rotate images 1602, 1604, 1606 and 1608. The employment of the AI algorithm on the modified AI-failure images has been found, in some cases, to result in successful annotation of the images and identification of the presence and location of an item in the images. Here, by way of example, a plurality of key points 1610 is shown to be added to each of images 1602, 1604, 1606 and 1608 identifying, at least partially, the location of individual 106 therein as a result of the processing thereby by the AI algorithm. It is appreciated that the employment of the AI algorithm on the modified AI-failure images may be partially successful, resulting in the insertion of some although not all key points within the images, as shown in the case of images 1602, 1604 and 1608. It is further appreciated that the employment of the AI algorithm on the modified AI-failure images may be completely successful, resulting in the insertion of the maximum selected number of key points within the images, as shown in the case of image 1606, seen to be annotated by the maximum number of eight key points.

The annotated images are preferably then re-aligned by reverse rotation and the key points now present therein superimposed, in order to define a possibly irregular outline corresponding to the location of each key point at the region of overlap 1618 of the corresponding key points, as shown in frame 1620. One or more new key points 1622 may then be inserted at the location of each key point overlap, as shown at frame 1624. It is appreciated that the final pose graph comprising the new set of key points illustrated in frame 1624 is more accurate than would be the case should the various individual key points not have been superimposed, since the final pose graph of frame 1624 is based on a more refined rendering of the key point locations in turn based on superimposition of the individual corresponding key points.

It is understood that although the image modification described herein is detailed with respect to rotation of the original image, additional or alternative types of image modification are also possible, including, by way of example, changes in image color scale, image warping and selective changes in image magnification.

It is further understood that the image modification described herein is not limited to application to AI failure images, such as image 1503. Rather, such image modification may also be applied to images in which the AI algorithm initially successfully identified the item presence and location, in order to better define the location of the key points. In such a case, the original, non-modified image, as processed by the AI algorithm, may be annotated with a set of key points indicating the presence and location of a human item, but the position of one or more of the key points may be inaccurate. The use of the image modification method described herein may be advantageous in order to improve the pose graph comprising the key points. The use of the image modification method described herein may also be advantageous in the case of an annotated image containing some but not the maximum number of key points. In such a case, image modification may be used to ameliorate the image by supplementing additional key points, thus leading to the generation of a more complete pose graph representing shopper 106.

Figure 16B:
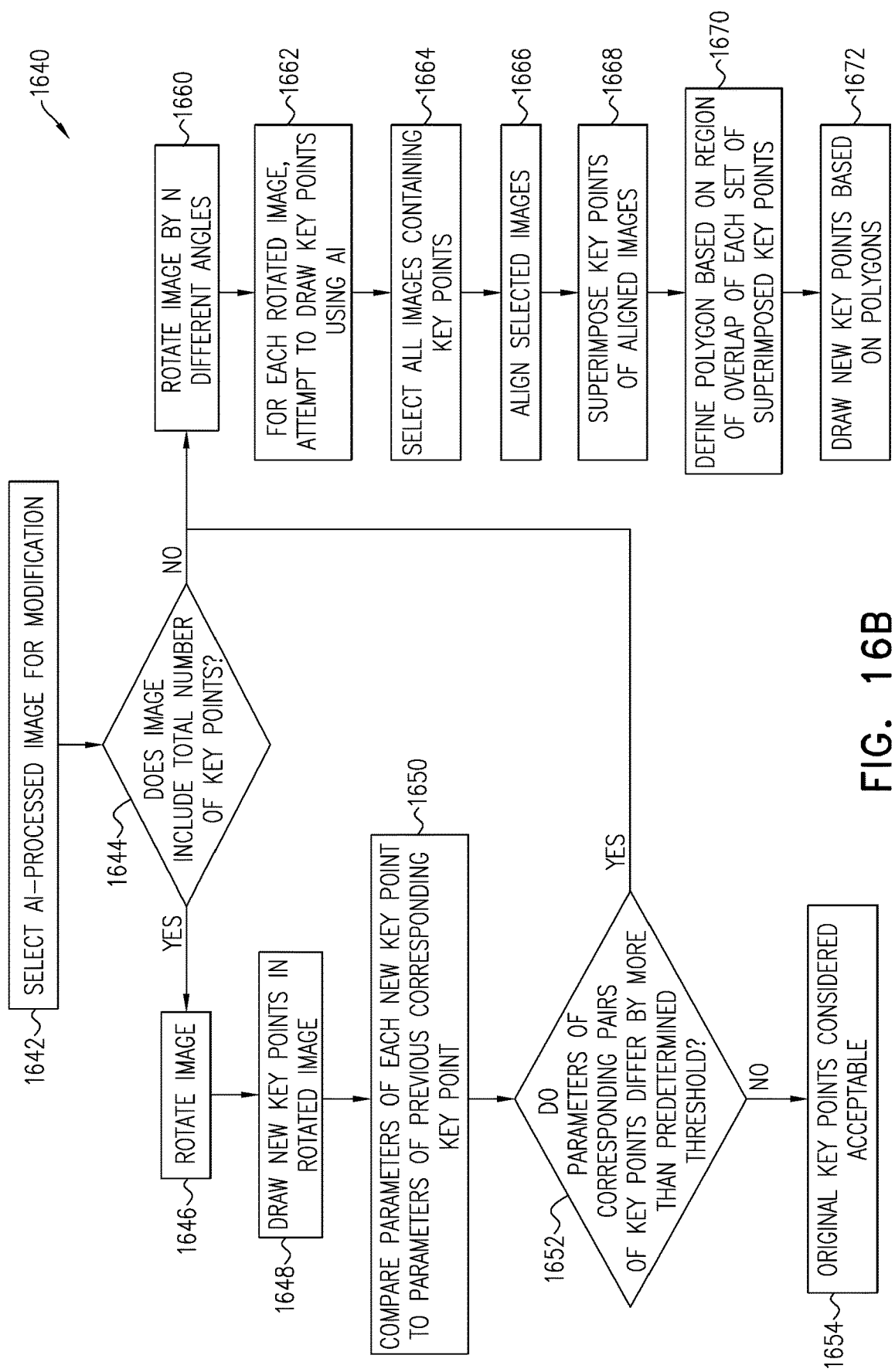
FIG. 16B is a simplified flow chart illustration illustrating steps in the amelioration of AI failure cases performed in accordance with the embodiment of FIG. 16A.

Reference is now made to FIG. 16B, which is a simplified flow chart illustration illustrating steps in the amelioration of AI failure cases and/or pose graph improvement performed in accordance with the embodiment of FIG. 16A.

As seen in FIG. 16B, a method 1640 for amelioration of AI failure cases and/or pose graph improvement based on image modification may begin at a first step 1642, whereat an AI-processed image is selected for modification. Method 1640 then proceeds to check, at a second query step 1644, whether the image selected at first step 1642 contains the total possible number of key points, such as 8 key points. It is appreciated that query step 1644 serves to differentiate between successfully processed images containing a full pose graph comprising the maximum number of key points and AI-failure or partial failure images in which less than the maximum or no key points were added following AI processing of the image.

In the case that it is found, at second query step 1644, that the image does contain the total number of key points, the image is rotated at a third step 1646 and an AI algorithm applied in order to redraw the key points on the rotated image at a fourth step 1648. Parameters of the new key points drawn on the rotated image at fourth step 1648 are then compared to parameters of the corresponding original key points present in the image, as seen at a fifth step 1650. Such parameters may include key point location or other parameters.

As seen at a sixth query step 1652, method 1640 then proceeds to ascertain whether parameters of the corresponding pairs of key points, namely the original key point and the corresponding newly drawn key point in the rotated image, differ by more than a predetermined threshold. In the case that the parameters do not differ by more than a predetermined threshold, the original set of key points is considered to be acceptable, as seen at a seventh step 1654 and no further processing of the original image is considered necessary. In this case, the pose graph in the image is considered to be sufficiently accurately delineated such that no further modification is required and the image is ready for further processing, as is outlined hereinbelow with reference to FIGS. 17A-17D.

In the case that the parameters of the original key points compared to the new key points do differ by more than a predetermined threshold, as found at sixth query step 1652, or in the case that the image does not contain the total number of key points, as found at second query step 1644, method 1640 proceeds to an eighth step 1660, whereat the image is rotated by N different angles, wherein N may be any integer. For each rotated image, the rotated image is preferably processed by an AI algorithm in order to attempt to annotate the image and draw a set of key points within the image indicating the presence and location of a human item therein, as seen at a ninth step 1662. It is appreciated that in some cases ninth step 1662 may be successful, resulting in the drawing of additional key points in the rotated images, whereas in other cases ninth step 1662 may be unsuccessful, either due to failure of the AI algorithm to identify an individual appearing in the image or due to an individual indeed not appearing in the image.

It is further appreciated that in the case that ninth step 1662 is successful in drawing new key points in previously unsuccessfully AI-processed images, method 1640 has succeeded in ameliorating AI-failure cases by way of image modification. Such an approach differs from conventional image modification approaches in which images successfully processed by AI algorithms may be modified in order to extract further information therefrom. In contrast, in a preferred embodiment of the present invention, images unsuccessfully processed by AI algorithms are modified in order to ameliorate the images and convert the previously unsuccessfully processed images to successfully processed images.

As seen at a tenth step 1664 and an eleventh step 1666, all images containing key points following the AI processing thereof are selected and spatially aligned. Such spatial alignment may involve reverse rotation of the images, so as to return all of the images to their original orientation, thereby allowing subsequent superimposition thereof, as seen at a twelfth step 1668. It is appreciated that tenth step 1664 serves to distinguish between outputs of the at least one camera which contain information indicating the presence and location of at least one human object in the scene and outputs of the at least one camera which do not contain information indicating the presence and location of the at least one human object in the scene, as found by AI processing of the images.

Only those images containing information indicating the presence and location of the object, as preferably delineated by key points in the image, are compiled into a set of images, which are mutually spatially aligned at eleventh step 1666 and then superimposed at twelfth step 1668.

As seen at a thirteenth step 1670, a polygon is preferably then defined based on the region of overlap of each set of superimposed key points. As seen at fourteenth step 1672, a new key point is then added corresponding to the location of each polygon, which new key point is preferably more accurately corresponds to the relevant part of the body of shopper 106 than the original key point present in any of the individual images.

Figure 17A:
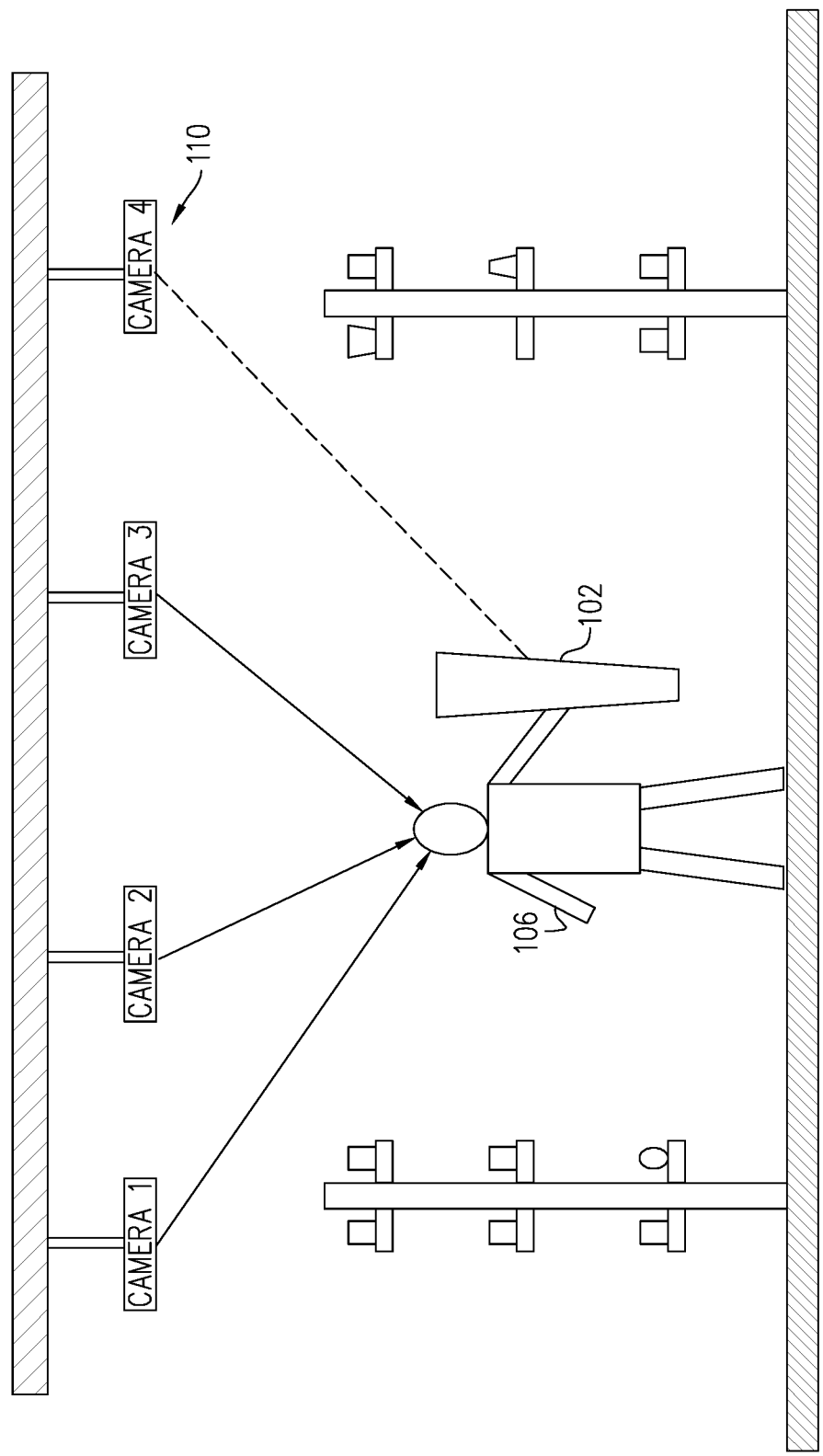
FIG. 17A and 17B are simplified illustrations of part of the implementation of FIGS. 9A and 9B showing amelioration of AI failure cases by 3D modeling, in accordance with a further preferred embodiment of the present invention.
Figure 17B:
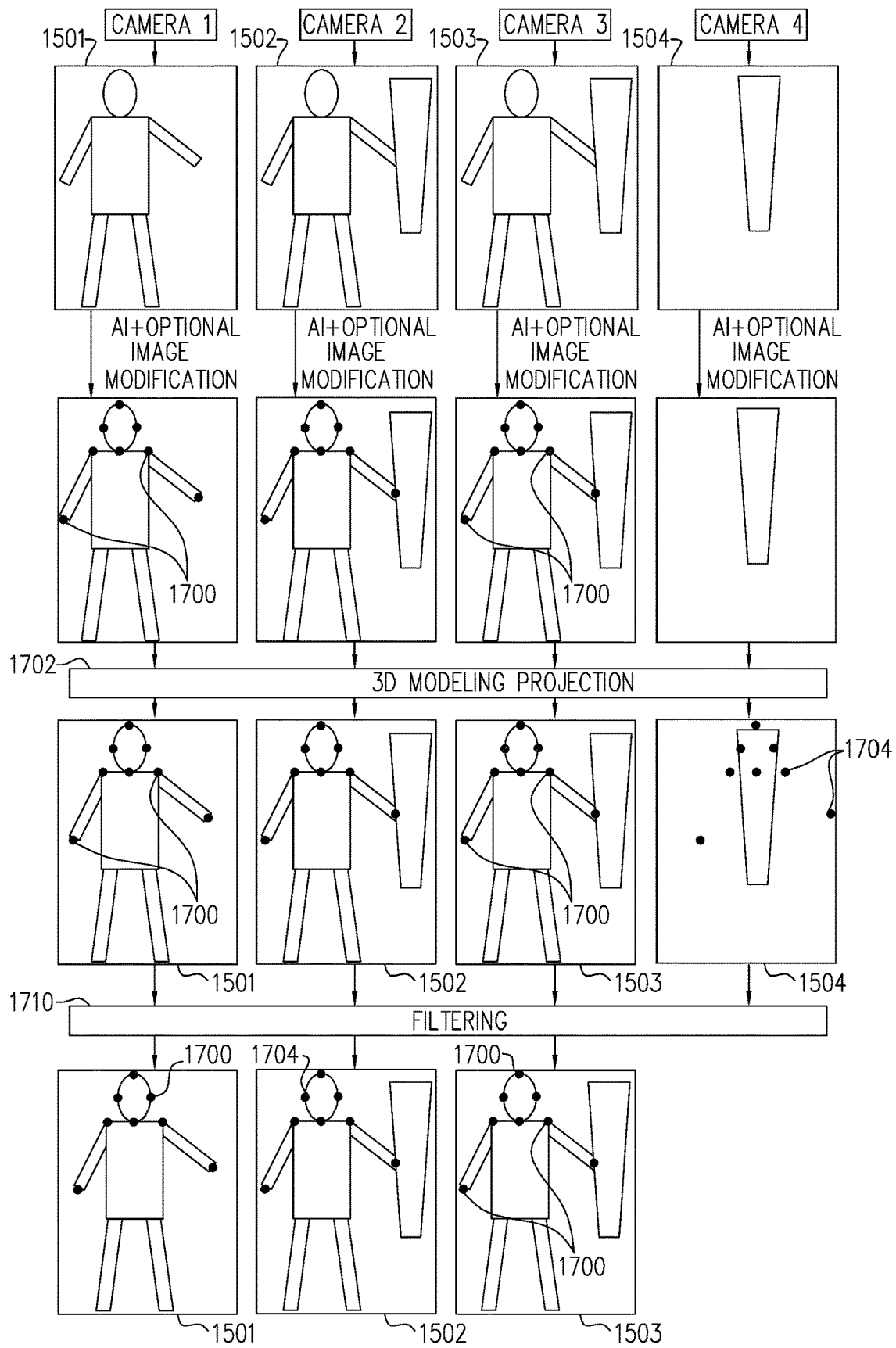

Reference is now made to FIGS. 17A and 17B, which are simplified illustrations of part of the implementation of FIGS. 9A and 9B showing amelioration of AI failure cases by 3D modeling, in accordance with a preferred embodiment of the present invention.

As seen in FIG. 17A, a third scenario involving the same arrangement of item 102 with respect to shopper 106 and cameras 1-4 as that shown in FIG. 15A is illustrated. Camera outputs 1501, 1502, 1503 and 1504 are preferably processed by an AI algorithm in order to find the presence and location of individual 106 therein, which individual may be indicated by a pose graph comprising a set of key points annotating the image. It is understood that such processing may involve AI processing of the original image, as described hereinabove with reference to FIG. 15B, as well as AI processing based on image modification, as described hereinabove with reference to FIGS. 16A and 16B.

In this case, by way of example, a plurality of key points 1700 is seen to be inserted in images 1501 and 1503 and no key points are seen to be inserted in images 1502 and 1504. It is appreciated that the plurality of key points 1700 shown in the case of images 1501 and 1503 may be key points originally added to the image following initial AI analysis thereof, may be key points based on an initial pose graph that was subsequently refined by way of image modification, or may be a new set of key points based on an initial AI-failure image as ameliorated based on image modification, as described hereinabove with reference to FIGS. 16A and 16B.

Irrespective of the particular nature of the key points 1700 present in images 1501 and 1503, 3D modeling projection is preferably then performed on preferably all of the images output by cameras 1-4, as schematically indicated at a 3D projection modeling step 1702. 3D projection modeling preferably involves distinguishing between outputs of cameras which, as analyzed by the AI algorithms, are found to contain information indicating the presence and location of individual 106 and outputs of cameras which, as analyzed by the AI algorithms, are not found to contain such information and enhancing outputs which do not contain information indicating the presence and location of individual 106 by adding thereto information indicating the presence and location of individual 106. More specifically, 3D projection modelling preferably involves the addition of key points to images not containing key points, based on the location of key points in corresponding images, as found by intersection of rays corresponding to pixels associated with the key points. 3D projection modeling may be carried out by an image analyzer, employing artificial intelligence. Further details concerning 3D projection modelling are preferably provided hereinbelow with reference to FIG. 17C. Here, by way of example, following the performance of 3D projection modelling, a new set of key points 1704 is seen to be inserted in images 1502 and 1504.

It is appreciated that the addition of a new set of key points such as key points 1704 to an image, as carried out by 3D projection modeling, is not necessarily accurate, at least because the human item apparently delineated by the key points may not actually appear in the image. Here, by way of example, shopper 106 does not appear in image 1504 due to the blocking thereof by item 102 and the annotation of image 1504 by key points 1704 is therefore inaccurate.

In order to distinguish between images successfully ameliorated by 3D modelling projection and images unsuccessfully ameliorated by 3D modelling projection, images output by 3D modelling projection are preferably filtered, as schematically indicated by a filtering step 1710. Such filtering may be based on visual or geometrical properties of the images and is further detailed hereinbelow with reference to FIG. 17D.

Here, by way of example, as a result of the image filtering, image 1504 is rejected as incorrectly including key points 1704 and images 1501, 1502 and 1503 are accepted as successfully processed images, including accurate information relating to the presence and location of individual 106. Successfully processed images 1501, 1502 and 1503 are preferably fed back into the AI image processing algorithm in order to further train the algorithm to identify the presence and location of an individual with acceptable accuracy. Such AI processing and training are preferably iteratively performed until the seed AI algorithm has been trained and developed into a mature algorithm, performing with a sufficient level of accuracy such that no further training is required.

Figure 17C:
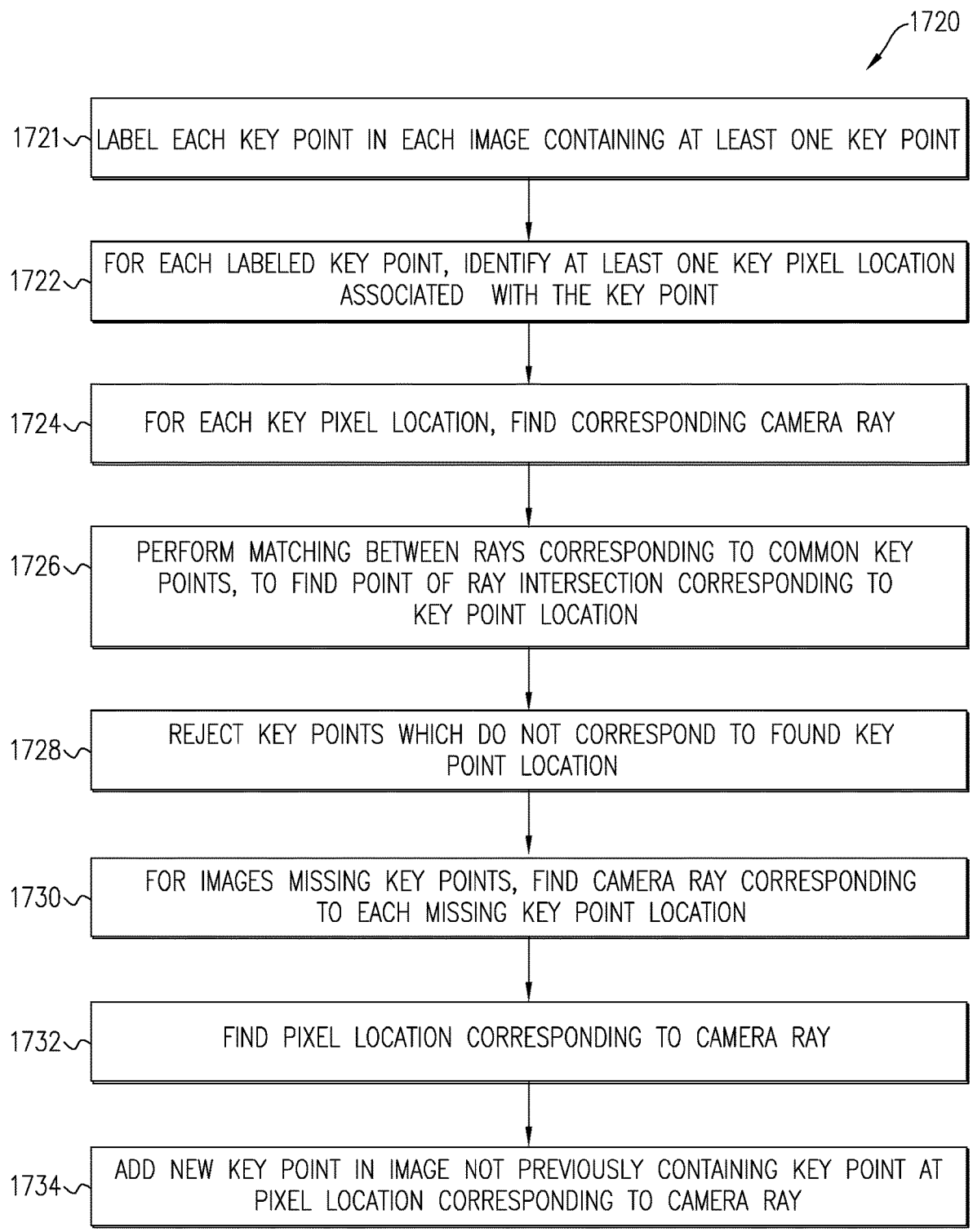
FIG. 17C is a simplified flow chart illustration illustrating steps involved in a stage of the amelioration of AI failure cases performed in accordance with the embodiment of FIG. 17B.

Reference is now made to FIG. 17C, which is a simplified flow chart illustration illustrating steps involved in a 3D projection modeling stage of the amelioration of AI failure cases performed in accordance with the embodiment of FIG. 17B.

As seen in FIG. 17C, a method 1720 for 3D projection modelling 1702 preferably begins at a first step 1721, wherein each key point in each image containing at least one key point is labeled as to the location on the body to which the key point corresponds. Preferably following the labeling of the key points, at least one key pixel location associated with each key point is found at a second step 1722. It is understood that the key pixel location may be within the key point, for example at the center of the key point or outside of the key point.

As seen at a third step 1724, the camera ray corresponding to each key pixel location is preferably then found. It is appreciated that the finding of the camera ray corresponding to each pixel location may be based on the initial inter-camera calibration, as detailed hereinabove with reference to FIGS. 2A and 2B. Such inter-camera calibration serves to establish pixel-to-ray calibration, such that parameters of rays illuminating a given camera viewing an item within scene may be correlated to the pixel location at which the item appears in the camera image.

As seen at a fourth step 1726, matching is preferably then performed between the rays identified at third step 1724, wherein the point or region of intersection of the rays is preferably ascertained. It is appreciated that the point or region of ray intersection may be considered to correspond to the location on the human body indicated by each respective labeled key point. Intersection of at least two rays may be considered to be sufficient to establish the presence of the body part at the region of ray intersection.

As seen at a fifth step 1728, key points corresponding to key pixel locations correlated to rays not intersecting with the point of intersection are considered to be incorrectly placed key points and are therefore rejected. It is appreciated that fifth step 1728 serves to filter out false positives, in which the AI algorithm may falsely place key points in images which do not actually contain the individual or may incorrectly label key points.

As seen at a sixth step 1730, once the body part location has been established based on ray intersection, the camera ray corresponding to the body part location in the cases of cameras having outputs not containing a key point may be found. The pixel location corresponding to the camera ray may be ascertained based on the known pixel-to-ray calibration, as seen at a seventh step 1732. Subsequently, as seen at an eighth step 1734, a new set of key points may be drawn in images not previously containing a key point at that pixel location identified in seventh step 1732.

Figure 17D:
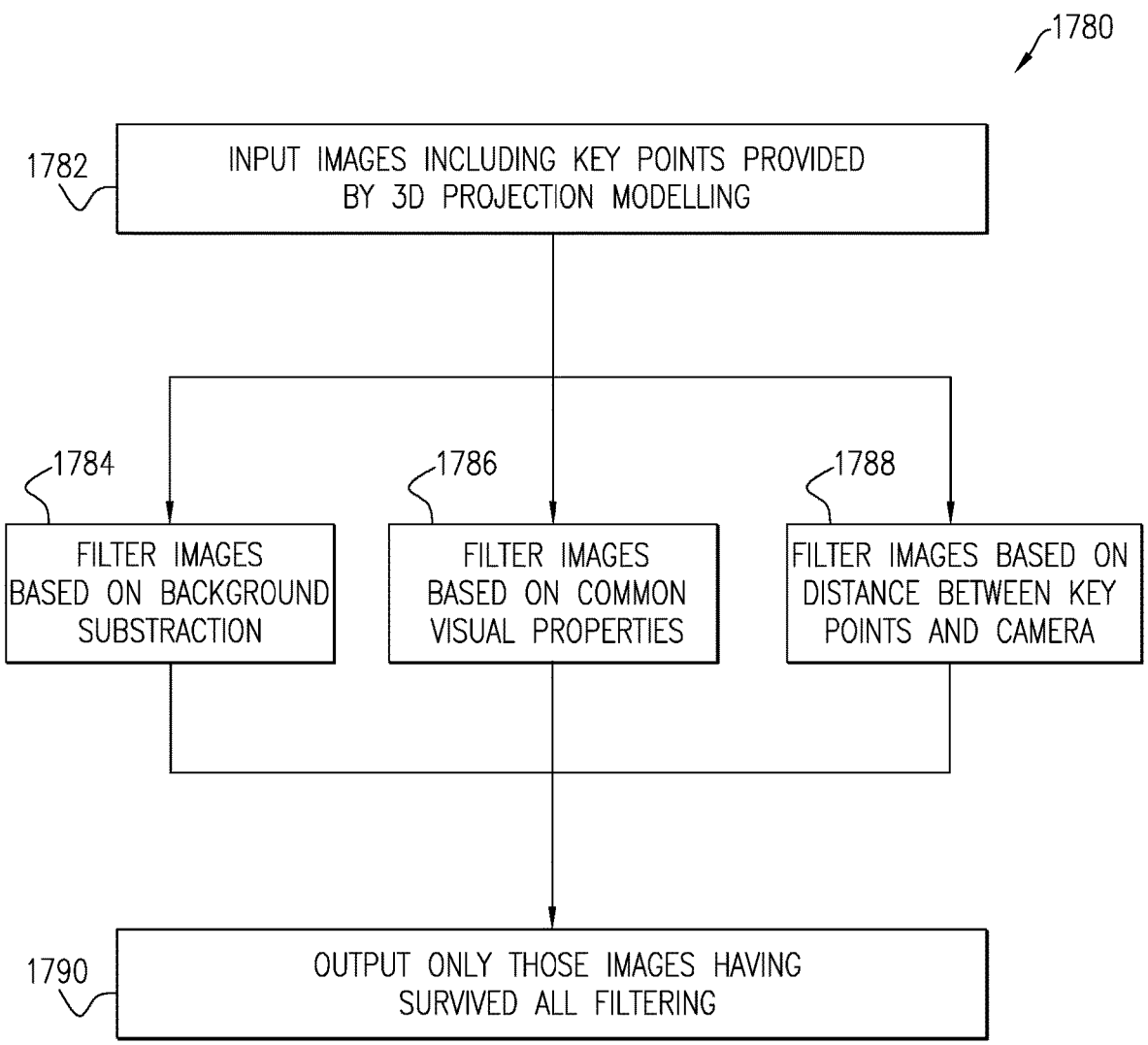
FIG. 17D is a simplified flow chart illustration illustrating steps involved in a stage of the amelioration of AI failure cases performed in accordance with the embodiment of FIG. 17B.

Reference is now made to FIG. 17D, which is a simplified flow chart illustration illustrating steps involved in a filtering stage of the amelioration of AI failure cases performed in accordance with the embodiment of FIG. 17B.

As seen in FIG. 17D, a method 1780 for filtering 1710 the outputs of 3D projection modelling 1702 preferably begins at a first step 1782, whereat images output by 3D projection modelling are provided. These images may be filtered by at least one of a variety of possible filtering approaches.

As seen at second step 1784, images may be filtered based on background subtraction, wherein a time series of images having a static background are rejected since such images would be expected to have a dynamic background.

Additionally or alternatively, as seen at a third step 1786, images may be filtered based on common visual properties thereof. In accordance with third step 1786, visual properties of corresponding key points within images input at first step 1782 are compared in order to evaluate the similarity in visual properties thereof. Such visual properties may include color, texture or other properties. In the case that a key point in an image is found to have markedly different visual properties compared to the visual properties of corresponding key point in other ones of the images provided at first step 1782, the key point is considered not to correspond to the same body part as that identified by the other key points and is rejected.

Additionally or alternatively, as seen at a fourth step 1788, images may be filtered based on geometrical properties thereof. In particular, the distance between a given camera, the location of which is known based on the initial camera inter-calibration, and the apparent body part location based on the location of the key point may be found. The distance between the camera and the apparent body part location may be compared for consistency with the expected distance between the camera and the body part location, which distance is known based on the location of the body part as found by 3D modelling projection, described with reference to FIG. 17C. In the case that the camera-body part distance is unacceptably small, this is considered to be indicative of another object blocking the body part of interest, as seen the case in image 1504 (FIG. 17B) and the image is rejected. It is appreciated that the use of depth cameras as cameras 110 is particularly advantageous in facilitating geometrical filtering step 1888, due to the depth information provided thereby.

As seen at a fifth step 1790, only those images having survived all of the filtering steps 1784, 1786 and 1788 are preferably considered to be images including accurately placed key points being indicative of the presence and location of individual 106. It is appreciated that second, third and fourth steps 1784, 1786 and 1788 may be carried out in parallel or may be carried out sequentially, wherein only those images considered acceptable based on a first type of filtering are passed on to a subsequent filtering step. Those images output at fifth step 1790 are preferably subsequently fed back into the original AI algorithm for further training of the AI algorithm.

It is appreciated that in some scenarios, the scene being imaged by cameras 110 may include more than one item 102 or individual 106. In such cases, in the case where the object of interest to be identified by the AI algorithm is item 102, multiple bounding boxes may be drawn corresponding to the number of items 102 of interest. Alternatively, an enlarged single bounding box may be drawn and the algorithm may include an output indicating that the bounding box contains more than one item of interest.

In the case where the object of interest to be identified by the AI algorithm is an individual such as shopper 106, multiple key points may be generated and the key points may be grouped into individual pose graphs, based on the labeling thereof.

It is appreciated that once the AI algorithm for identifying item presence and location has been sufficiently trained, notwithstanding whether the item is an object 102 or a human subject 106, the AI algorithm may operate within system 100 as described hereinabove with reference to FIGS. 1-8.

Figure 18:
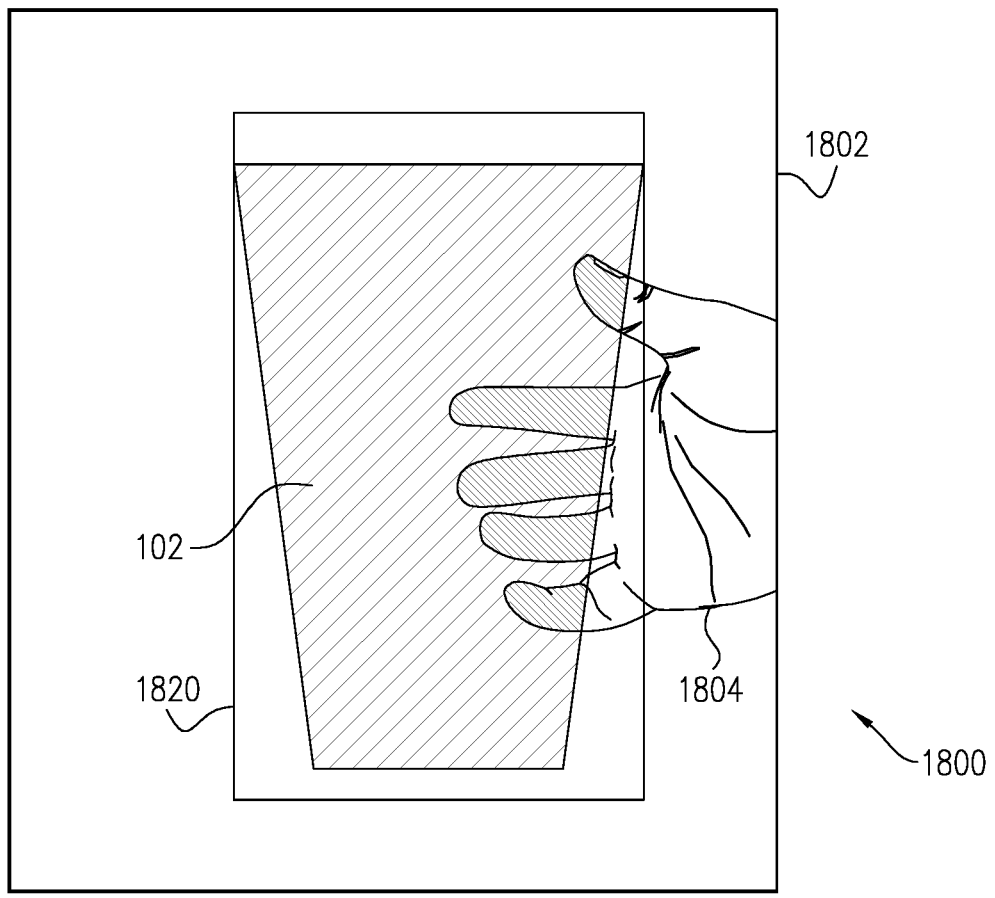
FIG. 18 is a simplified illustration of part of the implementation of FIGS. 9A and 9B showing bounding box tightening.

Reference is now made to FIG. 18, which is a simplified illustration of part of the implementation of FIGS. 9A and 9B showing bounding box tightening. Following the successful processing of images by the AI algorithm, which successful processing may involve image amelioration as described hereinabove, the successfully processed images are preferably fed back into the algorithm in order to train the algorithm. Prior to the feeding back of the images to the algorithm for the purposes of further training, it may be beneficial to perform bounding box tightening for images containing bounding boxes, in order to ensure that bounding boxes of enhanced accuracy are used for further training of the algorithm.

A portion of a successfully processed image 1800 including a bounding box 1802 is shown in FIG. 18. As seen in FIG. 18, bounding box 1802 includes therewithin item of interest 102 as well as a portion of a hand 1804 of shopper 106 handling item 102. In order to improve the accuracy of bounding box 1802, pixel segmentation may be used to differentiate between portions of the image corresponding to hand 1804 and portions of the image corresponding to item 102. Furthermore, background subtraction techniques may be applied in order to remove static portions of image 1800. As a result of such techniques, bounding box 1802 may be reduced in size and more accurately located, as seen in the case of new bounding box 1820 based on original bounding box 1802 following the tightening thereof.

It is appreciated that bounding box tightening may be achieved by additional or alternative techniques, other than pixel segmentation and background subtraction, as may be known in the art.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A method for acquiring data relating to an object comprising:
    arranging a multiplicity of cameras to view a scene, at least one reference object within said scene being viewable by at least a plurality of said multiplicity of cameras, each of said plurality of cameras acquiring at least one image of said reference object viewable thereby;
    finding a point of intersection of light rays illuminating each of said plurality of cameras;
    correlating a pixel location at which said reference object appears within each said at least one image to said light rays illuminating each of said plurality of cameras and intersecting with said point of intersection, irrespective of a three-dimensional location of said reference object within said scene, said correlating comprising deriving ray parameters of said light rays illuminating each of said plurality of cameras and corresponding to said pixel location at which said reference object appears within each said at least one image;
    ascertaining whether said light rays having said derived ray parameters intersect with said point of intersection with greater than or equal to a predetermined accuracy;
    following said ascertaining that said light rays having said derived ray parameters intersect with said point of intersection with greater than or equal to said predetermined accuracy, relocating said reference object within said scene, so as to be viewable by a different plurality of cameras of said multiplicity of cameras than said plurality of cameras by which said reference object was previously viewable prior to said relocation thereof;
    finding a point of intersection of light rays illuminating each of said different plurality of cameras; and
    correlating a pixel location at which said reference object appears within each said at least one image to said light rays illuminating each of said different plurality of cameras and intersecting with said region of intersection, irrespective of a three-dimensional location of said reference object within said scene.

2. The method according to claim 1, wherein said steps of finding and correlating are performed iteratively with respect to one another, until said light rays having said derived ray parameters are ascertained to intersect with said point of intersection with greater than or equal to said predetermined accuracy.

3. The method according to claim 1 wherein said point of intersection is a probabilistic region of intersection.

4. The method according to claim 1, wherein said ray parameters comprise at least one of intrinsic ray parameters and extrinsic ray parameters.

5. The method according to claim 1, wherein said predetermined accuracy is equal to 1 cm.

6. The method according to claim 1, wherein said plurality of cameras comprises at least two cameras.

7. The method according to claim 1, wherein said three dimensional location of said reference object is not supplied as an input parameter to said method.

8. A system for acquiring data relating to an object comprising:
   a multiplicity of cameras arranged to view a scene, at least one reference object within said scene being viewable by at least a plurality of said multiplicity of cameras, each of said plurality of cameras being operative to acquire at least one image of said reference object viewable thereby;
   an image processing sub-system operative to receive said at least one image acquired by each of said plurality of cameras and to find a point of intersection of light rays illuminating each of said plurality of cameras; and
   a pixel-to-ray calibration sub-system operative to correlate a pixel location at which said reference object appears within each said at least one image to said light rays illuminating each of said plurality of cameras and intersecting with said point of intersection, irrespective of a three-dimensional location of said reference object within said scene, and to derive ray parameters of said light rays illuminating each of said plurality of cameras and corresponding to said pixel location at which said reference object appears within each said at least one image,
   wherein said system is further operative to ascertain whether said light rays having said derived ray parameters intersect with said point of intersection with greater than or equal to a predetermined accuracy, and
   wherein, once said system has ascertained that said light rays having said derived ray parameters intersect with said point of intersection with greater than or equal to said predetermined accuracy, said reference object is relocated within said scene, so as to be viewable by a different plurality of cameras of said multiplicity of cameras than said plurality of cameras by which said reference object was previously viewable prior to said relocation thereof,
   said image processing sub-system is further operative to find a point of intersection of light rays illuminating each of said different plurality of cameras, and
   said pixel-to-ray calibration sub-system is further operative to correlate a pixel location at which said reference object appears within each said at least one image to said light rays illuminating each of said different plurality of cameras and intersecting with said region of intersection, irrespective of a three-dimensional location of said reference object within said scene.

9. The system according to claim 8, wherein said image processing subsystem and said pixel-to-ray calibration sub-system operative iteratively with respect to one another, until said light rays having said derived ray parameters are ascertained to intersect with said point of intersection with greater than or equal to said predetermined accuracy.

10. The system according to claim 8 wherein said point of intersection is a probabilistic region of intersection.

11. The system according to claim 8, wherein said ray parameters comprise at least one of intrinsic ray parameters and extrinsic ray parameters.

12. The system according to claim 8, wherein said predetermined accuracy is equal to 1 cm.

13. The system according to claim 8, wherein said plurality of cameras comprises at least two cameras.

14. The system according to claim 8, wherein said three dimensional location of said reference object is not supplied as an input parameter to said system.

* * * * *